(12) United States Patent
Katoh

(10) Patent No.: US 9,823,899 B2
(45) Date of Patent: Nov. 21, 2017

(54) RANDOM NUMBER PROCESSING DEVICE GENERATING RANDOM NUMBERS BY USING DATA READ FROM NON-VOLATILE MEMORY CELLS, AND INTEGRATED CIRCUIT CARD

(71) Applicant: Panasonic Intellectual Property Management Co., Ltd., Osaka (JP)

(72) Inventor: Yoshikazu Katoh, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 32 days.

(21) Appl. No.: 15/180,315

(22) Filed: Jun. 13, 2016

(65) Prior Publication Data

US 2017/0242660 A1 Aug. 24, 2017

(30) Foreign Application Priority Data

Jun. 18, 2015 (JP) ................................. 2015-123178

(51) Int. Cl.
*G06F 7/58* (2006.01)
*H04L 9/08* (2006.01)
(Continued)

(52) U.S. Cl.
CPC ............ *G06F 7/588* (2013.01); *G11C 13/004* (2013.01); *G11C 13/0007* (2013.01);
(Continued)

(58) Field of Classification Search
CPC ... G06F 7/588; G11C 13/0007; G11C 13/004; H01L 45/146; H04L 9/0869; H04L 9/0894; H04L 9/14; H04L 9/302
(Continued)

(56) References Cited

U.S. PATENT DOCUMENTS 9,600,237 B2 * 3/2017 Katoh ....................... G06F 5/01
2010/0070777 A1 3/2010 Salters et al.
(Continued)

FOREIGN PATENT DOCUMENTS

JP 2004-519035 6/2004
JP 2009-533741 9/2009
(Continued)

OTHER PUBLICATIONS

Sanu K. Mathew et al., "A 0.19pJ/b PVT-Variation-Tolerant Hybrid Physically Unclonable Function Circuit for 100% Stable Secure Key Generation in 22nm CMOS", IEEE(ISSCC) Dig. of Tech. Papers, pp. 278-280, 2014.
(Continued)

*Primary Examiner* — Tan V. Mai
(74) *Attorney, Agent, or Firm* — McDermott Will & Emery LLP

(57) ABSTRACT

A random number processing device according to an aspect of the present disclosure is a random number processing device generating random number data by using data read from memory cells, the memory cells having a property such that, in a variable state, in response to application of different electrical signals, a resistance value of each of the memory cells reversibly transitions between resistance value ranges and, when the resistance value falls within at least one resistance value range among the resistance value ranges, the resistance value changes as time passes, the random number processing device including a random number processing circuit that, in operation, generates first random number data from a combination of first resistance value information and second resistance value information about the resistance values of first and second memory cells among the memory cells which fall within the at least one resistance value range.

16 Claims, 28 Drawing Sheets

(51) Int. Cl.
*H04L 9/14* (2006.01)
*H04L 9/30* (2006.01)
*G11C 13/00* (2006.01)
*H01L 45/00* (2006.01)

(52) U.S. Cl.
CPC .......... *H01L 45/146* (2013.01); *H04L 9/0869* (2013.01); *H04L 9/0894* (2013.01); *H04L 9/14* (2013.01); *H04L 9/302* (2013.01)

(58) Field of Classification Search
USPC .................................................. 708/250–256
See application file for complete search history.

(56) References Cited

U.S. PATENT DOCUMENTS

| | | | |
|---|---|---|---|
| 2011/0022648 | A1 | 1/2011 | Harris et al. |
| 2011/0066670 | A1 | 3/2011 | Yu |
| 2011/0123022 | A1 | 5/2011 | Oishi et al. |
| 2012/0044777 | A1 | 2/2012 | Fujiwara et al. |
| 2012/0069633 | A1 | 3/2012 | Katoh |
| 2013/0129083 | A1 | 5/2013 | Fujino |
| 2013/0194886 | A1 | 8/2013 | Schrijen et al. |
| 2015/0301802 | A1* | 10/2015 | Katoh ................... G06F 5/01 708/190 |
| 2016/0148679 | A1* | 5/2016 | Yoshimoto ........... G11C 13/004 365/148 |
| 2016/0148680 | A1* | 5/2016 | Yoshimoto ........... G11C 13/004 365/148 |

FOREIGN PATENT DOCUMENTS

| | | |
|---|---|---|
| JP | 2011-113136 | 6/2011 |
| JP | 2011-521376 | 7/2011 |
| JP | 2012-043517 | 3/2012 |
| JP | 2013-545340 | 12/2013 |
| WO | 2002/063462 | 8/2002 |
| WO | 2011/121971 | 10/2011 |
| WO | 2012/014291 | 2/2012 |

OTHER PUBLICATIONS

Takeshi Fujino, "Development and Evaluation of Tamper-Resistant Dependable VLSI Systems", Dependable VLSI System Basic Technologies, CREST 2009 Research Theme, 2012 Annual Report.

Markus Dichtl, "Bad and Good Ways of Post-Processing Biased Physical Random Numbers", The Workshop on Fast Software Encryption 2007 (FSE 2007) LNCS 4593, pp. 137-152, 2007.

I. G. Baek et al., "Highly Scalable Non-volatile Resistive Memory using Simple Binary Oxide Driven by Asymmetric Unipolar Voltage Pulses" IEEE, IEDM pp. 587-590, 2004.

Akihiro Takeuchi et al., "Implementation and Evaluation of SCA-Resistant AES and PUF using MDR-ROM Scheme", The 32nd Symposium on Cryptography and Information Security (SCIS2015), 2015.

Ritsumeikan University, National Institute of Advanced Industrial Science and Technology, Meijo University, Mitsubishi Electric, "Development and Evaluation of Dependable VLSI Sydtem for Tamper Resistance", Materials for Area Meeting, Jul. 2, 2011.

* cited by examiner

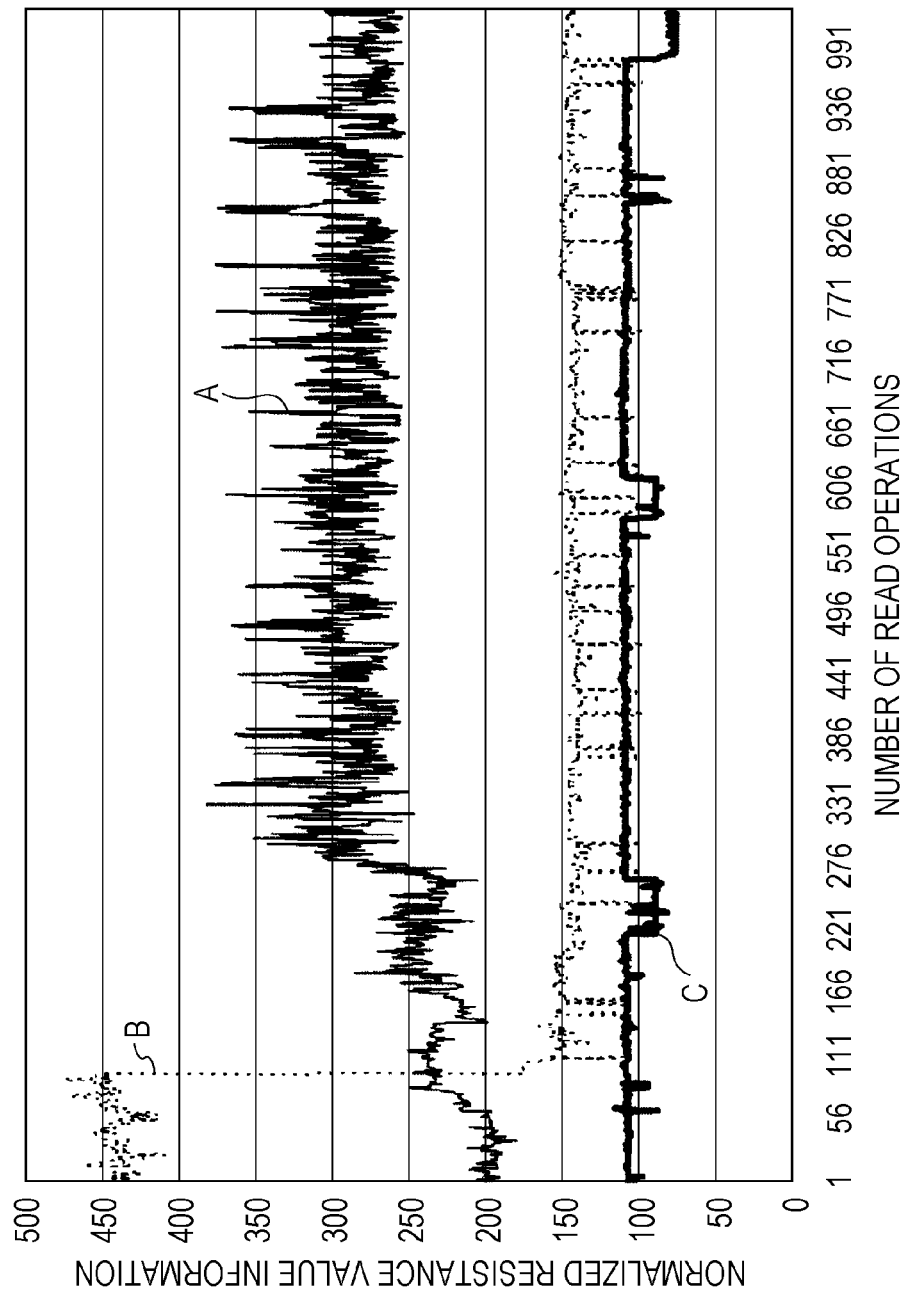

FIG. 15

| 1 | 1 | 1 | 1 | 0 | 0 | 1 | 1 | 0 | 1 | 1 | 1 | 1 | 1 |
|---|---|---|---|---|---|---|---|---|---|---|---|---|---|
| 1 | 1 | 0 | 1 | 0 | 0 | 1 | 1 | 0 | 1 | 1 | 0 | 0 | 0 |
| 0 | 0 | 1 | 0 | 0 | 1 | 0 | 0 | 1 | 0 | 1 | 0 | 1 | 1 | 0 |
| 1 | 1 | 0 | 1 | 0 | 0 | 0 | 0 | 1 | 1 | 0 | 0 | 1 | 0 | 0 | 1 |
| 1 | 0 | 0 | 0 | 0 | 0 | 1 | 1 | 0 | 1 | 1 | 1 | 1 | 1 | 1 |
| 0 | 0 | 0 | 1 | 1 | 0 | 0 | 0 | 1 | 1 | 0 | 1 | 1 | 1 | 0 | 1 |
| 0 | 0 | 1 | 1 | 0 | 1 | 1 | 1 | 1 | 1 | 0 | 0 | 0 | 1 | 0 | 0 |
| 1 | 1 | 1 | 0 | 0 | 1 | 1 | 1 | 0 | 0 | 1 | 1 | 1 | 1 | 0 |
| 0 | 1 | 1 | 0 | 0 | 0 | 1 | 1 | 1 | 1 | 0 | 1 | 1 | 1 | 1 |
| 1 | 1 | 1 | 1 | 1 | 0 | 0 | 1 | 1 | 1 | 0 | 0 | 0 | 1 | 1 | 1 |
| 0 | 0 | 0 | 1 | 0 | 0 | 1 | 1 | 0 | 0 | 0 | 1 | 0 | 1 | 1 | 0 |
| 1 | 0 | 0 | 0 | 1 | 1 | 1 | 0 | 1 | 0 | 1 | 0 | 0 | 1 | 1 | 1 |
| 1 | 0 | 0 | 0 | 1 | 0 | 1 | 1 | 1 | 1 | 1 | 1 | 0 | 0 | 1 | 1 |
| 1 | 1 | 1 | 1 | 1 | 0 | 0 | 0 | 1 | 1 | 0 | 1 | 1 | 1 | 1 |
| 1 | 1 | 1 | 0 | 0 | 1 | 0 | 0 | 1 | 0 | 0 | 0 | 1 | 1 | 1 | 1 |
| 1 | 0 | 1 | 0 | 0 | 0 | 1 | 1 | 0 | 0 | 0 | 1 | 1 | 0 | 1 | 0 |

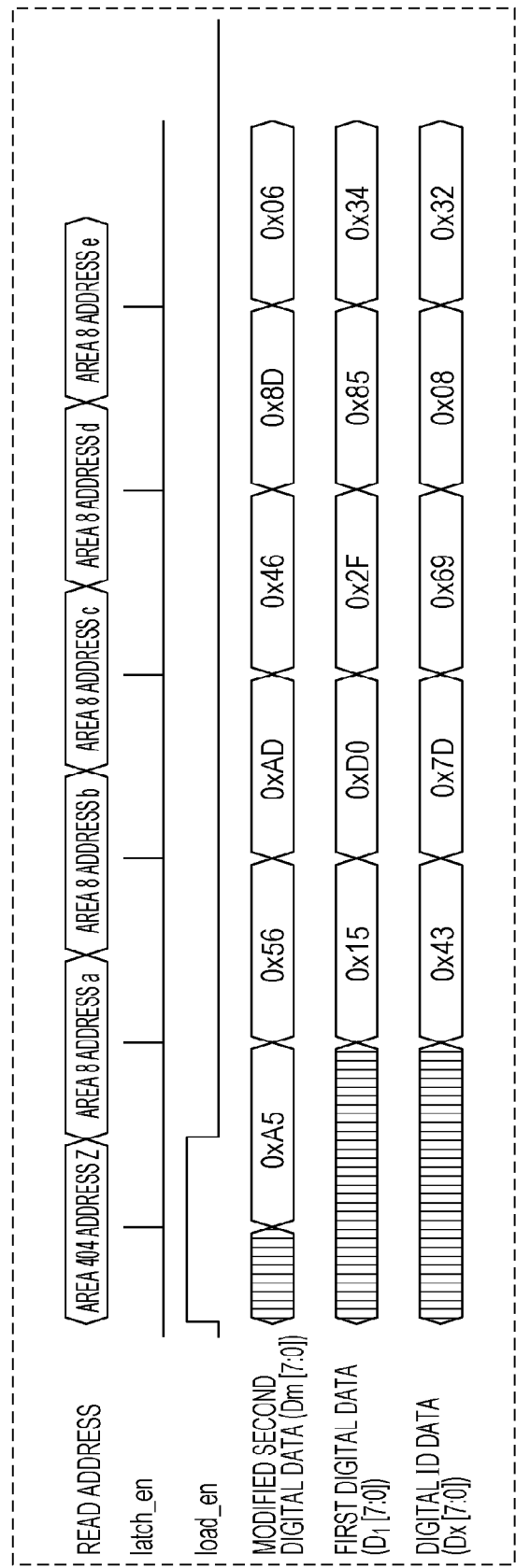

RANDOM NUMBER PROCESSING DEVICE GENERATING RANDOM NUMBERS BY USING DATA READ FROM NON-VOLATILE MEMORY CELLS, AND INTEGRATED CIRCUIT CARD

BACKGROUND

1. Technical Field

The present disclosure relates to a random number processing device generating random numbers by using data read from non-volatile resistive memory cells.

2. Description of the Related Art

The market for electronic commerce services provided via the Internet, such as online banking and online shopping, is rapidly expanding. As a method of payment in such services, electronic money is used. Accordingly, integrated circuit (IC) cards and smartphone terminals that are used as media for electronic money are being increasingly used. In these services, a security technique of a higher level is always required in mutual authentication for communication and encryption of communication data in order to ensure secure payment.

Regarding software techniques, encryption techniques based on program processing focusing on advanced encryption algorithms are accumulating, and sufficient security is provided. However, the advancement of technology rapidly increases a risk that information within a circuit may be directly and externally read.

International Publication No. WO2012/014291 proposes a measure against such a risk. In general, in an IC with increased security, an encryption circuit mounted on the IC is used to encrypt confidential information before the information is used, thereby protecting the information from being compromised. In such a case, it is essential to protect information about an encryption key (also referred to as a "private key") retained inside the IC from being externally compromised.

As representative schemes for encryption circuits, Triple Data Encryption Standard (3DES) and Advanced Encryption Standard (AES), for example, are widely used. These encryption schemes employ an advanced encryption algorithm that protects an encryption key from being identified within a realistic time even if an input/output pair of plaintext (data before encryption) and ciphertext is obtained and analyzed by using a computer of a highest speed, and security provided by the algorithm has been verified. Although it is considered that encrypted data is protected from hacking, a vulnerability of an encryption key such that an encryption key may be directly hacked is a concern.

In an IC employing a classical scheme, an encryption key is saved in an internal fuse read-only memory (ROM) or a non-volatile memory. In a configuration using a fuse ROM, the states of the fuse elements are observed by X-ray irradiation or the like, whether the fuse elements are each in a conducting state or not is analyzed, and saved key information is consequently hacked, which is an issue. In a configuration using a non-volatile memory, although an analysis by X-ray irradiation is not possible, a probe is directly connected to both ends of each memory element of the non-volatile memory, the state of the element is electrically read, and key information is consequently hacked, which is an issue. Therefore, an IC with increased security is manufactured by using a leading-edge fine process so as to prevent a probe from being directly connected to an internal circuit. That is, an IC is manufactured in a fine process having a rule of wiring finer than the diameter of the tip of a leading-edge probe to thereby prevent a threat, that is, an analysis by probing.

However, a scheme called a side channel attack is being used against such a measure and becomes a new threat. A side channel attack is a scheme for identifying an encryption key by using side channel information, such as the power consumption of the semiconductor device when each signal processing circuit is operating and an emitted electromagnetic wave that depends on the power consumption, as described in International Publication No. WO2012/014291. This scheme can be a threat because an attacker (hacker) is able to hack key information while the IC is operating without causing physical damage to the IC.

A Differential Power Analysis (DPA) attack, which is classified as a side channel attack described above, was made public by P. Kocher in 1999. This DPA scheme uses the fact that the signal value or the signal transition frequency when an IC is operating has a correlation with the power consumption. Specifically, in the DPA scheme, this correlation is integrated a large number of times, and machine learning control is performed while noise is removed to thereby derive a fixed pattern and identify key information. In an example in International Publication No. WO2012/014291, key information is identified from operations of an encryption processing circuit. Key information stored in a non-volatile memory is read at a timing triggered upon performing of an encryption process. According to the principle of DPA, if data read at a timing close to the timing described above is identified and obtained, the content of the data may be analyzed by DPA. If the internal specification of an IC leaks out, the control method for the IC is understood by a hacker. As a result, the entire data including encryption key information saved in the non-volatile memory is hard-copied as described above, and a duplicate of the IC is manufactured.

In order to address these issues, the Physically Unclonable Function (PUF) technology is proposed currently. The PUF technology is a technology for generating unique individual identification information that differs from IC to IC by utilizing manufacturing variations. Hereinafter, individual identification information generated by using the PUF technology is called "digital ID data". Digital ID data can be regarded as random number data that is associated with variations in the physical properties of the IC and that is specific to each device. It is not possible to artificially control the physical properties of each IC, and therefore, data for which physical reproduction is not possible can be generated.

Even if variations in the physical properties can be controlled to some extent, when random process variations that occur during manufacturing are used, it is easy to create unique digital ID data specific to each IC by using the PUF technology. However, in actuality, it is extremely difficult to intentionally create specific individual identification information determined in advance. In a semiconductor process, manufacturing variations occur in various physical properties. Manufacturing variations may occur in the doping amount in a semiconductor process, the thickness of an oxide, the channel length, the width and thickness of a metal wiring layer, the parasitic resistance and parasitic capacitance, and so on, for example.

Specific examples of PUFs in the related art include SRAM-PUFs disclosed by Japanese Unexamined Patent Application Publication (Translation of PCT Application) No. 2013-545340 and "A 0.19 pJ/b PVT-Variation-Tolerant Hybrid Physically Unclonable Function Circuit for 100%

Stable Secure Key Generation in 22 nm CMOS" Sanu K. Mathew, et al., ISSCC2014 (hereinafter referred to as "Non Patent Literature 1"). These examples utilize a phenomenon in which, in each memory cell in an SRAM, the initial value of digital data upon power-on tends to be in a "1" state or in a "0" state depending mainly on a variation in Vt of the transistor (a variation in the operating voltage). That is, this tendency is specific to each cell of the SRAM mounted on each IC and differs from cell to cell. In other words, the initial value data upon turning on the power of the SRAM is used as digital ID data.

Japanese Unexamined Patent Application Publication No. 2012-43517 discloses a modification of an SRAM-PUF that utilizes a phenomenon in which an error bit is randomly generated in a memory cell of an SRAM. Further, International Publication No. WO2012/014291 and "The Design and Evaluation Methodology of Dependable VLSI for Tamper Resistance" Takeshi Fujino, "Fundamental Technologies for Dependable VLSI System" Research Started in 2009 at CREST, 2012 Annual Report (hereinafter referred to as "Non Patent Literature 2") introduce a PUF technology called an Arbiter PUF or a Glitch PUF. An Arbiter PUF and a Glitch PUF utilize the fact that output from a combination circuit randomly changes relative to input due to a gate delay or a wiring delay. A gate delay and a wiring delay that change due to manufacturing variations have delay amounts specific to each IC. Accordingly, each IC outputs substantially the same result relative to the input, although the result differs from IC to IC, and therefore, digital ID data can be generated.

As described above, with the PUF technology, digital ID data constituted by random numbers specific to each IC is generated as irreproducible data. Such digital ID data is used as a device key for encrypting the private key described above. The private key encrypted by using the device key (digital ID data) is kept encrypted and saved in a non-volatile memory. That is, the encrypted private key recorded in the non-volatile memory can be decrypted and restored to the original private key data only by using the device key. Therefore, even if the entire data within the non-volatile memory is hard-copied by hacking, the device key (digital ID data) specific to each IC is irreproducible. As a result, it is not possible to restore the encrypted private key to the original data, and therefore, it is not possible to use the hacked data.

Further, digital ID data generated by using the PUF technology is generated by utilizing slight manufacturing variations. Physical properties that are used may change due to the temperature environment and power condition when the digital ID data is generated and due to long-term deterioration, and therefore, obtained data may have an error. Accordingly, parity data for error correction is computed on the basis of digital ID data generated by using the PUF technology in an inspection process during manufacturing, and the parity data is separately saved in a non-volatile memory or the like, as described in Non Patent Literature 1. When a system uses the digital ID data, the digital ID data that has been generated by using the PUF technology and that may include an error is subject to an error correction process using the parity data, whereby the same ID data is always obtained.

Although the PUF technology may seem to be an inefficient technology because data correction is performed on data that includes an error as described above, such correction is another significant feature. Each time digital ID data is generated again by using the PUF technology, an error irregularly occurs in the data. Therefore, even in a case of encountering a hacking attack, such as a side channel attack described above, the data pattern is not determined, which makes an analysis extremely difficult, resulting in significantly increased security.

As described above, the PUF technology is an essential technology for increasing security in order to securely perform encryption and mutual authentication.

SUMMARY

In one general aspect, the techniques disclosed here feature a random number processing device generating random number data by using data read from memory cells, the random number processing device comprising: a random number processing circuit that, in operation, generates first random number data from a combination of first resistance value information and second resistance value information, the first resistance value information being information about a resistance value of a first memory cell among the memory cells, the resistance value of the first memory cell falling within at least one resistance value range, the second resistance value information being information about a resistance value of a second memory cell that is different from the first memory cell among the memory cells, the resistance value of the second memory cell falling within the at least one resistance value range, wherein: in a variable state, in response to application of different electrical signals to the memory cells, a resistance value of each of the memory cells reversibly transition between resistance value ranges including the at least one resistance value range; and in a case where the resistance value of each of the memory cells falls within the at least one resistance value range, the resistance value of each of the memory cells change as time passes.

It should be noted that general or specific embodiments may be implemented as a system, a method, a microprocessor program, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 9 is a diagram illustrating an example of reading, from memory cells that fall within the same variable resistance value range, the resistance values in an embodiment;

FIG. 15 is a diagram illustrating an example digital ID data according to an embodiment;

FIG. 24A is a diagram illustrating an example challenge-response process according to an embodiment;

DETAILED DESCRIPTION

Figure 1:
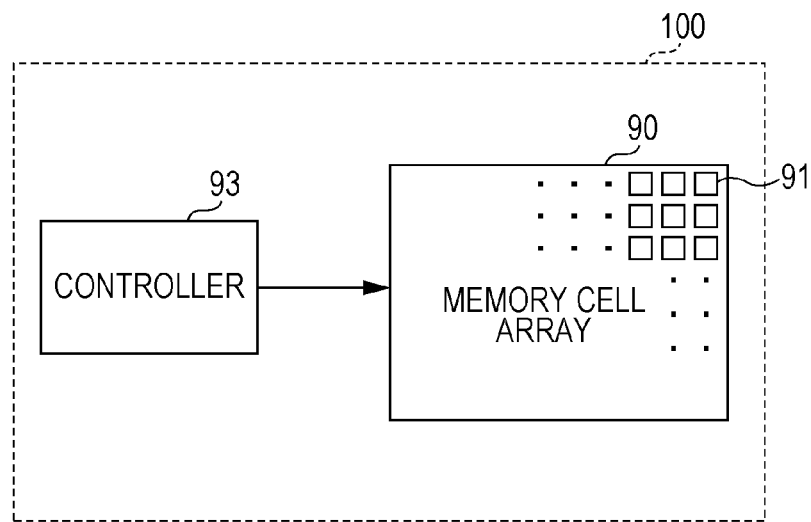
FIG. 1 is a block diagram schematically illustrating an example configuration of a non-volatile memory device according to an embodiment.

Hereinafter, embodiments of a non-volatile memory device and so on according to the present disclosure will be described with reference to the attached drawings. A non-volatile memory device according to the present disclosure includes a plurality of non-volatile resistive memory cells that store data by determining the resistance values using at least one threshold.

The non-volatile memory device has a function of generating individual identification information, for example. In the non-volatile memory device, data encryption and decryption and mutual authentication can be performed on the basis of the generated individual identification information. More specifically, the non-volatile memory device according to the present disclosure has a function of reading the content of variable resistance memory elements and generating, from at least part of the content, unique random number data specific to each chip as individual identification information used to derive a digital identifier. Accordingly, it is possible to prevent electrical or physical reproduction. The non-volatile memory device further has a function of generating response information that differs from device to device in response to challenge information input from outside the device. Therefore, it is possible to externally perform highly secure authentication for the non-volatile memory device according to the present disclosure. By reading, a plurality of times, resistance value information about a memory cell that is in the same resistance value state and that is not rewritten, a fluctuation component of the resistance value is obtained and true random number data is generated.

The non-volatile memory device can be mounted on a card on which an IC chip used for mobile electronic money, for example, is mounted. On the IC chip, a logic circuit, a volatile memory device, and a microprocessor are mounted. The non-volatile memory device and the IC chip are used to implement an encryption function, a digital signature function, a digital authentication function, and other various information security functions. When these functions are executed, data encryption using a private key is performed. It is desirable to securely store the private key also in the IC card as described above to protect the private key from being reproduced.

Study by Inventors

In order to implement storage of a private key and generation of response information specific to each device in response to challenge information (hereinafter also referred to as "challenge-response generation") described above, the PUF technology described above is used. Digital ID data constituted by random numbers, which is individual identification information obtained by using the PUF technology, is used as a device encryption key to encrypt the private key and to save the encrypted key in a non-volatile memory. The digital ID data is constituted by random numbers that differ from IC to IC, and therefore, data encrypted by using the digital ID data is a data sequence specific to each IC. Even if the encrypted private key is copied to another IC by hacking or the like, it is not possible to reproduce the digital ID data. The digital ID data is not reproduced, and therefore, the original private key is not used in an unauthorized manner. In challenge-response generation using the PUF technology, parameters based on manufacturing variations are used for a function that derives response information from input challenge information. Therefore, the function for deriving response information from input challenge information is a unique function for each device, and reproduction thereof is not possible. Accordingly, authentication using challenge-response based on the PUF technology is highly secure.

However, for an ultra-small device, such as an IC card, a circuit for generating digital ID data that employs the PUF technology is required to be compact to a high degree. Specifically, digital ID data based on the PUF technology contains a data error, and therefore, an error correction circuit is necessary. If a larger number of errors occur, the circuit scale of the error correction circuit becomes larger accordingly. Therefore, it is required to reduce and stabilize the data error rate, to decrease the error correction capability that is required as much as possible, and to reduce the circuit scale. Further, in a general IC card on which a battery is not mounted, various functions need to be executed during a short time period with power obtained through wireless power feeding upon communication. That is, in generation of digital ID data, it is requested to achieve both ultra-low power consumption and an increased generation speed. Accordingly, the present inventors have studied some related art generators generating digital ID data that can meet such a request.

In Non Patent Literature 2, various types of PUF technology in the related art are benchmarked. Specifically, when the error rate of digital ID data is focused, the data error rate becomes worse and increases to 15% at worst for an SRAM PUF and a Glitch PUF if an environmental change is taken into consideration. By taking into account the manufacturing yield, an error correction circuit that allows a data error rate of 20% or more is necessary. Therefore, the circuit scale of the error correction circuit is an issue for the IC. In a case of an SRAM PUF, a cell of an extremely low error rate is reported in Non Patent Literature 1, for example, according to the latest research. However, the size of this memory cell is 4.66 $\mu m^2$ and is extremely large, although a 22 nm process is used. Further, in a case of providing a special SRAM cell for a PUF, elements are easily identified, resulting in compromised tamper resistance.

The present inventors summarize the features of PUF technology as follows. The PUF technology is considered to have the following three major features:
First feature: Specific digital ID data (individual identification information) is obtained from an irreproducible physical phenomenon;
Second feature: A physical phenomenon occurs only in response to dynamic circuit control, and it is not possible to make a necessary physical phenomenon occur by a static analysis, such as direct reading by a probe; and
Third feature: Obtained digital ID data contains an error, and true ID data is obtained only by using an error correction circuit.

Further, the present inventors summarize major requirements for digital ID data obtained using the PUF technology as follows:
First requirement: The position of an error contained in digital ID data randomly changes, and it is difficult to predict true ID data;
Second requirement: Digital ID data obtained by using the PUF technology is highly random and is unique data specific to each IC;
Third requirement: In a case of employing the PUF technology, a circuit to be accordingly added requires small overheads and small power consumption upon generation of digital ID data;
Fourth requirement: The number of data bits processed in parallel by a generation circuit that generates data bits is increased to thereby improve resistance to a side channel attack;
Fifth requirement: The data error rate can be decreased, and the circuit scale of the error correction circuit can be reduced; and
Sixth requirement: There are less restrictions on a timing at which digital ID data is generated, and the generation speed is high.

Regarding the above-described features and requirements, the sixth requirement is significantly restricted in a known example of an SRAM-PUF in the related art. In an SRAM-PUF, digital ID data can be obtained only upon power-on due to the principle thereof. An SRAM within an IC is used as a data cache, and therefore, when ID data is generated by using a PUF, data in the SRAM needs to be stored elsewhere or discarded. As a result, the system operation is significantly restricted. In order to generate ID data at a desired timing as a measure against such a restriction, cells dedicated to a PUF need to be separately provided, as described in Non Patent Literature 1. In this case, overheads of the circuit increase, resulting in the fifth requirement being significantly relaxed.

In a case of a PUF using an SRAM, a data error tends to occur in the same cell. Therefore, the pattern of digital ID data that contains an error is limited, and true digital ID data is easily predictable, which is an issue. In a case of an Arbiter PUF, issues concerning the restriction on the generation timing, the circuit scale, the generation speed, and so on do not arise. However, variations in the wiring delay, the gate delay, and so on are not significant. Therefore, the ID data has poor uniqueness. As pointed out in Non Patent Literature 2, the data error rate in an Arbiter PUF is 15% and is extremely high resulting in an increased scale of the error correction circuit, which is a big issue.

Knowledge Acquired by Inventors

The present inventors have diligently studied a novel digital ID data generation method that is likely to address the issues described above. As a consequence, the present inventors have found a phenomenon in which the written resistance values of variable resistance elements vary in the form of a normal distribution, and have conceived of generating stable digital ID data from variations in the resistance values.

A variable resistance memory element reversibly transitions between at least a first resistance value state and a second resistance value state where the resistance value is smaller than that in the first resistance value state, in response to application of an electrical pulse having a predetermine voltage (absolute value), polarity, and width to both electrodes of the memory element. Usually, digital data (for example, "0" and "1") is assigned to the first resistance value state and to the second resistance value state and is saved as information.

Here, the present inventors focus on a group of cells that belong to one state among the first resistance value state described above, the second resistance value state described above, and an initial state described below, and classify each cell included in the cell group into two categories depending on the resistance value, that is, represent each cell included in the cell group in binary (by digital data). The resistance values of the respective cells vary, and therefore, the cells are used to generate first digital data by utilizing such variations. By using the first digital data as device-specific digital ID data, an unprecedented method for generating digital ID data which is more secure, more stable, and applicable to encryption techniques and so on can be provided. However, the first digital data is closely associated with the resistance values of the memory cells. Therefore, the method may be vulnerable to a hacking attack of directly reading the resistance values of the memory cells using a probe or the like, and the content of the first digital data is likely to be predicted, which is a concern. In a resistive memory cell illustrated in the present disclosure, the resistance value promptly changes with a low voltage, and therefore, the resistance quickly changes in an invasive process on the IC chip, in response to static electricity generated by probing, and so on. Accordingly, the resistive memory cell illustrated in the present disclosure is considered to be resistant to the above-described attack using a probe but may become an issue depending on future technological advancement. The present inventors have addressed this issue in such a manner that second digital data that is different from the first digital data and that does not relate to the resistance values of the memory cells is further generated, and third digital data converted from the first digital data on the basis of the second digital data is generated and used as digital ID data so as to eliminate the vulnerability to the attack.

Further, a large number of circuit elements involved in generating digital ID data can be shared by a circuit mounted as a usual non-volatile memory device. Accordingly, the circuit scale that may become larger due to generation of digital ID data can be significantly reduced and the circuit can be made smaller.

Further, regarding reading of data from the non-volatile memory device, a plurality of pieces of data are read in parallel because of the structure of the memory array, and therefore, the speed at which digital ID data is generated can be dramatically increased. At the same time, against a side channel attack, electromagnetic waves corresponding to the sum of the number of pieces of data processed in parallel are emitted, and therefore, the non-volatile memory device can be increasingly resistant to the attack.

Regarding generation of random numbers, random numbers that have a low bias probability and that include 0 and 1 in a non-one-sided manner are generated to thereby further increase security. If such random numbers having a low bias probability can be generated in a short time period, the speed at which digital ID data is generated can be dramatically increased.

On the basis of the knowledge of the present inventors, aspects of the present disclosure will be outlined.

A random number processing device according to an aspect of the present disclosure is a random number processing device generating random number data by using data read from memory cells, the random number processing device comprising: a random number processing circuit that, in operation, generates first random number data from a combination of first resistance value information and second resistance value information, the first resistance value information being information about a resistance value of a first memory cell among the memory cells, the resistance value of the first memory cell falling within at least one resistance value range, the second resistance value information being information about a resistance value of a second memory cell that is different from the first memory cell among the memory cells, the resistance value of the second memory cell falling within the at least one resistance value range, wherein: in a variable state, in response to application of different electrical signals to the memory cells, a resistance value of each of the memory cells reversibly transition between resistance value ranges including the at least one resistance value range; and in a case where the resistance value of each of the memory cells falls within the at least one resistance value range, the resistance value of each of the memory cells change as time passes.

With the random number processing device according to the aspect of the present disclosure, random numbers having a low bias probability can be generated in a short time period. The time taken to generate such random numbers having a low bias probability can be reduced, and therefore, the speed at which digital ID data is generated can be increased.

The random number processing device according to the aspect of the present disclosure may further include an input terminal which is connected to the random number processing circuit and via which the data is input, and an output terminal which is connected to the random number processing circuit and via which the random number data is output.

In the random number processing device according to the aspect of the present disclosure, the random number processing circuit may include a first random number data generation circuit that, in operation, generates the first random number data in accordance with a difference or a magnitude relationship between the first resistance value information and the second resistance value information.

In the random number processing device according to the aspect of the present disclosure, the random number processing circuit may further include a second random number data generation circuit that, in operation, generates second random number data in accordance with a difference or a magnitude relationship between third resistance value information and fourth resistance value information, the third resistance value information and the fourth resistance value information being information about the resistance value of a third memory cell among the memory cells, the resistance value of the third memory cell falling within the at least one resistance value range, the third resistance value information being obtained at a first time point, the fourth resistance value information being obtained at a second time point.

In the random number processing device according to the aspect of the present disclosure, the first resistance value information and the second resistance value information may each be represented by a digital value, and, in operation, the first random number data generation circuit may generate the first random number data in accordance with whether the difference has a value of an even number or an odd number.

In the random number processing device according to the aspect of the present disclosure, the third resistance value information and the fourth resistance value information may each be represented by a digital value, and, in operation, the second random number data generation circuit may generate the second random number data in accordance with whether the difference has a value of an even number or an odd number.

In the random number processing device according to the aspect of the present disclosure, the random number processing circuit may further include a third random number data generation circuit that, in operation, generates third random number data by performing an exclusive OR operation on the first random number data and the second random number data.

A non-volatile memory device according to an aspect of the present disclosure is a non-volatile memory device including: a memory array that includes memory cells each having a resistance value and having a property that, in a variable state, in response to application of different electrical signals to the memory cells, the resistance value reversibly transitions between resistance value ranges and, in a case where the resistance value falls within at least one resistance value range among the resistance value ranges, the resistance value changes as time passes; a read circuit that, in operation, obtains first resistance value information and second resistance value information, the first resistance value information being information about the resistance value of a first memory cell among the memory cells, the resistance value of the first memory cell falling within the at least one resistance value range, the second resistance value information being information about the resistance value of a second memory cell that is different from the first memory cell among the memory cells, the resistance value of the second memory cell falling within the at least one resistance value range; and a random number processing circuit that, in operation, generates first random number data from a combination of the first resistance value information and the second resistance value information.

In the non-volatile memory device according to the aspect of the present disclosure, each of the memory cells may include a variable resistance element including a first electrode, a second electrode, and a variable resistance layer interposed between the first electrode and the second electrode.

In the non-volatile memory device according to the aspect of the present disclosure, the variable resistance layer may include a layer of an insulator.

In the non-volatile memory device according to the aspect of the present disclosure, the variable resistance layer may include a local region that passes through the layer of the insulator.

In the non-volatile memory device according to the aspect of the present disclosure, the variable resistance layer may contain a metal oxide.

In the non-volatile memory device according to the aspect of the present disclosure, the metal oxide may be of an oxygen deficient type.

In the non-volatile memory device according to the aspect of the present disclosure, the metal oxide may be at least one selected from the group consisting of a transition metal oxide and an aluminum oxide.

In the non-volatile memory device according to the aspect of the present disclosure, the metal oxide may be at least one selected from the group consisting of a tantalum oxide, a hafnium oxide, and a zirconium oxide.

In the non-volatile memory device according to the aspect of the present disclosure, the insulator may contain a metal oxide, and the local region may contain a metal oxide of an oxygen deficient type having a lower percentage of oxygen content than a percentage of oxygen content of the insulator.

An integrated circuit card according to an aspect of the present disclosure is an integrated circuit card including: a memory array that includes memory cells each having a resistance value and having a property that, in a variable state, in response to application of different electrical signals to the memory cells, the resistance value of the memory cells reversibly transitions between a resistance value ranges and, in a case where the resistance value falls within at least one resistance value range among the resistance value ranges, the resistance value changes as time passes; a read circuit that, in operation, obtains first resistance value information and second resistance value information, the first resistance value information being information about the resistance value of a first memory cell among the memory cells, the resistance value of the first memory cell falling within the at least one resistance value range, the second resistance value information being information about the resistance value of a second memory cell that is different from the first memory cell among the memory cells, the resistance value of the second memory cell falling within the at least one resistance value range; a random number processing circuit that, in operation, generates first random number data from a combination of the first resistance value information and the second resistance value information; and an input/output interface unit from which individual identification information generated by using the first random number data is output.

A random number processing method according to an aspect of the present disclosure is a random number processing method for generating random number data by using data read from memory cells, the random number processing method including generating first random number data from a combination of first resistance value information and second resistance value information, the first resistance value information being information about a resistance value of a first memory cell among the memory cells, the resistance value of the first memory cell falling within the at least one resistance value range, the second resistance value information being information about a resistance value of a second memory cell that is different from the first memory cell among the memory cells, the resistance value of the second memory cell falling within the at least one resistance value range, wherein: in a variable state, in response to application of different electrical signals to the memory cells, a resistance value of each of the memory cells reversibly transitions between resistance value ranges including the at least one resistance value range; and in a case where the resistance value of each of the memory cells falls within the at least one resistance value range, the resistance value of each of the memory cells changes as time passes.

The random number processing method according to the aspect of the present disclosure may further include generating second random number data in accordance with a difference or a magnitude relationship between third resistance value information and fourth resistance value information, the third resistance value information and the fourth resistance value information being information about the resistance value of a third memory cell among the memory cells, the resistance value of the third memory cell falling within the at least one resistance value range, the third resistance value information being obtained at a first time point, the fourth resistance value information being obtained at a second time point.

The random number processing method according to the aspect of the present disclosure may further include generating third random number data by performing predetermined arithmetic processing on the first random number data and the second random number data.

In the present disclosure, all or a part of any of unit, device, part or portion, or any of functional blocks in block diagrams may be implemented as one or more of electronic circuits including, but not limited to, a semiconductor device, a semiconductor integrated circuit (IC) or an LSI. The LSI or IC can be integrated into one chip, or also can be a combination of plural chips. For example, functional blocks other than a memory may be integrated into one chip. The name used here is LSI or IC, but it may also be called system LSI, VLSI (very large scale integration), or ULSI (ultra large scale integration) depending on the degree of integration. A Field Programmable Gate Array (FPGA) that can be programmed after manufacturing an LSI or a reconfigurable logic device that allows reconfiguration of the connection or setup of circuit cells inside the LSI can be used for the same purpose.

Further, it is also possible that all or a part of the functions or operations of the unit, device, part or portion are implemented by executing software. In such a case, the software is recorded on one or more non-transitory recording media such as a ROM, an optical disk, or a hard disk drive, and when the software is executed by a processor, the software causes the processor together with peripheral devices to execute the functions specified in the software. A system or apparatus may include such one or more non-transitory recording media on which the software is recorded and a processor together with necessary hardware devices such as an interface.

Now, embodiments of the present disclosure based on the knowledge are described in detail below with reference to the attached drawings.

Any of the embodiments described below represents a specific example. The numeric values, the forms, the materials, the constituent elements, the arrangements and connections of the constituent elements, the steps, the order of the steps, and so on described in the embodiments below are merely examples and are not intended to limit the present disclosure. Among the constituent elements described in the following embodiments, any constituent element that is not described in independent claims, which indicate the most generic concept of the present disclosure, is described as an optional constituent element. Duplicated description of constituent elements assigned the same reference numerals in the drawings may be omitted. Each constituent element is schematically illustrated in the drawings for easy understanding, and the form, dimensional ratio, and so on are not necessarily accurate. In a manufacturing method, the order and so on of the processes can be changed, and other publicly known processes can be added as necessary.

Overview of Non-Volatile Memory Device According to Embodiments

Figure 2:
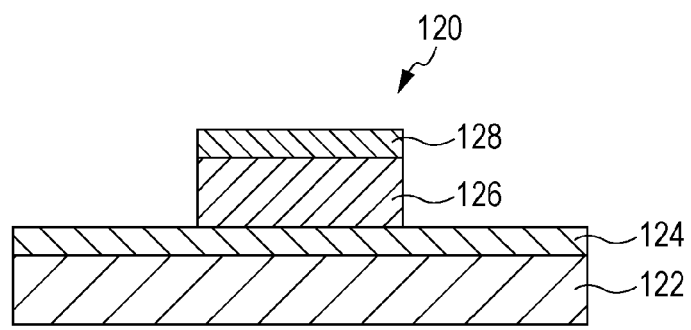
FIG. 2 is a cross-sectional view schematically illustrating an example structure of a memory cell included in the non-volatile memory device according to an embodiment.

FIG. 1 is a block diagram schematically illustrating an example configuration of a non-volatile memory device 100 according to an embodiment. FIG. 2 is a cross-sectional view schematically illustrating an example structure of a memory cell included in the non-volatile memory device 100 according to an embodiment. The non-volatile memory device 100 is a non-volatile resistive memory device.

The non-volatile memory device 100 according to an embodiment includes at least a memory cell array 90 and a controller 93. The memory cell array 90 includes a plurality of memory cells 91 arranged in an array. The plurality of memory cells 91 each include a variable resistance element 120 illustrated in FIG. 2 and store digital data by using a difference in the resistance value.

First, a "user data storage function" provided by the non-volatile memory device 100 is described. In general, any digital data that a device user (user) wants to store in the device is defined as user data. In a case of storing user data in the memory cell array 90, the user data externally input to the device is stored in accordance with control performed by the controller 93 by using at least one threshold as a reference and assigning digital information to a memory cell that is set so as to fall within a resistance value range equal to or larger than the threshold and to a memory cell that is set so as to fall within a resistance value range smaller than the threshold, the digital information being at least in binary. In a case of reading the stored user data, the original digital data is restored and externally output from the device in accordance with control performed by the controller 93 by using the threshold as a criterion. Note that the controller 93 need not be part of the non-volatile memory device 100, and a controller externally connected to the device may be used to perform operations described below.

Next, a "first digital data generation function" provided by the non-volatile memory device 100 is described, the first digital data being a source of device-specific digital ID data. In a configuration according to the present embodiment, device-specific digital ID data is generated by using the non-volatile memory device 100. In order to generate the first digital data, which is a source of the digital ID data, the controller 93 obtains a plurality of pieces of resistance value information from the group of memory cells 91 having resistance values that are in the same resistance value state and detects the median value of the varying pieces of resistance value information. The controller 93 uses a threshold based on the detected median value as a reference, determines which of the digital values 0 and 1 is assigned to each memory cell 91 in the group of memory cells 91 that are in the same resistance value state, and generates the first digital data that is used to generate the digital ID data described below. The same resistance value state means a state that falls within one resistance value range which is used to assign one of the states of digital information when the user data is stored.

In general, in a non-volatile memory device, in a case of assigning binary information, which is the minimum unit of a digital quantity, to a physical quantity that a memory cell has, for example, which of the two values of the binary information is to be assigned depends on whether the physical quantity falls within a certain range equal to or higher than a predetermined threshold or within a certain range smaller than the predetermined threshold. A recent non-volatile memory device includes an error correction circuit. With an error correction process performed by the error correction circuit, even if the physical quantities of some memory cells do not fall within ranges assumed in advance for assigning binary information, the binary information obtained on the basis of the physical quantities are correctly restored. This means that some memory cells among the group of memory cells that form the first digital data need not fall within the same resistance value range. It is assumed herein that, if at least more than half the group of memory cells that form the first digital data are in the same resistance value state, various functions of the present disclosure can be implemented.

The non-volatile memory device 100 provides a "second digital data generation function", the second digital data being a source of the device-specific digital ID data. The non-volatile memory device 100 further provides a "random number data generation function", a "data error addition function", and a "challenge-response function". These functions are described in detail below.

Regarding the plurality of functions provided by the non-volatile memory device 100, all of the plurality of functions may be installed on the device, or some of the plurality of functions may be combined and installed on the device. A specific method for implementing each function is described below; however, the method for implementing each function is not limited to that described below, and any method based on the idea described above is assumed to be included in the present disclosure.

In a case of generating digital ID data that is used as individual identification information of the non-volatile memory device 100, the above-described first digital data generated from a plurality of non-volatile memory cells having resistance values that fall within the same resistance value range is used. User data is not written to this plurality of non-volatile memory cells. That is, except for a case of changing the device-specific digital ID data, the resistance values are not rewritten and the resistance values of the non-volatile memory cells are fixed within a predetermined resistance value range. The resistance values vary within the same resistance value range, and the variations are sources of information specific to the non-volatile memory device 100. The "resistance value range" is described in detail below with reference to FIG. 3.

The "resistance value information" described above is information that correlates with the resistance value and may be the resistance value itself or a value that changes in accordance with the resistance value. A value that changes in accordance with the resistance value may be, for example, a discharge time taken to discharge an electric charge accumulated in a capacitor connected in parallel to the memory cell via the memory cell or a charge time taken to charge the discharged capacitor to a predetermined level by applying a predetermined constant current to the memory cell that is connected in parallel to the capacitor, as described below. The discharge time or the charge time may be a count value that is counted in accordance with a predetermined clock cycle, for example. The capacitor need not be an element and may be the parasitic capacitance of a wiring line or the like or the diffusion capacitance of the transistor, for example.

Resistance value information may be a value measured by a sense amplifier circuit having a predetermined resolution. Alternatively, resistance value information may be a value obtained by determining within which of a plurality of resistance value ranges segmented by thresholds the value measured by the sense amplifier circuit falls. In this case, some of the plurality of resistance value ranges may each be further segmented into smaller ranges.

In the example illustrated in FIG. 2, the variable resistance element 120 included in the memory cell 91 includes a base layer (a substrate, for example) 122, a first electrode 124, a variable resistance layer 126, and a second electrode 128. To each memory cell, a selector element, such as a transistor or a diode, for selecting a specific memory cell may be connected, which is not illustrated and omitted in FIG. 2.

The memory cell 91 has a property such that the memory cell 91 can be in a variable state where the resistance value reversibly transitions between a plurality of variable resistance value ranges in response to application of a plurality of different electrical signals.

Figure 3:
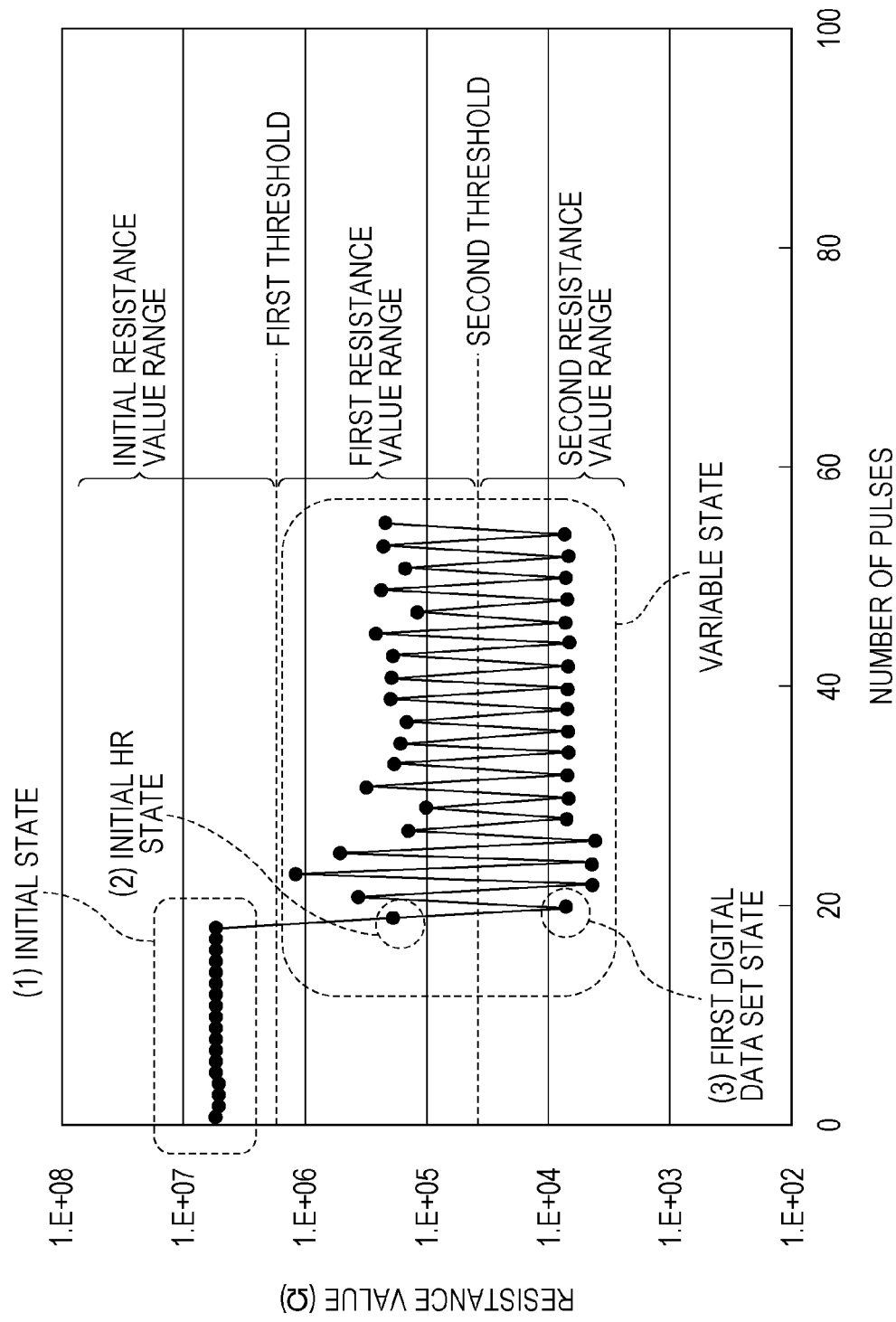
FIG. 3 is a graph illustrating examples of resistance value ranges of the memory cell included in the non-volatile memory device according to an embodiment.

FIG. 3 is a graph illustrating examples of resistance value ranges of the memory cell included in the non-volatile memory device according to the present embodiment. As illustrated in FIG. 3, the memory cell 91 may have at least two states, namely, a variable state and an initial state.

The "initial state" is a state where the resistance value falls within an initial resistance value range that does not overlap any variable resistance value ranges. A memory cell in the initial state does not enter the variable state as long as forming is not performed. This "forming" is an operation of applying a predetermined electrical stress to a memory cell and changing the memory cell so as to enter a state where the resistance value of the memory cell reversibly transitions between a plurality of variable resistance value ranges.

An electrical stress (forming stress) applied for forming may be an electrical pulse having a predetermined voltage and time width or a combination of a plurality of electrical pulses, for example. A forming stress may be accumulated stresses. In this case, the memory cell 91 (FIG. 1) transitions from the initial state to the variable state when the amount of accumulated stresses exceeds a predetermined amount.

In the present embodiment, the memory cell 91 is assumed to have a property of not entering the state where the resistance value reversibly transitions between a plurality of variable resistance value ranges as long as forming is not performed after manufacturing. That is, description is given while assuming that the variable resistance element which has been manufactured through a semiconductor process or the like and to which a forming stress has not been applied is in the initial state.

However, such a property is an example and is not essential. The memory cell 91 need not be an element that can be in the initial state and may be a so-called forming-less element that only has the variable state, for example.

Configuration of Resistance-Change Element

In the example illustrated in FIG. 2, the variable resistance element 120 has a configuration in which the variable resistance layer 126 is interposed between the first electrode 124 and the second electrode 128. The variable resistance layer 126 can be made of a metal oxide or, more specifically, a transition metal oxide, for example. The variable resistance element 120 of the memory cell 91 in the variable state has a property such that the resistance value between the first electrode 124 and the second electrode 128 reversibly transitions between a plurality of variable resistance value ranges in response to application of an electrical signal (a voltage, for example) between the first electrode 124 and the second electrode 128.

The variable resistance layer 126 of the variable resistance element 120 of the memory cell 91 in the initial state may insulate the first electrode 124 from the second electrode 128. With insulation, the insulation resistance can be specifically 2 MΩ or more, for example. The variable resistance layer 126 of the variable resistance element 120 may include a layer formed of an insulator. The insulator can specifically be a material having a resistivity of 30 Ω·m or more, for example. When the variable resistance layer 126 of the variable resistance element 120 is formed of the insulator, the resistance property of the memory cell in the initial state can be stably maintained.

Unlike a variable resistance element in the variable state where the resistance value changes in response to application of an electrical signal, the initial resistance value range can be adjusted to some extent in accordance with the material, size, form, manufacturing condition, and so on of the variable resistance element. For example, specifically in a case where the variable resistance layer 126 has a layered structure, the initial resistance value range can be adjusted as desired in accordance with the thickness of a layer having a high oxygen concentration or the oxygen concentration upon formation; however, it is not possible to adjust the initial resistance value range for each memory cell.

The initial state described above is stable compared to the variable state where the resistance value transitions in response to application of an electrical signal. Therefore, data can be stably retained by using a difference between the initial state and the variable state.

It is assumed that a resistance value used to represent a resistance value range is a resistance value read and obtained when a voltage is applied to an element, the voltage being smaller than a forming stress that makes an element in the initial state transition to the variable state and being smaller than an electrical signal that makes the resistance value of an element in the variable state change between a plurality of variable resistance value ranges.

Note that a forming stress is determined on the basis of the amount of voltage amplitude applied to the memory cell 91, the pulse width, the accumulated time of application, and so on, and their values may differ among the memory cells 91 in the memory cell array 90. The accumulated time of application means the sum of the pulse widths of electrical pulses applied until the resistance state changes from the initial state to the variable state. Therefore, specific values of parameters that define an electrical stress which is at least necessary as a forming stress are values of the voltage, pulse width, accumulated time of application, and so on of an electrical stress applied until the element changes to the variable state in each target memory cell 91, and are not completely fixed values but values that vary to certain degrees. It is inferred that such variations in electrical stresses for forming in respective elements may cause variations in the resistance values of the respective cells that fall within a variable resistance value range thereafter, and therefore, it is difficult to artificially control each element.

Note that a forming stress is generally stronger than an electrical signal applied in order to reversibly change the resistance value of a memory cell in the variable state between a plurality of variable resistance value ranges. Specifically, a forming stress can be stronger than an electrical signal applied in order to change the resistance value of a memory cell in the variable state in terms of at least one of the absolute value of the voltage, the pulse width, and the accumulated time of application.

A variable resistance element in which the resistance value changes in response to application of an electrical signal having a different voltage, a different pulse width, and so on but having the same polarity in the variable state is called a unipolar variable resistance element. More specifically, when an electrical signal (an electrical pulse) having a voltage of +2 V and a width of 1 μsec is applied in a direction so that an electric current flows from the second electrode 128 to the first electrode 124, for example, the resistance value of the variable resistance element changes to a predetermined high-resistance level (a first resistance value range, which is also referred to as an HR level or a high-resistance level). When an electrical signal having a voltage of +4 V and a width of 50 nsec is applied in the direction so that an electric current flows from the second electrode 128 to the first electrode 124, for example, the resistance value of the variable resistance element changes to a predetermined low-resistance level (a second resistance value range, which is also referred to as an LR level or a low-resistance level). Such a variable resistance element in which the resistance value reversibly changes in response to application of an electrical signal having the same polarity is called a unipolar variable resistance element.

In contrast, a variable resistance element in which the resistance value changes in response to application of an electrical signal having a different polarity in the variable state is called a bipolar variable resistance element. More specifically, when an electrical signal having a voltage of +2 V and a width of 50 nsec is applied in the direction so that an electric current flows from the second electrode 128 to the first electrode 124, for example, the resistance value of the variable resistance element changes to the predetermined high-resistance level (the first resistance value range, which is also referred to as the HR level). When an electrical signal having a voltage of +2 V and a width of 50 nsec is applied in a direction so that an electric current flows from the first electrode 124 to the second electrode 128, for example, the resistance value of the variable resistance element changes to the predetermined low-resistance level (the second resistance value range, which is also referred to as the LR level). Such a variable resistance element in which the resistance value reversibly changes in response to application of an electrical signal having a reverse polarity is called a bipolar variable resistance element.

As a matter of course, in order to stabilize an operation of a bipolar variable resistance element, for example, an electrical signal applied in a case of changing the resistance value to the HR level (which is also referred to as increasing the resistance) and an electrical signal applied in a case of changing the resistance value to the LR level (which is also referred to as decreasing the resistance) may differ in the pulse width or the absolute value of the voltage as well as the polarity.

The variable resistance layer 126 may be made of a metal oxide. The variable resistance layer 126 may include a layer made of an oxygen-deficient metal oxide. The metal oxide that makes up the variable resistance layer 126 may be at least one of a transition metal oxide and an aluminum oxide or may be at least one of a tantalum oxide, an iron oxide, a hafnium oxide, and a zirconium oxide.

As a material for the variable resistance layer of a unipolar variable resistance element, a titanium (Ti) oxide, a nickel (Ni) oxide, an aluminum (Al) oxide, and so on can be used. On the other hand, as a material for the variable resistance layer of a bipolar variable resistance element, a tantalum (Ta) oxide, a hafnium (Hf) oxide, an aluminum (Al) oxide, an iron (Fe) oxide, and so on may be used.

Even if an oxide made of the same material is used, both a unipolar variable resistance element and a bipolar variable resistance element may be made depending on the combination with materials for the electrodes and on the layered structure of the oxide, for example. If a tantalum oxide is used as a material for a variable resistance layer, the variable resistance element exhibits a good property, which is specifically illustrated in detail in the present embodiment.

As materials for the first electrode 124 and the second electrode 128, iridium (Ir), platinum (Pt), tungsten (W), copper (Cu), aluminum (Al), titanium nitride (TiN), tantalum nitride (TaN), titanium aluminum nitride (TiAlN), and so on may be used.

In the example illustrated in FIG. 2, the first electrode 124 has a larger area than that of the second electrode 128; however, the form of the first electrode 124 is not limited to this. The first electrode 124 may be in an optimum form as appropriate in accordance with the semiconductor process. For example, the first electrode 124 may be used as part of a wiring line. The base layer 122 can be omitted or changed as appropriate in accordance with the semiconductor process.

The variable resistance layer 126 may be formed by stacking at least two layers, namely, a first variable resistance layer that is connected to the first electrode 124 and a second variable resistance layer that is connected to the second electrode 128.

The first variable resistance layer can be made of a first metal oxide of an oxygen deficient type, and the second variable resistance layer can be made of a second metal oxide having a lower oxygen deficiency level than that of the first metal oxide. The second variable resistance layer may be a layer formed of an insulator. In the second variable resistance layer, a minute local region in which the oxygen deficiency level reversibly changes in response to application of an electrical pulse is formed. The local region is considered to include filaments formed of oxygen vacancy sites. The local region may be a conductive path that passes through the second variable resistance layer. The insulator may be made of a metal oxide, and the conductive path may be made of an oxygen-deficient metal oxide having a lower percentage of oxygen content than that of the insulator.

The term "oxygen deficiency level" means the ratio of deficient oxygen to the amount of oxygen that makes up an oxide having a stoichiometric composition (in a case where a plurality of stoichiometric compositions are present, a stoichiometric composition having the highest resistance value among the plurality of stoichiometric compositions) in a metal oxide. A metal oxide having a stoichiometric composition is more stable and has a higher resistance value compared to metal oxides having other compositions.

For example, in a case where the metal is tantalum (Ta), an oxide having a stoichiometric composition according to the above-described definition is $Ta_2O_5$, which is represented by $TaO_{2.5}$. The oxygen deficiency level of $TaO_{2.5}$ is 0%, and the oxygen deficiency level of $TaO_{1.5}$ is 40% (the oxygen deficiency level=$(2.5-1.5)/2.5=40\%$). The oxygen deficiency level of an oxygen-excess metal oxide has a negative value. Note that description is given herein while assuming that the oxygen deficiency level has a positive value, is equal to zero, or has a negative value unless otherwise noted.

An oxide having a lower oxygen deficiency level is close to an oxide having a stoichiometric composition, and therefore, has a high resistance value. An oxide having a higher oxygen deficiency level is close to metal that makes up the oxide, and therefore, has a low resistance value.

The term "percentage of oxygen content" means the ratio of the number of oxygen atoms to the total number of atoms. For example, the percentage of oxygen content of $Ta_2O_5$ is the ratio of the number of oxygen atoms to the total number of atoms (O/(Ta+O)) and is equal to 71.4 atm %. Therefore, an oxygen-deficient tantalum oxide has a percentage of oxygen content larger than 0 and smaller than 71.4 atm %. For example, in a case where metal that makes up the first metal oxide and metal that makes up the second metal oxide are of the same type, the percentage of oxygen content relates to the oxygen deficiency level. That is, if the percentage of oxygen content of the second metal oxide is larger than the percentage of oxygen content of the first metal oxide, the oxygen deficiency level of the second metal oxide is smaller than the oxygen deficiency level of the first metal oxide.

As the metal that makes up the variable resistance layer, metal other than tantalum may be used. As the metal that makes up the variable resistance layer, at least one of transition metal and aluminum (Al) may be used. As the transition metal, tantalum (Ta), titanium (Ti), hafnium (Hf), zirconium (Zr), niobium (Nb), tungsten (W), nickel (Ni), iron (Fe), and so on can be used. Transition metal can be in a plurality of oxidation states, and therefore, different resistance states can be implemented with an oxidation-reduction reaction.

For example, in a case of using a hafnium oxide, if the first metal oxide has a composition of $HfO_x$, where x is equal to or larger than 0.9 and is equal to or smaller than 1.6, and if the second metal oxide has a composition of $HfO_y$, where y is larger than the value of x, the resistance value of the variable resistance layer can be changed stably and quickly. In this case, the second metal oxide may have a film thickness equal to or larger than 3 nm and equal to or smaller than 4 nm.

In a case of using a zirconium oxide, if the first metal oxide has a composition of $ZrO_x$, where x is equal to or larger than 0.9 and is equal to or smaller than 1.4, and if the second metal oxide has a composition of $ZrO_y$, where y is larger than the value of x, the resistance value of the variable resistance layer can be changed stably and quickly. In this case, the second metal oxide may have a film thickness equal to or larger than 1 nm and equal to or smaller than 5 nm.

The first metal that makes up the first metal oxide may be different from the second metal that makes up the second metal oxide. In this case, the second metal oxide may have a lower oxygen deficiency level than that of the first metal oxide, which means that the second metal oxide may have a high resistance. By employing such a configuration, a larger amount of voltage within a voltage applied between the first electrode 124 and the second electrode 128 upon a resistance change is applied to the second metal oxide, thereby facilitating an oxidation-reduction reaction that occurs inside the second metal oxide.

In a case where a material used for the first metal that makes up the first metal oxide serving as the first variable resistance layer is different from a material used for the second metal that makes up the second metal oxide serving as the second variable resistance layer, the standard electrode potential of the second metal may be lower than the standard electrode potential of the first metal. A standard electrode potential having a higher value represents a property of being difficult to oxidize. As a result, in the second metal oxide having a relatively low standard electrode potential, an oxidation-reduction reaction easily occurs. Note that a resistance-change phenomenon is considered to arise when an oxidation-reduction reaction occurs in the minute local region formed in the second metal oxide having a high resistance, the filaments (conductive paths) change, and the resistance value (oxygen deficiency level) changes accordingly.

For example, by using an oxygen-deficient tantalum oxide ($TaO_x$) for the first metal oxide and using a titanium oxide ($TiO_2$) for the second metal oxide, a stable resistance change operation is achieved. Titanium (standard electrode potential=$-1.63$ eV) is a material of a low standard electrode potential than tantalum (standard electrode potential=$-0.6$ eV). By using, for the second metal oxide, a metal oxide having a lower standard electrode potential than that of the first metal oxide, an oxidation-reduction reaction occurs more easily in the second metal oxide. As another possible combination, an aluminum oxide ($Al_2O_3$) may be used for the second metal oxide that serves as a high-resistance layer. For example, an oxygen-deficient tantalum oxide ($TaO_x$) may be used for the first metal oxide, and an aluminum oxide ($Al_2O_3$) may be used for the second metal oxide.

It is considered that, in any resistance change phenomenon in a variable resistance layer having a layered structure, an oxidation-reduction reaction occurs in the minute local region formed in the second metal oxide having a high resistance, the filaments (conductive paths) in the local region change, and the resistance value changes accordingly.

That is, when a positive voltage is applied to the second electrode 128 connected to the second metal oxide while the first electrode 124 is assumed to be a reference, oxygen ions in the variable resistance layer are drawn towards the second metal oxide. Accordingly, an oxidation reaction occurs in the minute local region formed in the second metal oxide, and the oxygen deficiency level decreases. As a result, it is considered that the filaments in the local region are less likely to be connected to one another, resulting in an increased resistance value.

In contrast, when a negative voltage is applied to the second electrode 128 connected to the second metal oxide while the first electrode 124 is assumed to be a reference, oxygen ions in the second metal oxide are thrust towards the first metal oxide. Accordingly, a reduction reaction occurs in the minute local region formed in the second metal oxide, and the oxygen deficiency level increases. As a result, it is considered that the filaments in the local region are more likely to be connected to one another, resulting in a decreased resistance value.

The second electrode 128 that is connected to the second metal oxide having a lower oxygen deficiency level is made of a material having a higher standard electrode potential than that of the metal, such as a platinum (Pt), iridium (Ir), or palladium (Pd), that makes up the second metal oxide, and that of a material that makes up the first electrode 124, for example. The first electrode 124 that is connected to the first metal oxide having a higher oxygen deficiency level may be made of a material having a lower standard electrode potential than that of the metal, such as tungsten (W), nickel (Ni), tantalum (Ta), titanium (Ti), aluminum (Al), tantalum nitride (TaN), or titanium nitride (TiN), that makes up the first metal oxide. A standard electrode potential having a higher value represents a property of being difficult to oxidize.

That is, the standard electrode potential V2 of the second electrode 128, the standard electrode potential Vr2 of the metal that makes up the second metal oxide, the standard electrode potential Vr1 of the metal that makes up the first metal oxide, and the standard electrode potential V1 of the first electrode 124 may satisfy the relationships, Vr2<V2 and V1<V2, and may further satisfy the relationships, V2>Vr2 and Vr1≥V1.

By employing the configuration described above, an oxidation-reduction reaction selectively occurs in the second metal oxide in the vicinity of the interface between the second electrode 128 and the second metal oxide, and a stable resistance change phenomenon is made to occur.

The variable resistance layer 126 may at least have a layered structure in which the first variable resistance layer having a composition represented by $TaO_x$ (where 0≤x<2.5) and the second variable resistance layer having a composition represented by $TaO_y$ (where x<y<2.5) are stacked. Needless to say, other layers, such as a third variable resistance layer made of a metal oxide other than a tantalum oxide, for example, may be disposed as appropriate.

Here, $TaO_x$ may satisfy 0.8≤x<1.9, and $TaO_y$ may satisfy 2.1≤y<2.5. The second variable resistance layer containing tantalum may have a thickness equal to or larger than 1 nm and equal to or smaller than 8 nm. By stacking layers having different oxygen deficiency levels, the direction in which the resistance changes in a bipolar variable resistance element can be determined. For example, the second variable resistance layer is disposed close to the second electrode 128, and the first variable resistance layer is disposed close to the first electrode 124. With such a configuration, the resistance increases when a voltage is applied in a direction so that an electric current flows from the second electrode 128 to the first electrode 124, and the resistance decreases when a voltage is applied in a direction so that an electric current flows in the opposite direction. As a matter of course, when a configuration is employed in which the second variable resistance layer is in contact with the first electrode 124 and the first variable resistance layer is in contact with the second electrode 128, the relationship between the resistance change and the direction in which the voltage is applied is flipped.

Properties of Resistance-Change Element in Variable State

Figure 4:
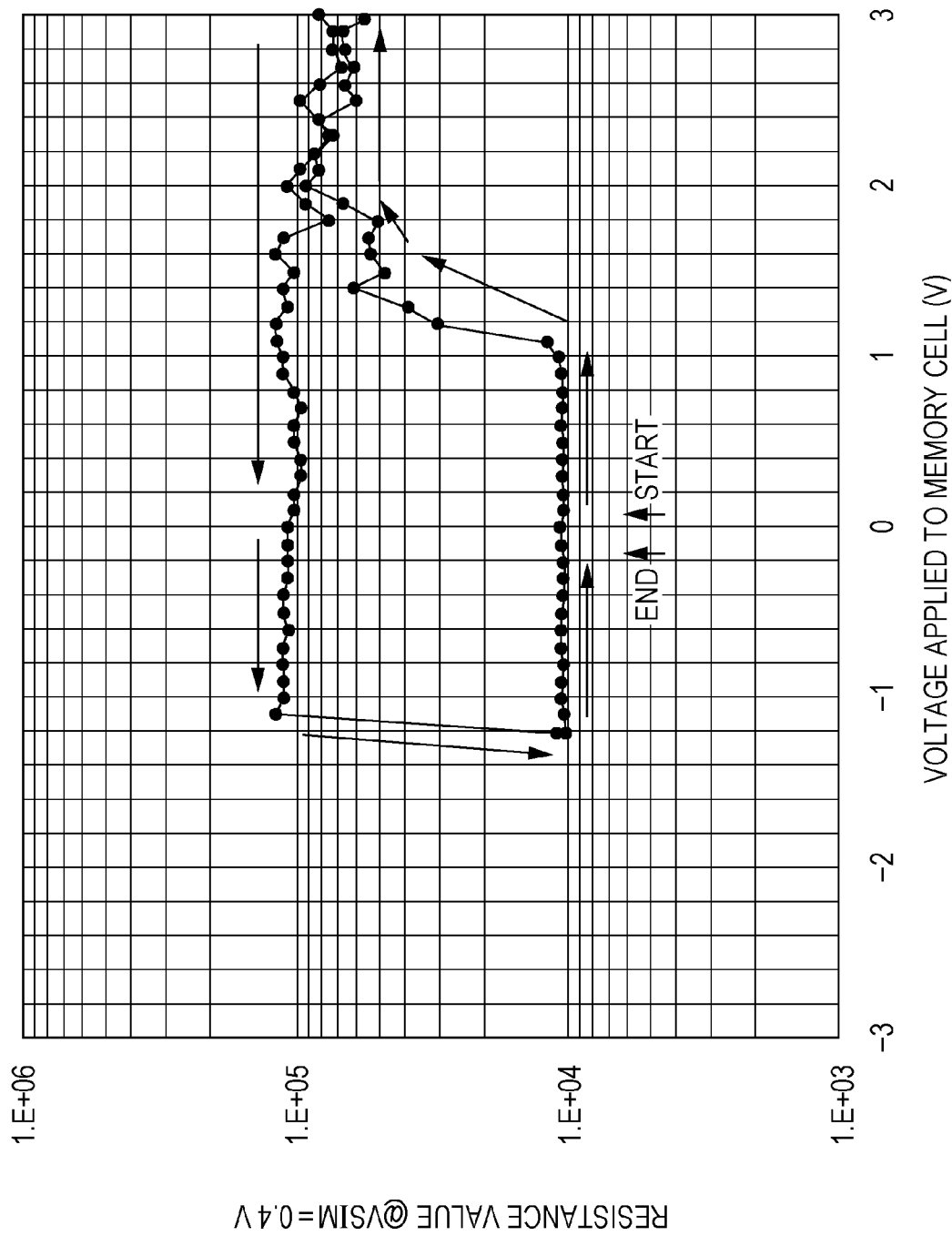
FIG. 4 is a diagram illustrating an example property of a bipolar variable resistance element in a variable state according to an embodiment.

FIG. 4 is a diagram illustrating an example property of a bipolar variable resistance element in the variable state. In FIG. 4, the first electrode 124 is made of TaN, and the second electrode is made of Ir. The variable resistance layer 126 at least has a layered structure in which a first tantalum-containing layer having a composition represented by $TaO_x$ (where 0<x<2.5) and a second tantalum-containing layer having a composition represented by $TaO_y$ (where x<y) are stacked. The first tantalum-containing layer is in contact with the first electrode 124, and the second tantalum-containing layer is in contact with the second electrode 128. $TaO_x$ satisfies 0.8≤x≤1.9, and $TaO_y$ satisfies 2.1≤y≤2.5. The second tantalum-containing layer has a thickness equal to or smaller than 8 nm, and the variable resistance layer 126 has a thickness equal to or smaller than 50 nm in total. The area that is in contact with each electrode is equal to that of the variable resistance element used in the measurement illustrated in FIG. 3.

In FIG. 4, the horizontal axis represents the voltage of an applied electrical signal, and the vertical axis represents the resistance value of the variable resistance element after application of the electrical signal (the resistance value is calculated from an electric current that flows in response to application of the readout voltage VR). When the voltage level gradually increases towards the positive polarity side from the start position in FIG. 4, the resistance value starts rising gradually at the point at which the applied voltage exceeds +1.1 V, and reaches about 100 kΩ at the point at which the applied voltage is +2.0 V. In contrast, when the voltage level gradually decreases towards the negative polarity side and falls below −1.1 V, the resistance value drops to about 10 kΩ, which is the resistance value at the start position, as seen from FIG. 4. In this case, in the variable resistance layer 126, the second variable resistance layer is disposed close to the second electrode 128, and the first variable resistance layer is disposed close to the first electrode 124. Application of an electrical signal so that an electric current flows from the second electrode 128 to the first electrode 124 is defied as positive polarity application. Upon positive polarity application, the resistance value of the variable resistance element 120 changes to the HR level. Application of an electrical signal so that an electric current flows in the opposite direction is defied as negative polarity application. Upon negative polarity application, the resistance value of the variable resistance element 120 changes to the LR level. A voltage level with which the resistance value changes from LR to HR is defined as a voltage VH for increasing resistance, and a voltage level with which the resistance value changes from HR to LR is defined as a voltage VL for decreasing resistance. Then, in the case of FIG. 4, it is found that, if the absolute values of VH and VL satisfy |VH|=|VL|=2.0 V or so, the variable resistance element can reversibly transition between the low-resistance state and the high-resistance state to a satisfactory degree with a common supply voltage.

Figure 5:
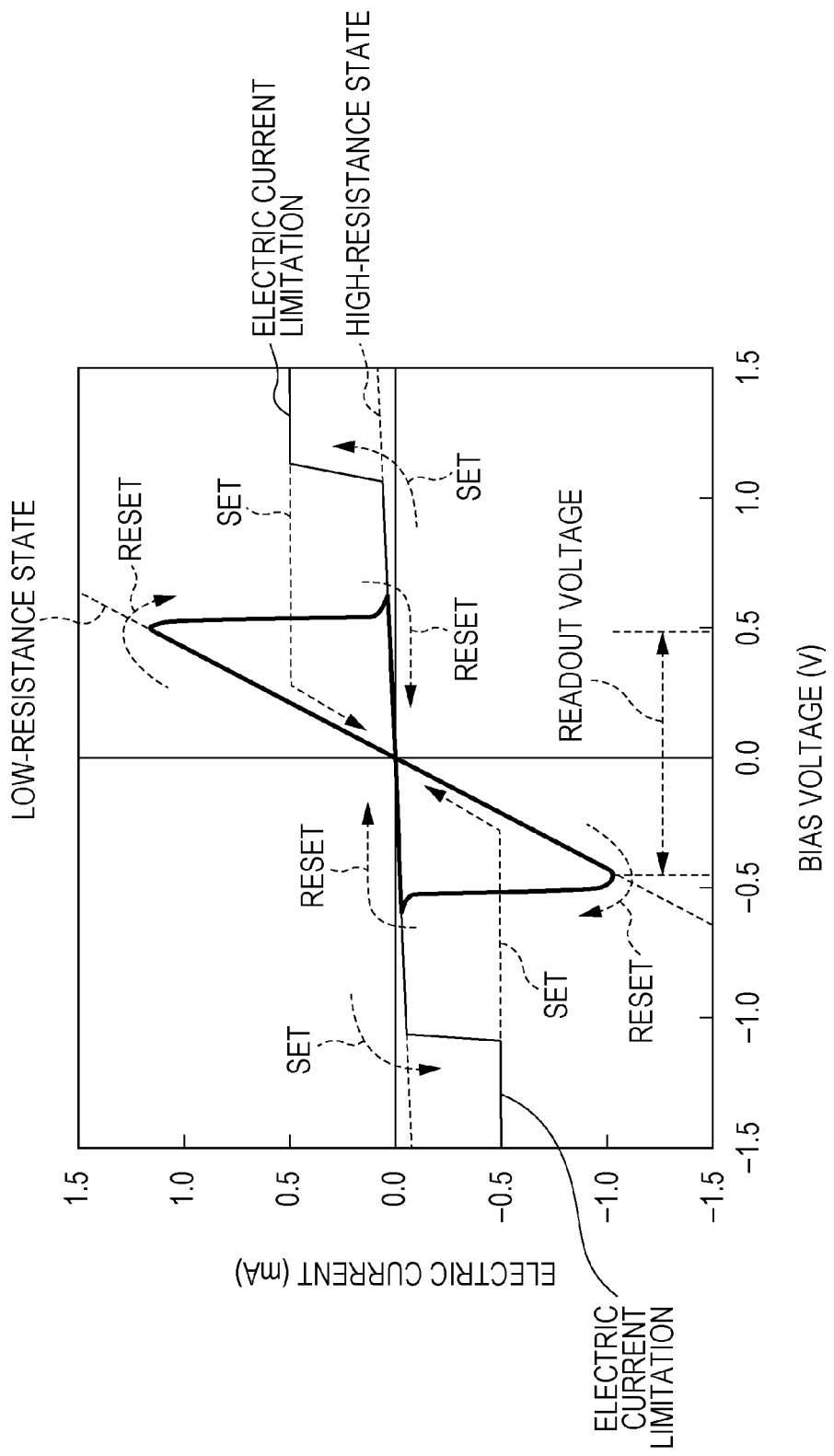
FIG. 5 is a schematic diagram illustrating an example property of a unipolar variable resistance element in a variable state disclosed in related art literature.

FIG. 5 is a schematic diagram illustrating an example property of a unipolar variable resistance element in the variable state disclosed in IEDM Technical Digest, 13-15 Dec. 2004, p. 587. As indicated in this publication, it is known that a variable resistance element having a variable resistance layer made of NiO, $TiO_2$, $HfO_2$, and $ZrO_2$ exhibits a unipolar property and that a variable resistance layer made of transition metal oxides thereof is an insulator immediately after manufacturing and transitions to the variable state when a conductive path is formed therein as a result of a process of applying a forming stress.

Depending on a combination of materials for the variable resistance layer and the electrodes and on a material for an impurity doped to the variable resistance materials, for example, a unipolar-type element in which the resistance changes symmetrically on the positive voltage side and on the negative voltage side can be obtained. FIG. 5 illustrates the property of such an element.

In the example illustrated in FIG. 5, when the absolute value of the bias voltage exceeds 0.5 V, the element transitions to a reset state, namely, to the HR level, and when the absolute value of the bias voltage exceeds 1.0 V, the element transitions to a set state, namely, to the LR level. Application of electrical signals having different voltages and the same polarity can make the element reversibly transition between the two resistance states. However, the unipolar variable resistance element having the property as illustrated in FIG. 5 can be used as a bipolar variable resistance element if the unipolar variable resistance element is controlled so as to increase the resistance by applying an electrical signal having a voltage of equal to or larger than +0.5 V and smaller than +1 V and the positive polarity and so as to decrease the resistance by applying an electrical signal having a voltage of equal to or smaller than −1 V (the absolute value is 1 V or more) and the negative polarity. In the present embodiment, both the bipolar type and the unipolar type can be used.

A variable resistance element may be used as a multivalued memory in which the resistance value reversibly transitions among three or more variable resistance value ranges depending on a combination of the voltage (absolute value) and width of an applied electrical signal, the number of times the electrical signal is applied, and so on. For example, an element having a variable resistance layer made of a tantalum oxide exhibits a good property and can be applied to a multivalued memory.

In such a variable resistance element (ReRAM element), a resistance change occurs when a conductive path that electrically connects the second electrode 128 with the first electrode 124 is generated in the variable resistance layer 126, which is observed as a result of a cross-sectional analysis. It is found that the conductive path has a diameter of 30 to 10 nm or less, which is smaller than the wiring width of wiring made in a leading-edge fine semiconductor process. That is, regarding the property of the variable resistance element described above, a similar stable resistance change property can be maintained even if the variable resistance element is manufactured through an ultrafine semiconductor process, which is considered to be the limit of lithography processing.

A process for forming a variable resistance layer of a variable resistance element (ReRAM element) does not require high-temperature processing exceeding several hundred degrees C. Therefore, degradation of properties of a complementary metal-oxide semiconductor (CMOS) transistor due to a heating process does not occur. That is, a variable resistance element is characterized in that the variable resistance element has excellent compatibility with a semiconductor process compared to a memory element, such as a flash memory, using a floating-gate transistor, and that the variable resistance element maintains reliability even if a manufacturing process becomes finer. Accordingly, even in a case where a logic circuit, such as a controller, and a variable resistance element are formed on the same chip, for example, the variable resistance element can be formed while properties of the logic circuit are less affected. Further, by using the same process for the logic circuit and the variable resistance element, manufacturing costs can be reduced.

The variable state is a state where the resistance value can reversibly transition between a plurality of variable resistance value ranges in response to application of a plurality of different electrical signals.

The plurality of memory cells 91 included in the memory cell array 90 may include memory cells in the variable state and memory cells in the initial state. In the memory cell array 90, data may be recorded by utilizing a difference, namely, whether each memory cell 91 is in the initial state or in the variable state.

In the memory cell array 90, data can be recorded in each memory cell 91 by using one of first-type data, second-type data, and third-type data described below. The memory cell array 90 may include the memory cell 91 in which third-type data is recorded and the memory cell 91 in which one of first-type data and second-type data is recorded or both first-type data and second-type data are recorded.

The initial resistance value range and variable resistance value ranges can be set so that the resistance value of the memory cell 91 immediately after manufacturing falls within the initial resistance value range but does not fall within any variable resistance value range. The initial resistance value range and variable resistance value ranges can be set so that the resistance value of the memory cell 91 after the state changes to the variable state falls within a variable resistance value range but does not fall within the initial resistance value range. It is well known that a memory cell including a non-volatile storage element formed of a variable resistance element can have these properties. The memory cell 91 having the properties can be manufactured by using various publicly known materials.

The initial state of the memory cell 91 includes a state where some electrical stress other than a forming stress, which is an electrical stress that can change the state to the variable state, is applied to the memory cell 91. The initial state of the memory cell 91 includes a state where the resistance value changes within the initial resistance value range from the resistance value immediately after manufacturing in response to application of some electrical stress other than a forming stress.

The controller 93 may be configured so that recorded data can be read by determining whether the memory cell 91 that is selected is in the initial state or in the variable state.

In the example illustrated in FIG. 3, the element is configured such that the first electrode 124 is made of TaN (tantalum nitride), the second electrode 128 is made of Ir (iridium), the variable resistance layer 126 is made of a tantalum oxide, the variable resistance layer 126 has a thickness of 50 nm or less in total, and the variable resistance layer 126 has a layered structure that includes two layers having different oxygen concentrations. One of the two layers that is in contact with the first electrode 124 is a layer having a lower oxygen concentration and has a composition of $TaO_x$, where $0<x<2.5$. The other layer that is in contact with the second electrode 128 is a layer having a higher oxygen concentration, has a composition of $TaO_y$, where $y≥2.1$, and has a thickness of about 5.5 nm. The area of the contact face between the first electrode 124 and the variable resistance layer 126 and the area of the contact face between the second electrode 128 and the variable resistance layer 126 are 0.25 μm² or less.

Now, a change in the state of a memory cell is specifically described. In the following description, the terms "HR state" and "LR state" are used. The term "HR state" means a state where an HR pulse (resistance-increasing pulse) is applied to a memory cell. The term "LR state" means a state where an LR pulse (resistance-decreasing pulse) is applied to a memory cell.

In a case of applying a forming stress, a pulse having a voltage of +3.5 V and a pulse width of 5 μsec is applied accumulatively. By applying appropriate accumulative pulses to each cell, the memory cell in the initial state (1) in FIG. 3 transitions to the initial HR state (2). After the transition to the initial HR state, a pulse having a voltage of −2.4 V and a pulse width of 50 nsec, which is a resistance-decreasing pulse (a pulse for changing the resistance value of the element so as to fall within the second resistance value range from the first resistance value range, which is a second electrical signal), is applied. As a result, the memory cell transitions to the first digital data set state (3). When a pulse having a voltage of +1.8 V and a pulse width of 50 nsec, which is a resistance-increasing pulse (a pulse for changing the resistance value of the element so as to fall within the first resistance value range from the second resistance value range, which is a first electrical signal), is further applied to the cell in the first digital data set state, the resistance value changes to fall within the first resistance value range. Thereafter, the memory cell is a cell in the variable state. That is, in a case where the resistance value of a memory cell is used to generate digital ID data of the present disclosure, the resistance value is used in the first digital data set state illustrated in FIG. 3. In the example of the present disclosure, data in the state (3) in FIG. 3 is used as first digital data. However, also in the initial state (1), the resistance values vary due to manufacturing variations, and the variations in the resistance values are irreproducible. Therefore, a scheme described below can be applied to this case.

The process for pulse application is not limited to the procedure described above. For example, a process is performed in which the first electrical signal and the second electrical signal are alternately and repeatedly applied to the memory element a plurality of times after the memory element has entered the variable state to make the memory element transition between the HR state and the LR state a plurality of times, the process ends while the memory element is finally in the LR state, and the state that is finally set is assumed to be the first digital data set state (3).

The properties of resistance value variations in the first digital data set state illustrated in FIG. 3 are described with reference to FIG. 6.

Figure 6:
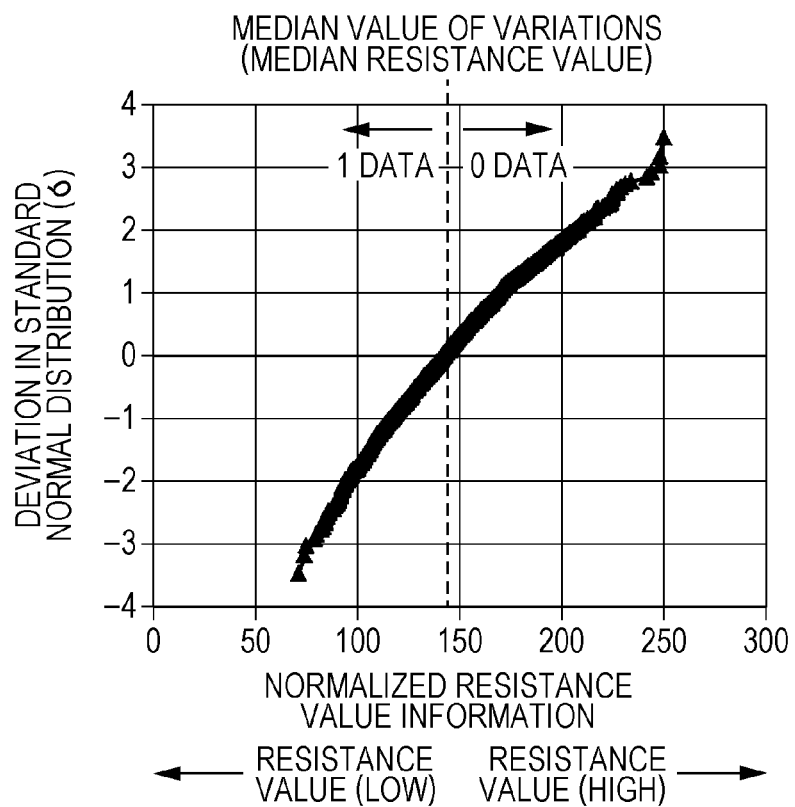
FIG. 6 is a diagram illustrating, with a plot, a relationship between normalized resistance value information in a first digital data set state and the deviation in the standard normal distribution of variations in the memory cells according to an embodiment.

FIG. 6 is a diagram illustrating, with a plot, a relationship between normalized resistance value information in the first digital data set state (3) in FIG. 3 and the deviation in the standard normal distribution of variations in the memory cells.

As illustrated in FIG. 6, the normal distribution relating to the memory cells is approximately linear relative to the resistance value information, which indicates that variations in the distribution are considered to be an extremely random distribution phenomenon. As illustrated in FIG. 6, resistance value information corresponding to the median value of the variation distribution (also referred to as a median resistance value or a binarization reference value) is detected, the resistance value of each memory cell in the first digital data set state is compared with the median resistance value in terms of the magnitude relationship, and digital data 1 or 0 is assigned to the memory cell on the basis of the result of comparison. By using the randomness of the resistance value variations, unique and random first digital data can be created for each non-volatile memory device.

Figure 7:
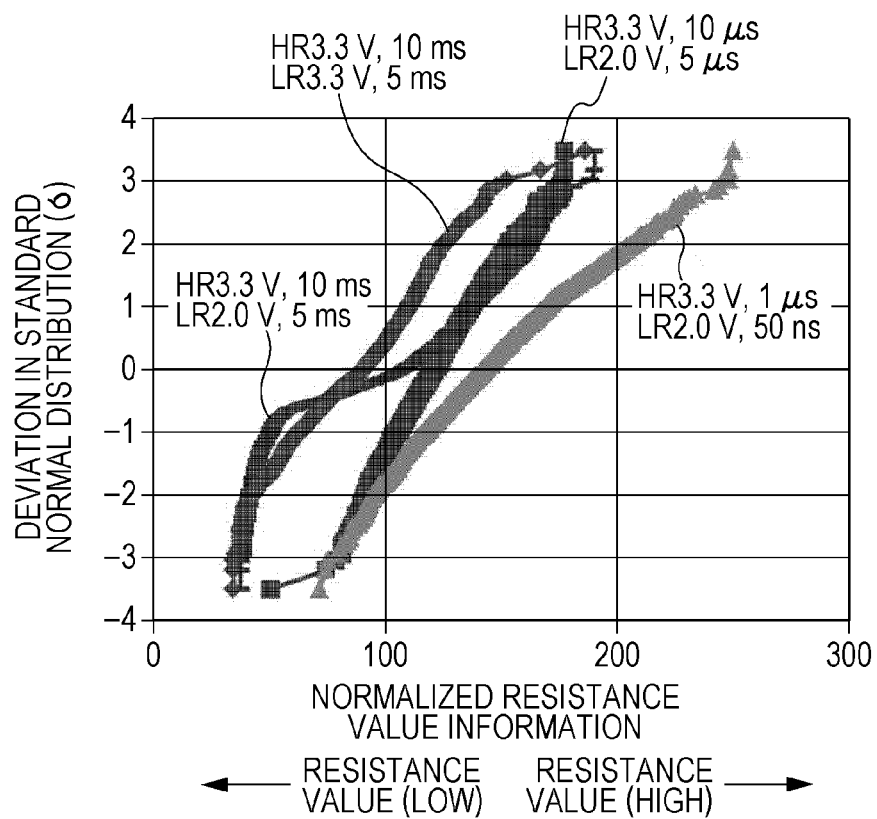
FIG. 7 is a diagram illustrating variation distributions when a transition to the first digital data set state takes place under various voltage pulse conditions according to an embodiment.

A reason why the first digital data of the present disclosure is irreproducible is described with reference to FIG. 7. FIG. 7 is a diagram illustrating variation distributions when a transition to the first digital data set state (3) in FIG. 3 described above takes place under various voltage pulse conditions. Variations are observed while various conditions are assumed including a high energy condition that the voltage is 3.3 V, which is the upper withstand voltage of the transistor, and the pulse width is 10 ms, which is hundred thousand times the usual pulse width, and a weak pulse condition that the voltage is 2 V or so, which is lower than the usual voltage. In general, if an apparent window is present between the distribution of the resistance values written under a condition that low pulse energy is applied and the distribution of the resistance values written under a condition that high pulse energy is applied, any data can be written by using the two conditions for application. However, as seen from FIG. 7, although the distributions deviate slightly differently and the maximum values and the minimum values are slightly different, the median value of the distribution under each condition generally overlaps the distributions under the other conditions. That is, due to this variation phenomenon, it is not possible to perform reproduction in principle in which any data is written by artificially changing a write condition while using the median value as a reference.

The possible reasons why, among a group of memory cells that fall within the same resistance value range, some memory cells have low resistance values and some memory cells have high resistance values, as in the distributions illustrated in FIG. 7, include the fact that a memory cell for which forming is completed is randomly generated, for example, as well as process variations and form variations in the variable resistance elements.

As described above, vacancy sites in a metal oxide are randomly located in each memory cell, and the vacancy sites are connected to each other with forming to form a filament. Therefore, even if a predetermined electrical stress is applied to a plurality of memory cells in the initial state, memory cells in which forming is completed are randomly generated statistically, which has been confirmed by the present inventors in a preliminary experiment. Accordingly, even if a uniform stress is applied to a plurality of memory cells, the time taken for a filament to be formed and for the state to change to the initial HR state (2) in FIG. 3 described above differs from element to element stochastically. As a result, the number and the concentration of vacancy sites in a metal oxide in the variable resistance element vary from element to element. Variations in the concentration and the number of vacancy sites are specific to each element, and the magnitude of the resistance value derived from the variations is specific to each element.

Figure 8:
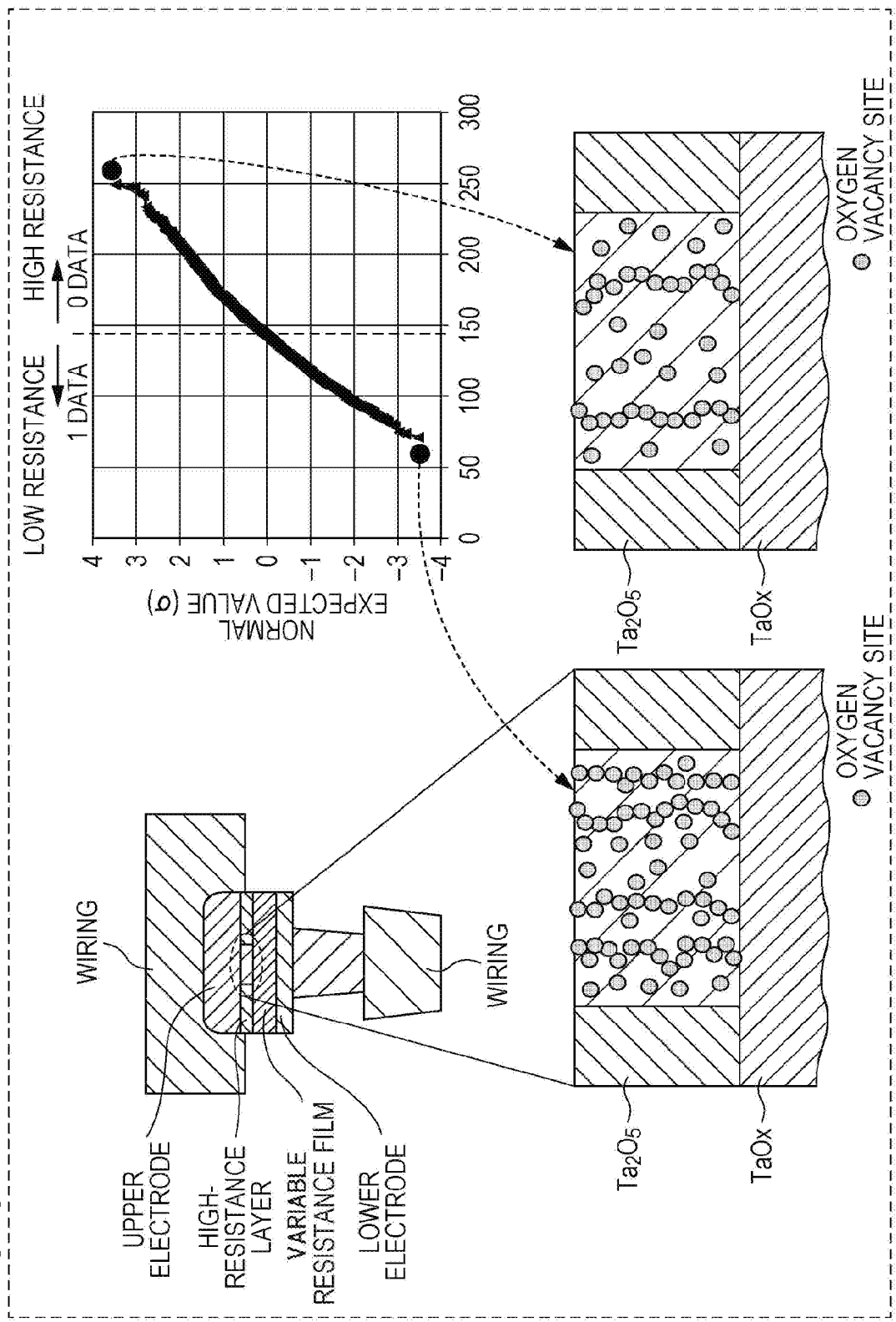
FIG. 8 is a diagram illustrating the fact that the number of generated filaments differs depending on the variable resistance element according to an embodiment.

FIG. 8 illustrates the fact that the number of generated filaments differs depending on the variable resistance element. In response to initial pulse application (forming), oxygen vacancy sites are generated at random locations at a random concentration in each element. An element in which a relatively larger number of vacancies are generated has a low resistance, and an element in which a relatively smaller number of vacancies are generated has a high resistance, which causes variations. These variations are not controllable.

As illustrated in FIG. 8, in a case where a large number of oxygen vacancy sites are generated and filament paths are easily formed, the resistance value of the variable resistance element becomes lower. In contrast, in a case where the concentration of oxygen vacancy sites is low in at least part of a variable resistance element, filament paths are not easily formed, and therefore, the resistance value of the variable resistance element becomes higher. The resistance values of the elements vary, and such variations are not artificially controllable. It is considered that, for any material in which a filament path is formed by oxygen vacancy sites or the like being connected to each other, a similar mechanism can be applied as described above.

Note that, in the memory cell structure illustrated in FIG. 2, it is assumed that a positive voltage applied to the second electrode 128 while the first electrode 124 is assumed to be a reference has a positive polarity.

For example, the first electrode 124 and the second electrode 128 may be made of platinum (Pt), the variable resistance layer 126 may be made of a hafnium oxide, the variable resistance layer 126 may have a thickness of 30 nm, and the element region may have a circle shape having a diameter of 3 μm. In a case where the variable resistance layer 126 is made of $HfO_{1.6}$, the initial resistance value is about several MΩ, the high-resistance value range is approximately between 1000Ω and 3000Ω, and the low-resistance value range is approximately between 100Ω and 300Ω. In this case, as a forming stress, a pulse having a voltage of 2 V to 3 V and a pulse width of 100 nsec is accumulatively applied. A resistance-decreasing pulse has a voltage of +1.0 V and a pulse width of 100 nsec, and a resistance-increasing pulse has a voltage of −1.3 V and a pulse width of 100 nsec.

Data recorded to the non-volatile memory device of the present disclosure may include one of first-type data and second-type data or both first-type data and second-type data. The first-type data is recorded by utilizing a difference, namely, whether the resistance value of each memory cell 91 falls within the initial resistance value range. The second-type data may be recorded by using a difference, namely, whether the resistance value of each memory cell 91 falls within at least one of the variable resistance value ranges, without utilizing the difference, namely, whether the resistance value of each memory cell 91 falls within the initial resistance value range. The non-volatile memory device of the present disclosure includes third-type data that is used to generate the first digital data, which is a source of device-specific digital ID data, by using variations in the resistance values of memory cells which fall within one resistance value range among the variable resistance value ranges.

In this case, the memory cell array 90 may include a first write address area and a second write address area, one of first-type data and second-type data or both first-type data and second-type data may be recorded to the first write address area, and a memory cell in a resistance value state from which the first digital data is generated may be in the second write address area. The first write address area and the second write address area need not be physically separated areas. For example, each memory cell 91 may be allocated as the first write address area or as the second write address area on the basis of its address in accordance with a predetermined rule. As a result, the physical location of digital ID data is less likely to be identified, resulting in increased tamper resistance.

A process of applying a forming stress to a plurality of memory cells that constitute the memory cell array 90 can be selectively performed as desired, and therefore, allocation of the capacities to and arrangement of the first write address area and the second write address area can be changed or selected as desired.

FIG. 9 is a diagram illustrating an example of successively reading, from memory cells having resistance values that fall within the same variable resistance value range, the resistance values in the present embodiment. The state where resistance values fall within at least one variable resistance value range means a state where the memory cells are in the same resistance state. That is, in a case where the memory cells are binary-type memory cells, the memory cells are not in the high-resistance state but in the low-resistance state, for example, which corresponds to the first digital data set state (3) in FIG. 3.

It is confirmed that when a resistance-increasing pulse and a resistance-decreasing pulse are alternately applied to elements, the elements reversibly transition between the high-resistance state and the low-resistance state. Thereafter, a resistance-increasing pulse is applied to the elements in the low-resistance state only once to make the elements in the high-resistance state. Subsequently, a read operation is successively performed 1000 times without applying a resistance-decreasing pulse or a resistance-increasing pulse, and resistance value information about the elements is read. The read operation is performed at 5 μsec intervals.

In FIG. 9, the horizontal axis represents the number of read operations, the vertical axis represents normalized resistance value information, and fluctuations in resistance values of three variable resistance elements having the same configuration are illustrated. Resistance value information mentioned here is information obtained by a read circuit of a discharge-type described below. Resistance value information having a larger value indicates a higher resistance value, and resistance value information having a smaller value indicates a lower resistance value. It is confirmed from FIG. 9 that when reading from elements in the same resistance state is repeatedly performed, the resistance values change randomly. Such a phenomenon in which resistance values randomly change can occur also in the low-resistance state.

A fluctuation in a resistance value or a change in a resistance value described here corresponds to a state where an electrical pulse that changes the resistance state is not applied, that is, a phenomenon in which a resistance value read from the same memory cell in the same resistance state changes over time.

Figure 10A:
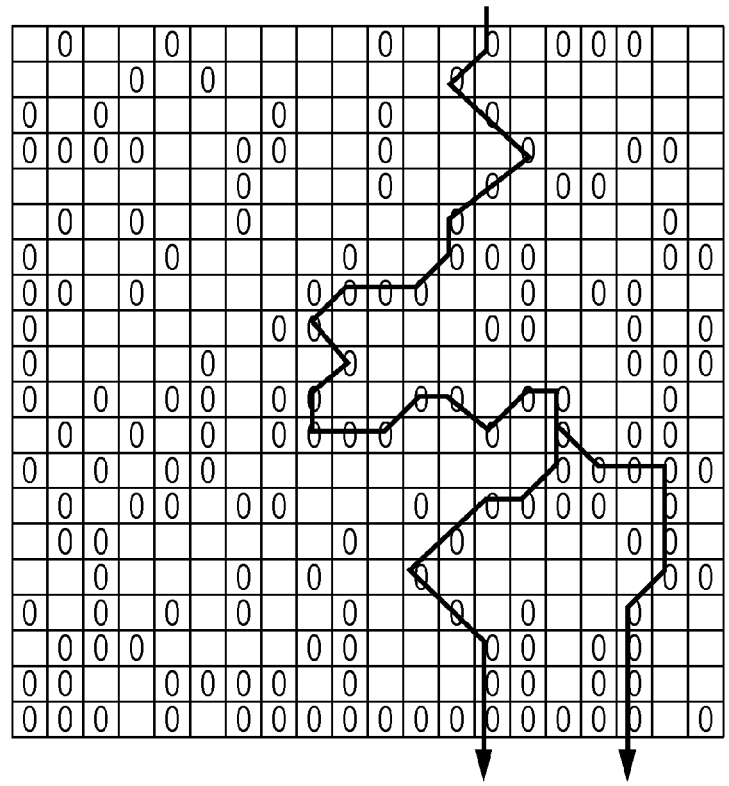
FIG. 10A is a diagram illustrating an example result of simulating the formation of filaments in a variable resistance layer using a percolation model in a case where the state is set to a certain resistance state according to an embodiment.
Figure 10B:
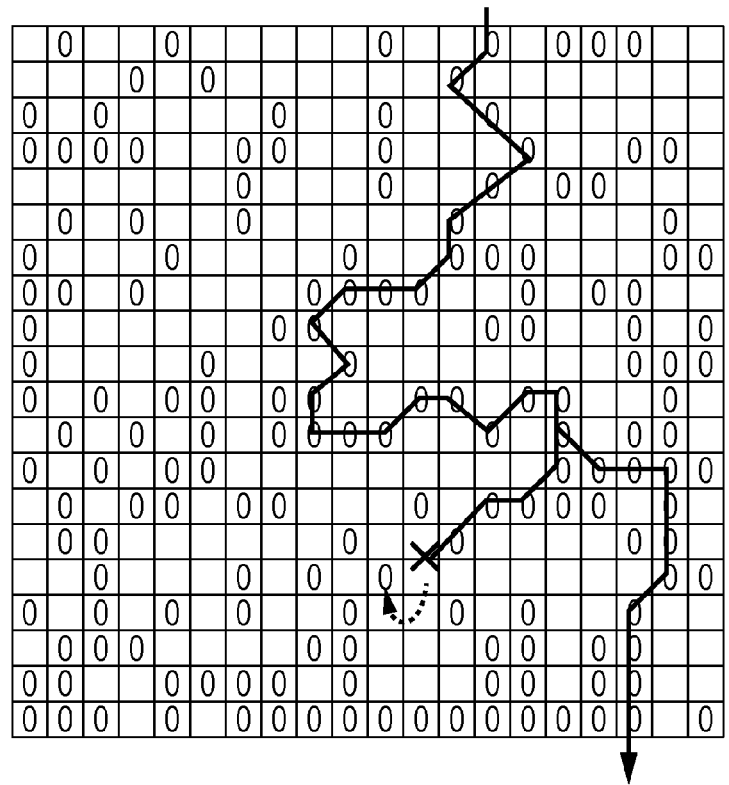
FIG. 10B is a diagram illustrating an example result of simulating the formation of filaments in a variable resistance layer using a percolation model in a case where the state is set to a certain resistance state according to an embodiment.

FIGS. 10A and 10B are diagrams illustrating example results of simulating the formation of filaments in a variable resistance layer (in a local region, for example) using a percolation model in a case where the state is set to a certain resistance state.

A percolation model is a model based on a theory that when the concentration of vacancy sites or the like that are randomly distributed in a variable resistance layer exceeds a certain threshold, the probability of connections among the vacancy sites or the like being formed increases. Here the term "vacancy" means a state where oxygen is deficient in a metal oxide, and the term "concentration of vacancy sites" corresponds to the oxygen deficiency level. That is, if the oxygen deficiency level increases, the concentration of vacancy sites also increases.

In the simulations illustrated in FIGS. 10A and 10B, it is approximately assumed that oxygen ion sites in a variable resistance layer are gridded regions (sites), and a filament formed of vacancy sites that are stochastically formed is obtained with a simulation. In FIGS. 10A and 10B, a site that contains "0" represents a vacancy site formed in the variable resistance layer. On the other hand, a blank site represents a site occupied by an oxygen ion, that is, a high-resistance region in which a conductive path is not formed. A cluster of vacancy sites indicated by a solid arrowed line (an aggregate of vacancy sites connected one by one in the up-down direction, the right-left direction, or in diagonal directions) represents a filament formed in the variable resistance layer when a voltage is applied in the up-down direction in FIGS. 10A and 10B, that is, a path through which an electric current flows.

As illustrated in FIG. 10A, a filament through which an electric current flows between the bottom face and the top face of the variable resistance layer is formed of a cluster of a series of vacancy sites from an upper end vacancy site to a lower end vacancy site among vacancy sites that are randomly distributed. According to the percolation model, the number and forms of filaments formed are stochastically determined. The distributions of the number and forms of filaments result in a varying resistance value of the variable resistance layer.

When oxygen ions are introduced into filaments in response to a resistance-increasing pulse described above, the oxygen ions are coupled to vacancy sites to thereby cut some filament paths, resulting in a transition to the high-resistance state. In contrast, when a resistance-decreasing pulse is applied, oxygen ions are detached, vacancy sites are formed, a filament path is reproduced, and a transition to the low-resistance state takes place. If the difference in the number of filament paths between the high-resistance state and the low-resistance state is sufficiently large, the difference in the resistance value becomes larger, and a margin for determining the resistance value increases.

Now, the mechanism of the phenomenon in which the resistance value of an element in the same resistance state fluctuates as illustrated in FIG. 9 is described.

The forms, number, and thicknesses of filament paths based on which the resistance value in each resistance state is determined are not stable in terms of time. That is, when oxygen ions come away from oxygen sites and vacancy sites are generated or when oxygen ions are supplied to vacancy sites and the vacancy sites disappear, the forms, number, and thicknesses of the filament paths slightly change, which is observed as a timewise fluctuation in the resistance value. FIG. 10B is an explanatory diagram illustrating an example of this situation. When only one vacancy site is replaced by an adjacent site, one of the filament paths that are present as illustrated in FIG. 10A is cut off. In this case, the resistance value slightly increases. Although not illustrated in FIG. 10B, when a vacancy site is replaced by an adjacent site, a new filament path may be generated. In this case, the resistance value slightly decreases. The phenomenon in which the resistance value fluctuates as illustrated in FIG. 9 is considered to occur based on the above-described mechanism. Actually, a large number of filament paths as illustrated in FIGS. 10A and 10B are present, and therefore, it is considered that, even if the number of filament paths increases or decrease to some extent, the total number of filament paths does not significantly change. That is, in the fluctuation phenomenon, it is considered that a significant change in the filament paths that may change the resistance state of the memory cell to another resistance state does not occur.

It is considered that the phenomenon in which the resistance value fluctuates in accordance with the mechanism is applicable to any variable resistance element in which the resistance value changes in response to an oxygen ion moving in an oxide. Specifically, as a memory cell having such a property, an element having a first electrode, a metal oxide, and a second electrode stacked in this order can be used, for example. Alternatively, an element having a first electrode, a transition metal oxide, and a second electrode stacked in this order can be used, for example.

As described above, in a memory cell used in a resistive memory device, the phenomenon in which the resistance value slightly fluctuates from the written resistance value occurs. In the first digital data obtained by determining whether digital data is 1 or 0 from the magnitude relationship between the resistance value and the median resistance value illustrated in FIG. 6, error data caused by a fluctuation in the resistance value may be present. The vicinity of the median resistance value corresponds to the median of the variation distribution of the resistance values, and therefore, the number of memory cells that are distributed is largest in the vicinity of the resistance value. In the memory cells in the vicinity of the median, the resistance values randomly fluctuate as described above, resulting in a large number of random error bits.

The present inventors have found issues relating to a written resistance value. That is, an optimal value for the median resistance value changes depending on the left-to-stand time, the temperature environment, the power environment of the device, and so on, the error rate is not stable, and it is not possible to stably generate digital ID data. These issues are described with reference to FIG. 11.

Figure 11:
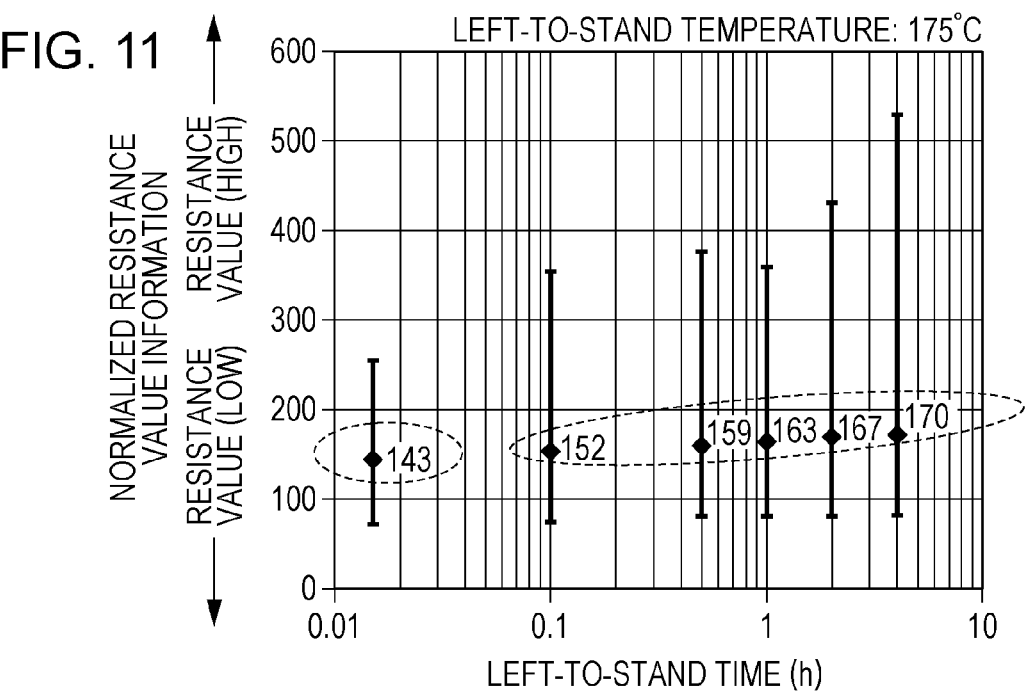
FIG. 11 is a diagram illustrating the variation range and the median resistance value when the resistance values of a group of memory cells for a predetermined number of bits are read at each left-to-stand time, the resistance values having been written while the memory cells have been in the first digital data set state as illustrated in FIG. 3, according to an embodiment.

FIG. 11 illustrates the variation range and the median resistance value when the resistance values of a group of memory cells for a predetermined number of bits are read at each left-to-stand time, the resistance values having been written while the memory cells have been in the first digital data set state as illustrated in FIG. 3.

The number of bits used in this measurement is 1 kbit, and the left-to-stand temperature is set to 175° C. in order to accelerate degradation relative to the left-to-stand time. As seen from FIG. 11, the variation range becomes wider as the left-to-stand time becomes longer, and the median resistance value gradually increases as indicated in the portions surrounded by dashed lines. That is, as the left-to-stand time becomes longer, the distribution of the resistance values shifts towards the high-resistance side.

Figure 12:
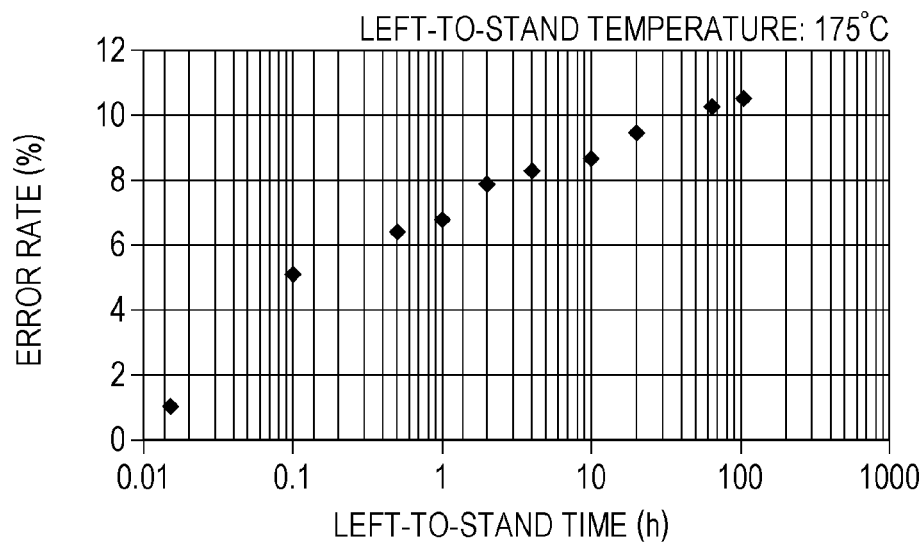
FIG. 12 is a diagram illustrating a relationship between the error rate and the left-to-stand time in a case of extracting written digital ID data on the basis of the initial median resistance value illustrated in FIG. 11 according to an embodiment.

FIG. 12 illustrates a relationship between the error rate and the left-to-stand time in a case of extracting written digital ID data on the basis of the initial median resistance value (143) illustrated in FIG. 11. The error rate indicates the ratio of the difference between the extracted data and the initial ID data. As seen from FIG. 12, the error rate rapidly increases because the optimum median resistance value shifts as the left-to-stand time becomes longer. This phenomenon is significantly affected by not only the left-to-stand time but also a change in the ambient temperature and a change in the supply voltage of the device.

Figure 13:
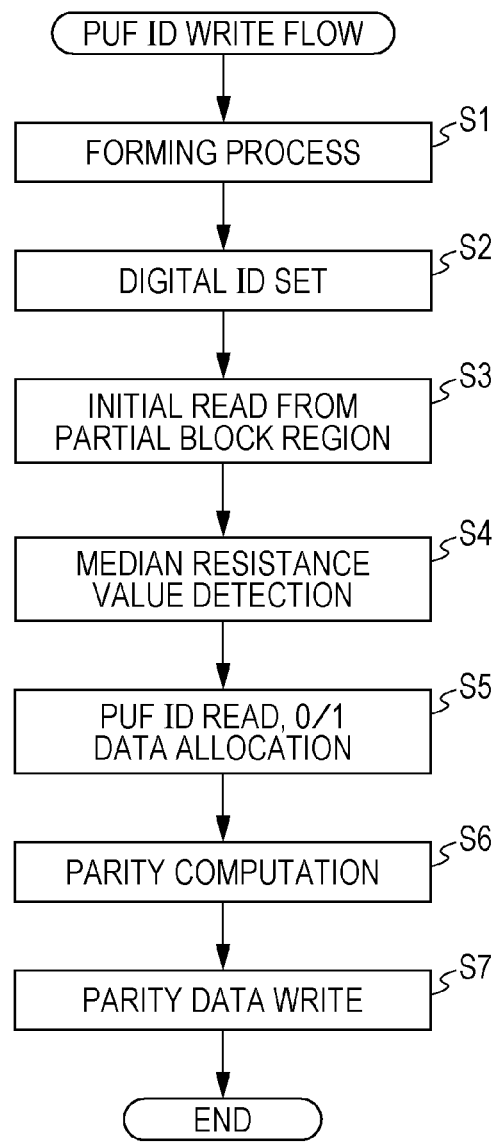
FIG. 13 is a flowchart specifically illustrating an example process flow for generating and writing, to a non-volatile memory device, digital ID data according to an embodiment.
Figure 14:
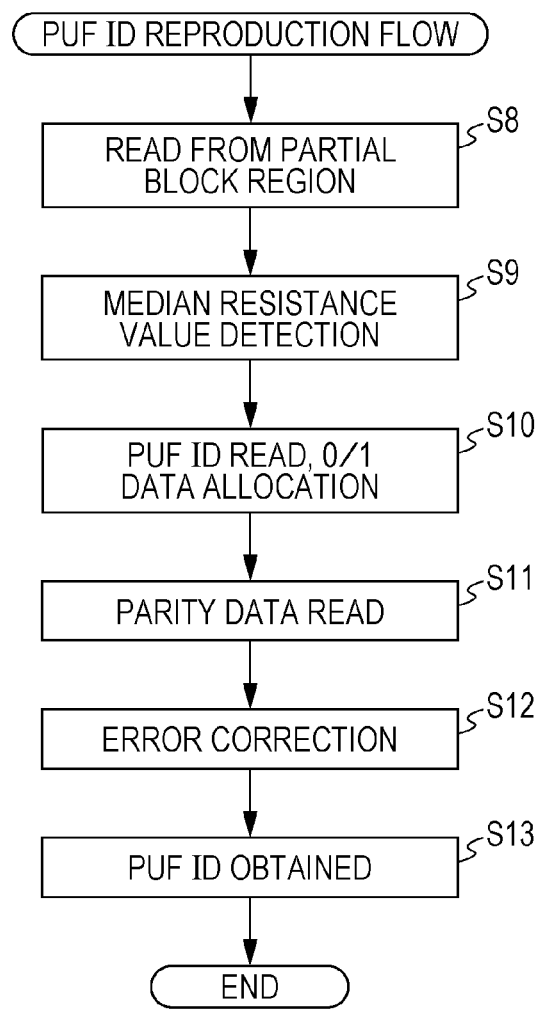
FIG. 14 is a flowchart specifically illustrating an example process flow for reproducing digital ID data according to an embodiment.

Accordingly, the present inventors have devised the flows illustrated in FIG. 13 and FIG. 14.

FIG. 13 is a flowchart specifically illustrating an example process flow for generating and writing, to the non-volatile memory device, digital ID data. This process is performed during an inspection process before shipment of the non-volatile memory device from the factory, for example.

FIG. 14 is a flowchart specifically illustrating an example process flow for reproducing digital ID data. This process is performed each time the non-volatile memory device shipped from the factory is used in the field, for example.

As described above, generated digital ID data may contain error data, and therefore, error correction is performed in order to always obtain true correct ID data. Accordingly, the process performed during an inspection process before shipment of the device is different from the process performed upon field use, namely, upon use of the device in the field, as illustrated in FIG. 13 and FIG. 14.

At the time of an inspection before shipment, each memory cell of the non-volatile memory device is not in the variable state but in the initial state where the resistance value is close to the insulation resistance. As illustrated in FIG. 13, a forming process of applying a forming stress as described above is performed in step S1, resulting in a transition to the initial HR state (2) in FIG. 3. Next, in step S2, a resistance-decreasing pulse is applied to set the state to the first digital data set state (3) in FIG. 3. In step S3, resistance value information about a plurality of memory cells in the first digital data set state is read. In step S4, the median value of the distribution of the resistance value variations is computed from the read resistance value information and retained. In step S5, resistance value information is read again from the plurality of memory cells in the first digital data set state, and digital ID data is generated on the basis of the magnitude relationship between the resistance value information and the retained median value described above.

FIG. 15 illustrates an example digital ID data. As described above, resistance value information about a memory cell in the first digital data set state is compared with the median value of the distribution of the resistance value variations, which serves as a threshold. If the resistance value information is smaller than the median value, data "1" is allocated to the memory cell. If the resistance value information is larger than the median value, data "0" is allocated to the memory cell. As a result, digital ID data with which the non-volatile memory device is uniquely identifiable can be obtained by using the resistance values of memory cells, which are not artificially controllable.

Referring back to FIG. 13, in step S6, parity data used to correct data errors is computed on the basis of the digital ID data. In step S7, the parity data is recorded in a separate different memory cell.

Now, description is given with reference to FIG. 14. When the device is used in the field, resistance value information about a plurality of memory cells in the first digital data set state is read in step S8, and the median resistance value of the distribution of the resistance value variations is computed from the read resistance value information and retained in step S9, as in step S3 and step S4 in the case of an inspection. In step S10, resistance value information is read again from the memory cells in the first digital data set state, and digital ID data is generated on the basis of the relationship between the resistance value information and the retained median resistance value described above. In step S11, the parity data preliminarily saved upon the inspection is read. In step S12, error data in the digital ID data obtained in step S10 is corrected by using the parity data. As a result, the same true digital ID data is always obtained in step S13.

Figure 16:
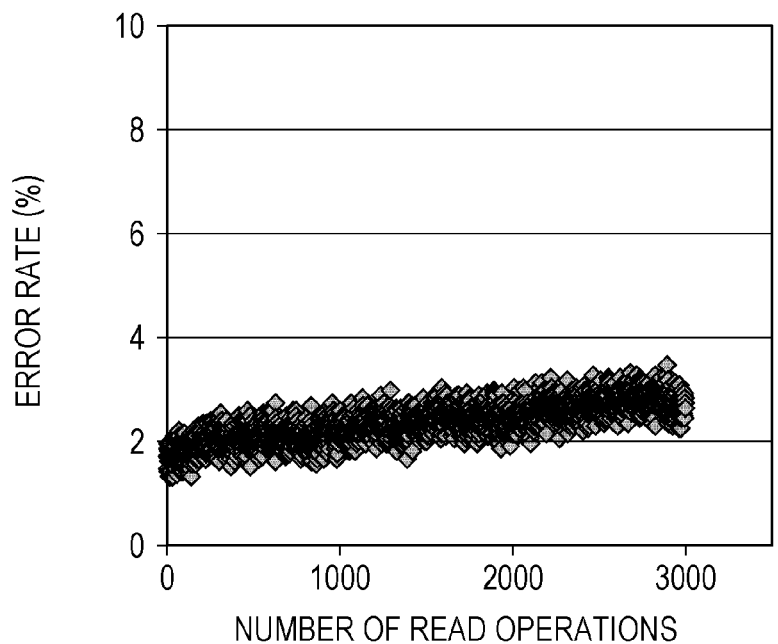
FIG. 16 is a diagram illustrating a changing data error rate before error correction according to an embodiment.

FIG. 16 illustrates a changing data error rate before error correction. This data error rate is a data error rate before error correction when an optimum median resistance value for field use is detected in the process illustrated in FIG. 14 and the detected median resistance value is used to generate digital ID data. This digital ID data before error correction is called raw digital ID data. In FIG. 16, the horizontal axis represents the number of operations of reading digital ID data, and the vertical axis represents the error rate of the corresponding digital ID data. As seen from FIG. 16, an increase in the error rate is suppressed, and the error rate is between 2% and 3%, that is, a good result is obtained.

Figure 17:
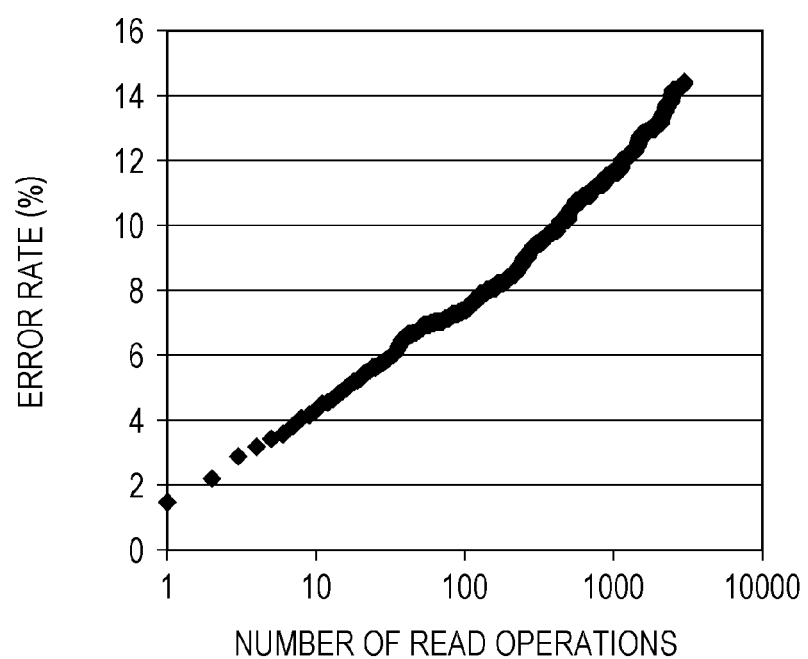
FIG. 17 is a diagram illustrating a relationship between the number of read operations and an accumulated error rate according to an embodiment.

The present disclosure is further characterized by an accumulated error rate. FIG. 17 illustrates a relationship between the number of read operations and an accumulated error rate. An accumulated error rate is an error rate obtained by reading raw digital ID data a plurality of times, incrementing an error bit count by one each time a new different error bit is found, and calculating the error rate from the resulting error bit count. The error rate upon each read operation is between 2% and 3% and is low in FIG. 16; however, a different error bit may be found upon each read operation, and therefore, the accumulated error rate increases as a larger number of read operations are performed. In FIG. 17, 14% of the bits are in error when digital ID is generated 2500 times. That is, a different bit is in error each time a read operation is performed, and ID data before error correction changes from moment to moment. Because of this characteristic, even in a case of a machine learning attack as described above, the learning result is not fixed, and an analysis of true digital ID data fails. That is, it is considered that strong resistance to hacking is achieved.

Now, a specific example configuration for implementing a scheme according to an embodiment of the present disclosure is described. In an example described below, first digital data obtained in accordance with a relationship between resistance value information about non-volatile memory cells and a binarization reference value and second digital data that does not relate to the resistance values of the non-volatile memory cells are generated, and third digital data is generated on the basis of the first digital data and the second digital data and is used as digital ID data to thereby achieve strong resistance to attacks.

Figure 18:
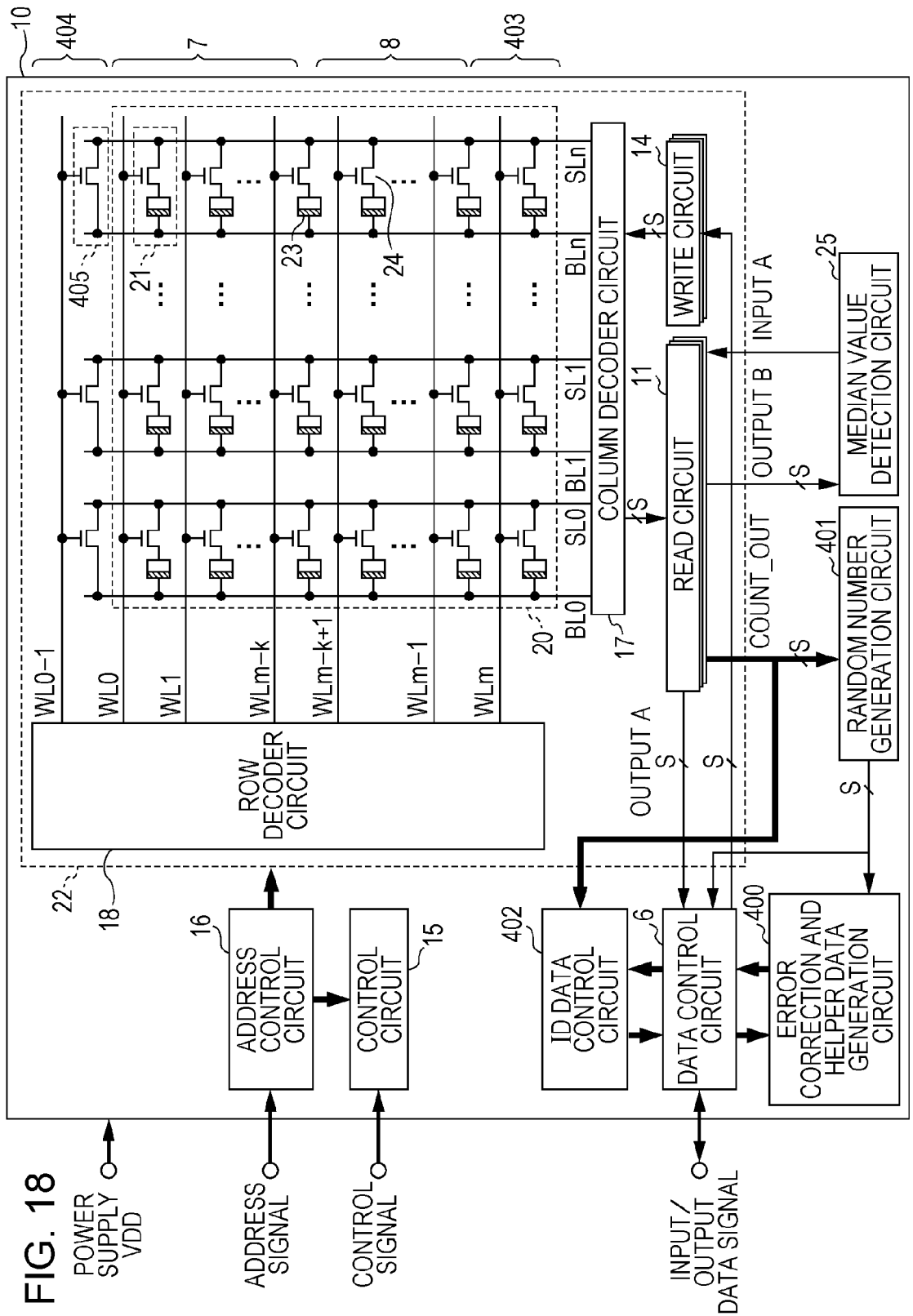
FIG. 18 is a block diagram illustrating a specific example configuration of a non-volatile memory device according to an embodiment.

FIG. 18 is a block diagram illustrating a specific example configuration of a non-volatile memory device according to an embodiment. Note that FIG. 18 illustrates an example, and a specific configuration of the non-volatile memory device according to an embodiment is not limited to the configuration illustrated in FIG. 18.

As illustrated in FIG. 18, a non-volatile memory device 10 according to an embodiment includes a memory main unit 22 formed on a semiconductor substrate. The non-volatile memory device 10 further includes a median value detection circuit 25, an error correction and helper data generation circuit 400, an address control circuit 16, a data control circuit 6, an ID data control circuit 402, and a control circuit 15 that entirely controls the non-volatile memory device 10.

The memory main unit 22 includes a read circuit 11, a write circuit 14, a column decoder circuit 17, a row decoder circuit 18, and a memory cell array 20.

The row decoder circuit 18 selects one word line WL from among a plurality of word lines WL, namely (m+1) word lines WL that are connected to the memory cell array 20.

The column decoder circuit 17 selects S bit lines BL from among a plurality of bit lines BL, namely, (n+1) bit lines BL, S being the number of bits read in parallel, and S source lines SL corresponding to the S bit lines BL from among a plurality of source lines SL, namely, (n+1) source lines SL, and connects the S bit lines BL and the S source lines SL to the read circuit 11 and to the write circuit 14.

Although these selection operations can be performed in accordance with the number of rows and/or columns on which a read operation is performed in parallel or on which a write operation is performed in parallel, it is assumed herein that a parallel read operation or a parallel write operation is performed for every S bits. Therefore, the read circuit 11 and the write circuit 14 described below each have S channels that correspond to the number of bits processed in parallel.

The write circuit 14 writes, in accordance with digital data retained in the data control circuit 6, pieces of data to memory cells 21 that are located at a specific address and that are selected for every S bits, which is the number of bits processed in parallel, by applying a voltage specific to each operation in accordance with control performed by the address control circuit 16 and the control circuit 15.

The read circuit 11 detects a change in an electric current that flows through each bit line via each of the memory cells 21 that are selected by the address control circuit 16 and the control circuit 15 for every S bits, which is the number of bits processed in parallel, by using a read scheme described below, and obtains resistance value information about the selected memory cells 21 as digital count values.

The read circuit 11 of the non-volatile memory device 10 has a COUNT_OUT output terminal, output terminals A and B, and an input terminal A. The read circuit 11 receives a threshold via the input terminal A. The threshold is used for the read circuit 11 to convert a signal obtained from the resistance value information about each memory cell 21 selected by the column decoder circuit 17 into binary data of "0" or "1". As the threshold, a predetermined fixed value or a threshold (input A) output from the median value detection circuit 25 described below is set. The threshold having the predetermined fixed value is used to convert data stored in the memory cell 21 for user data into binary data. The threshold having the predetermined fixed value is set by the control circuit 15. This is not a new requirement, and therefore, detailed description thereof is omitted herein.

The COUNT_OUT output represents resistance value information about a memory cell that has been read. A fluctuation in the resistance value information appears as a random data error in the first digital data and is used in random number generation described below.

The read circuit 11 outputs via the output terminal B a signal obtained from the resistance value information about each memory cell 21 selected by the column decoder circuit 17 to the median value detection circuit 25. This signal is used for the median value detection circuit 25 to calculate a median value necessary for generating the first digital data.

The read circuit 11 outputs via the output terminal A data "0" or "1" that is user data and data "0" or "1" that is the first digital data. The threshold used to generate user data may be different from the threshold used to generate the first digital data as described above.

Description of Areas of Memory Main Unit for Respective Uses

As illustrated in FIG. 18, the memory main unit 22 has a user data area 7, a first digital data area 8, a second digital data area 404, and a random number generation cell area 403 as storage areas.

The memory cell array 20 is segmented into the areas on the basis of the word lines. The user data area 7 corresponds to the word lines WL0, WL1, . . . , and WLm-k, the first digital data area 8 corresponds to the word lines WLm-k+1, and WLm-1, the random number generation cell area 403 corresponds to the word line WLm, and the second digital data area 404 corresponds to the word line WL0-1. The memory cell array 20 includes the plurality of bit lines BL0, BL1, . . . , and BLn that cross the plurality of word lines WL0-1, WL0, WL1, . . . , and WLm formed so as to extend in parallel with one another and that are formed so as to extend in parallel with one another, and includes the source lines SL0, SL1, SL2, . . . , and SLn that are in parallel with one another and that are formed so as to extend in parallel with the bit lines. At each intersection at which each word line and each bit line cross in three dimensions, one memory cell 21 is disposed. However, each memory cell 21 in the second digital data area 404 does not include a variable resistance element 23 and only includes a transistor 24.

Each memory cell 21 other than those in the second digital data area 404 includes the variable resistance element 23 and the transistor 24. The word lines WL0-1, WL0, WL1, WLm-k, WLm-k+1, . . . , and WLm are each connected to the gate terminals of the corresponding transistors 24. The bit lines BL0, BL1, . . . , and BLn are each connected to the second electrodes of the variable resistance elements 23 in the corresponding memory cells 21 in the areas other than the second digital data area 404. The first electrode of each variable resistance element 23 is connected to the second main terminal of the corresponding transistor 24. The source lines SL0, SL1, SL2, . . . , and SLn are each connected to the first main terminals of the corresponding transistors 24. In the second digital data area 404, the bit lines BL0, BL1, . . . , and BLn are each connected to the second main terminal of the corresponding transistor 24.

Regarding Each Area

The variable resistance element 23 operates as a non-volatile memory element in the memory cell 21. The non-volatile memory device 10 is a 1T1R-type non-volatile memory device in which each memory cell 21 includes one transistor 24 and one variable resistance element 23. The selective element in the memory cell is not limited to the transistor described above and may be a two-terminal element, such as a diode, for example.

In the user data area 7, any data of a user (user data) is stored. Upon writing and reading user data, an address in the user data area 7 is selected. In the first digital data area 8, a forming stress is applied in order to generate first digital data, which is a source of device-specific digital ID data, the digital ID data being PUF data. As a result, the group of memory cells in the first digital data area 8 is set to the same resistance value state and has a specific random variation distribution. The random number generation cell area 403 includes a group of memory cells that are set to the same resistance value sate as in the first digital data area 8, and resistance value information is read therefrom for random number generation. The random number generation cell area 403 and the first digital data area 8 may be the same area; however, the two areas are separated for ease of description in the present embodiment. After the random number generation cell area 403 has been set to a specific resistance value state, the cells in the random number generation cell area 403 become read-only cells and are not rewritten except for a case where the resistance value state deviates from a predetermined range due to unforeseen event caused by an unexpected disturbance, such as a defect in the device. The cells in the first digital data area 8 are not rewritten and remain read-only during a period in which the same device-specific ID data is necessary. On the other hand, in a case of intentionally change the ID data or securely discard ID data that is used, the cells in the first digital data area 8 are positively rewritten. The group of cells in the second digital data area 404 is used to generate the second digital data described below. In each memory cell in the group, the variable resistance element 23 is not connected, and only the transistor 24 for selection is connected. Therefore, the cells have substantially the same fixed resistance when seen from the read circuit 11. The on-resistances of transistors manufactured in a leading-edge fine CMOS process significantly vary. Such variations in the resistance components are observed by the read circuit 11 and are used to obtain digital data that is specific to each device and that has at least S bits. In the present embodiment, the second digital data is generated by using variations in the on-resistances of the transistors, for example; however, generation of the second digital data is not limited to this. The second digital data may be generated from at least values that do not relate to the resistance values of the variable resistance elements used in the group of memory cells in the first digital data area 8, which are used to generate the first digital data. For example, data recorded in the user data area 7 as first-type data or second-type data may be used. Specifically, data saved as first-type data is not correctly read in a usual read operation and is resistant to an attack to the data.

The user data area 7, the first digital data area (PUF data area) 8, the second digital data area 404, and the random number generation cell area 403 need not be separated from one another on the basis of the word lines as illustrated in FIG. 18, and may be separated from one another in accordance with any regions on the array. If the areas are physically separated from one another in accordance with more complex rule, the resistance to attacks including analysis and hacking can be increased.

The control circuit 15 controls the column decoder circuit 17 on the basis of a control signal to select either bit lines or source lines and to connect the selected lines to the write circuit 14 upon a write operation or to the read circuit 11 upon a read operation. Thereafter, the control circuit 15 makes the write circuit 14 or the read circuit 11 operate.

The variable resistance element 23 can be similarly configured as the variable resistance element 120 described in the embodiment, and therefore, detailed description thereof is omitted.

In the example illustrated in FIG. 18, n-channel metal-oxide semiconductor (NMOS) transistors are used as the selection transistors in the memory cell array 20; however, the selection transistors are not limited to NMOS transistors and may be p-channel metal-oxide semiconductor (PMOS) transistors. In this case, a different method is used to control the transistors; however, description thereof is omitted because the method is a design matter.

Specific Example of Read Circuit 11

Figure 19:
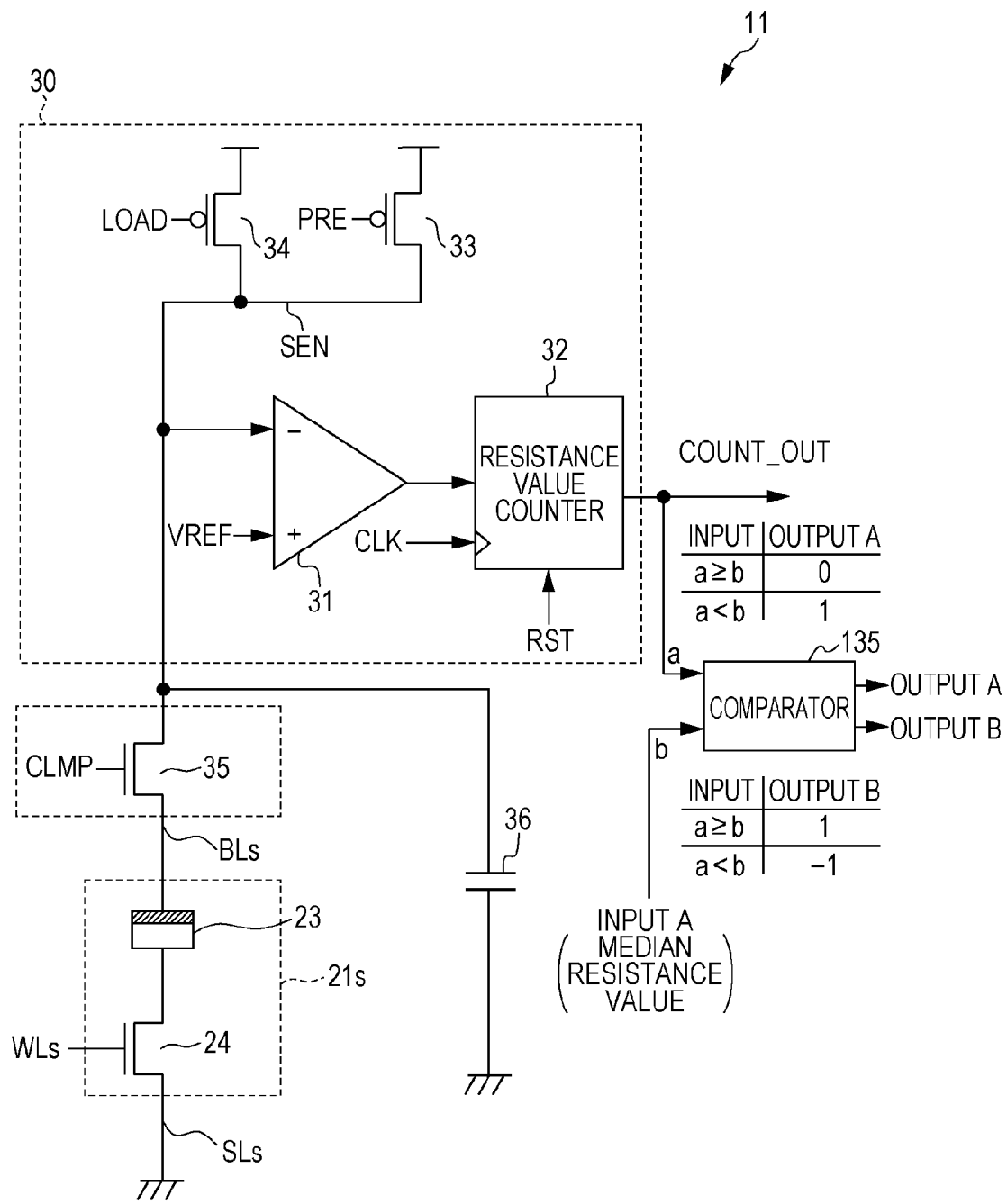
FIG. 19 is a circuit diagram illustrating an example configuration of a read circuit included in the non-volatile memory device according to an embodiment.

FIG. 19 is a circuit diagram illustrating an example configuration of the read circuit 11 included in the nonvolatile memory device 10 according to the present embodiment.

The read circuit 11 includes a sense amplifier circuit 30 based on a discharge-type scheme. The sense amplifier circuit 30 includes a comparator 31, a resistance value counter 32, a precharge PMOS transistor 33, and a load PMOS transistor 34 for a load current.

The resistance value counter 32 is connected to the output of the comparator 31. The count value in the resistance value counter 32 is initialized in response to a reset signal RST dropping to a low level, and the resistance value counter 32 thereafter starts counting on the basis of a clock signal CLK. The clock signal CLK is a signal output from the control circuit 15 and serves as a reference signal for conversion of a discharge time that changes in accordance with the resistance value of the variable resistance element 23 into a count value. The clock signal CLK has a rectangular wave that keeps a constant frequency, for example. Each time the clock signal CLK rises, the count value of the resistance value counter 32 is incremented by one. When the potential of a node SEN drops below VREF, the resistance value counter 32 stops counting, and the count value at this time point is maintained as COUNT_OUT. At this time, a threshold is input from the input terminal A. A comparator 135 compares the value of COUNT_OUT with the threshold from the input terminal A. If the value of COUNT_OUT is equal to or larger than the threshold, the comparator 135 outputs "0" from the output terminal A. If the value of COUNT_OUT is smaller than the threshold, the comparator 135 outputs "1" from the output terminal A. If the value of COUNT_OUT is equal to or larger than the threshold, the comparator 135 outputs "1" from the output terminal B. If the value of COUNT_OUT is smaller than the threshold, the comparator 135 outputs "−1" from the output terminal B. The precharge PMOS transistor 33 has a gate terminal to which a precharge control signal PRE is input, a source terminal to which VDD is input, and a drain terminal to which the node SEN is connected.

The load PMOS transistor 34 has a gate terminal to which a load control signal LOAD is input, a source terminal to which VDD is input, and a drain terminal to which the node SEN is connected.

The read circuit 11 further includes a clamp circuit constituted by a clamp NMOS transistor 35 for clamp voltage application. The clamp NMOS transistor 35 has a gate to which a clamp control signal CLMP is input, a source terminal, and a drain terminal. The node SEN is connected to one of the source terminal and the drain terminal, and a selected memory cell is connected to the other terminal via the column decoder circuit. Note that the column decoder circuit is omitted in FIG. 19.

Now, an output operation performed by the read circuit 11 for outputting the count value (an example of the resistance count value) is specifically described with reference to the circuit diagram of the read circuit 11 (FIG. 19) and the timing charts illustrated in FIGS. 20A and 20B.

Figure 20A:
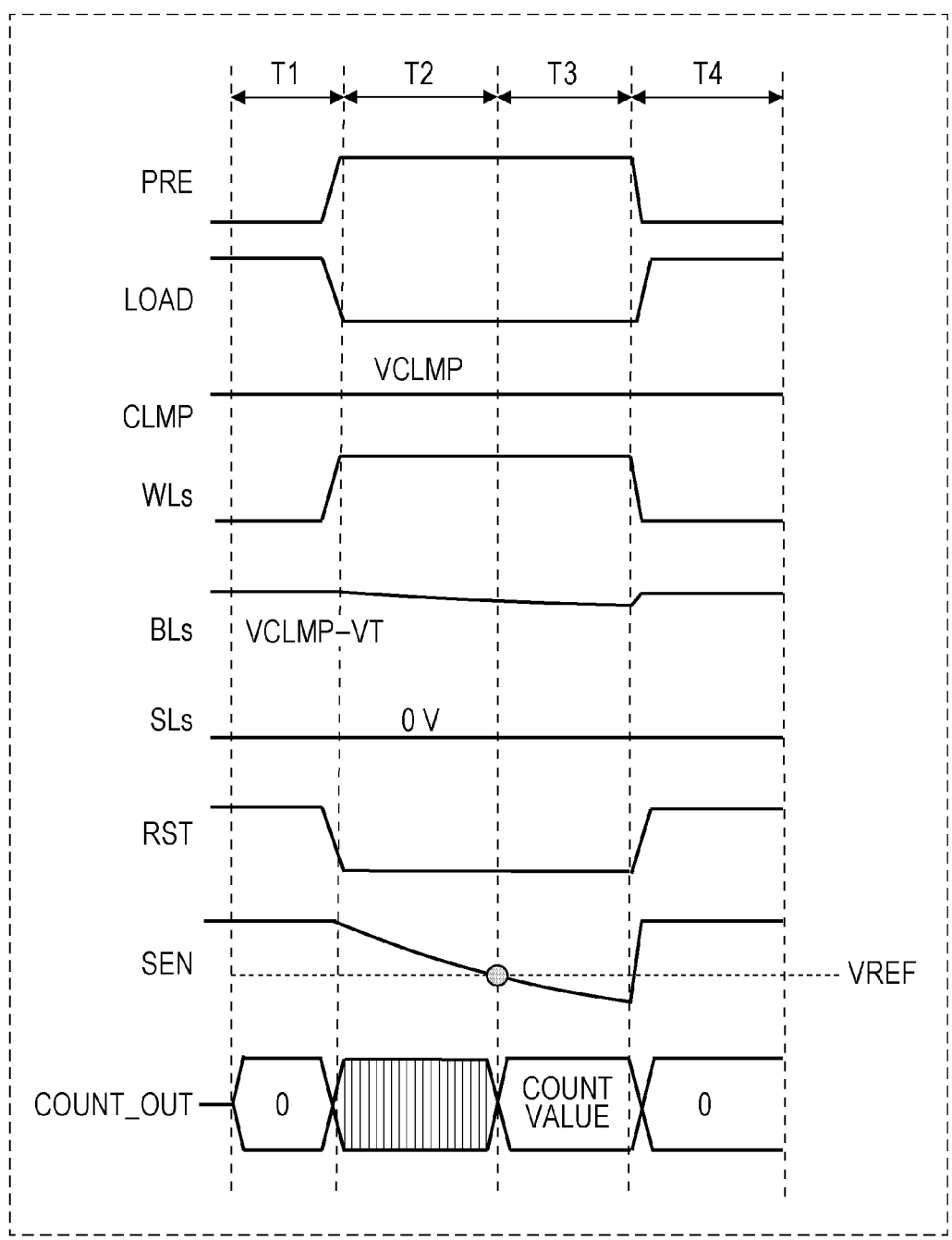
FIG. 20A is a timing chart in a case of reading a selected memory cell using a discharge-type scheme according to an embodiment.

FIG. 20A is a timing chart in a case of reading a selected memory cell using a discharge-type scheme.

In a precharge period T1, the control signal PRE is at a low level, and the precharge PMOS transistor 33 is in the on state accordingly. On the other hand, the control signal LOAD is at a high level, and the load PMOS transistor 34 is in the off state accordingly. The potential of the selected word line WLs is at a low level, and the transistor 24 is in the off state accordingly.

When a voltage VCLMP is applied to the gate terminal of the clamp NMOS transistor 35 of the clamp circuit, the selected bit line BLs is precharged so as to have a potential equal to a value obtained by subtracting VT (a threshold of the clamp NMOS transistor 35) from VCLMP. The selected source line SLs is fixed to GND. The node SEN is precharged to VDD. The control signal RST input to the resistance value counter that is connected to the output of the comparator is at a high level, and therefore, a fixed value of "0" is output from the output terminal COUNT OUT of the resistance value counter.

In a sense period T2, the control signal PRE is set to a high level, and the precharge PMOS transistor 33 enters the off state accordingly. The control signal LOAD drops to a low level, and the load PMOS transistor 34 enters the on state accordingly. The potential of the selected word line WLs is set to a high level, and the NMOS transistor 24 enters the on state accordingly.

Subsequently, a voltage is applied to the selected source line SLs from the selected bit line BLs via the selected memory cell 21s to thereby start discharging. Simultaneously with the start of discharging, the control signal RST input to the resistance value counter 32 drops to a low level, and counting is started. For each count operation, the comparator 31 compares the potential of the node SEN with the value of the reference voltage VREF, and incrementing of the count value continues until the potential of the node SEN drops below the reference voltage VREF. When the resistance value of the variable resistance element 23 upon reading becomes higher, the discharge time becomes longer, and the count value increases accordingly.

The discharge time can be adjusted by adjusting the capacitance of a capacitor 36 in FIG. 19. If the capacitor 36 has a larger capacitance, the discharge time of the node SEN becomes longer and the count value increases accordingly. If the capacitor 36 has a smaller capacitance, the discharge time of the node SEN becomes shorter and the count value decreases accordingly. The capacitor 36 is effective in increasing the detection precision of a low resistance level for which a discharge time is short. The count interval is determined in accordance with the clock signal CLK, and therefore, the operating frequency of the clock signal CLK corresponds to the resolution of the resistance count value. In a case of a low resistance value, however, the discharge time is likely to exceed the resolution of the count value, and the low resistance value might not be distinguishable. In this case, a capacitance load is added to the node SEN to make a delay occur. As a result, the discharge property is intentionally adjusted and the resolution upon detection can be increased. In principle, however, in the discharge-type scheme, when the resistance becomes higher, the discharge time becomes longer, and the inclination of discharge gradually changes accordingly. As a result, the resolution of resistance value information relative to the count value increases. That is, the discharge-type scheme is a scheme with which highly precise resistance value information can be obtained for higher resistances.

In a latch period T3, after the start of discharging, the count value of the resistance value counter 32 when the potential of the node SEN drops below the reference voltage VREF is latched. The latched count value is output as COUNT_OUT and is handled as a count value that represents resistance value information about the variable resistance element 23.

In a reset period T4, when data output is completed, the potential of the selected word line WLs is set to a low level, the transistor 24 of the selected memory cell 21s is turned off, and the read operation ends.

Figure 20B:
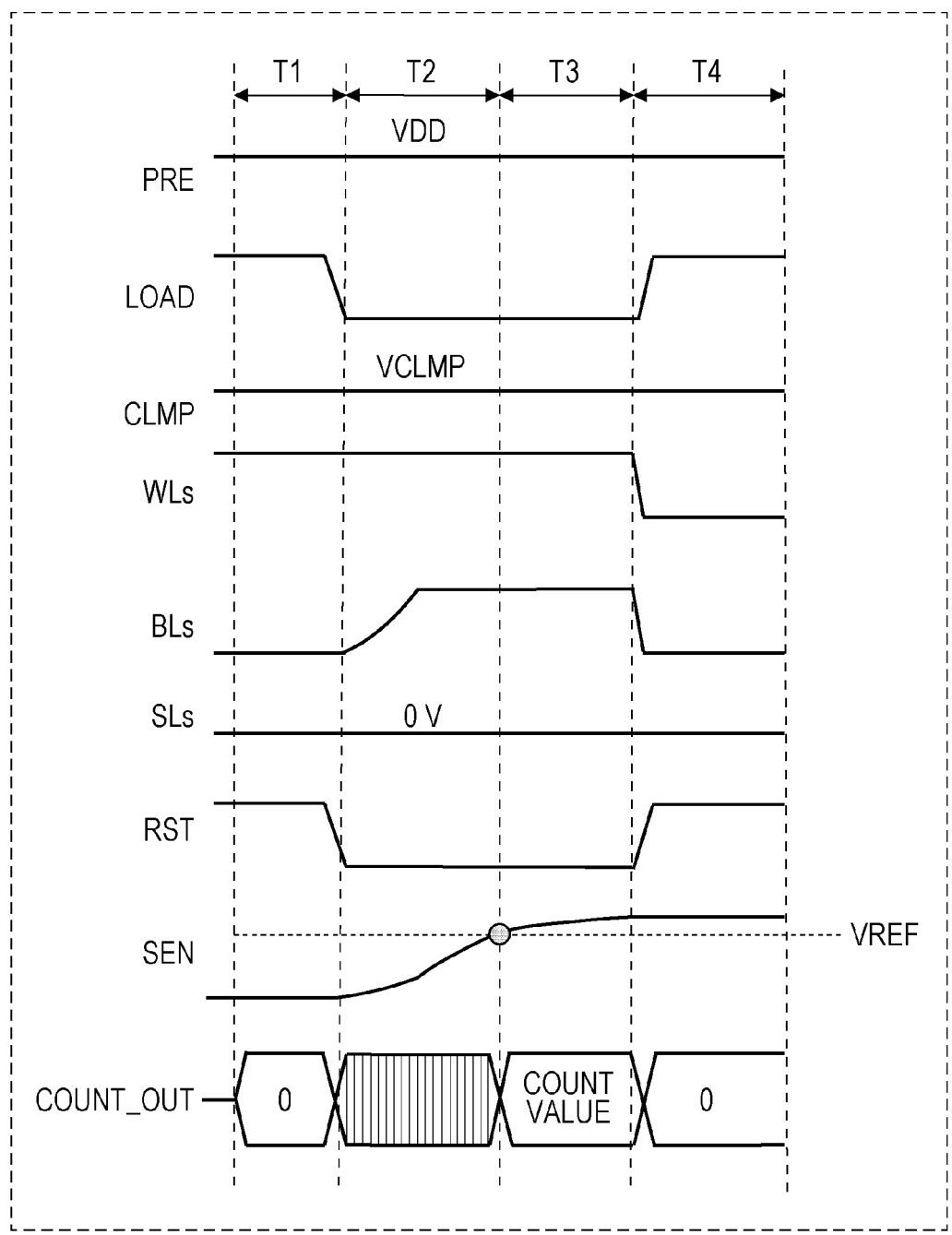
FIG. 20B is a timing chart in a case of reading a selected memory cell using a charge-type scheme according to an embodiment.

FIG. 20B is a timing chart in a case of reading a selected memory cell using a charge-type scheme.

The period T1 is a discharge period, and both the control signals PRE and LOAD are at a high level, and both the precharge PMOS transistor 33 and the load PMOS transistor 34 are in the off state. The potential of the selected word line WLs is at a high level, and the transistor 24 is in the on state.

When the voltage VCLMP is applied to the gate terminal of the clamp NMOS transistor 35 of the clamp circuit, the potential of the selected word line WLs rises to a high level. As a result, the NMOS transistor 24 enters the on state. Accordingly, the node SEN and the selected bit line BLs are connected to GND via the variable resistance element 23 and are discharged to the GND level. The control signal RST input to the resistance value counter 32 connected to the output of the comparator 31 is at a high level, and therefore, a fixed value of "0" is output from the output terminal COUNT_OUT of the resistance value counter 32.

In the sense period T2, the control signal LOAD drops to a low level, and the load PMOS transistor 34 enters the on state accordingly. As a result, an electric current path that passes through the load PMOS transistor 34, the clamp NMOS transistor 35, and the selected memory cell 21s is formed to thereby start charging of the node SEN and the selected bit line BLs. Simultaneously with the start of charging, the control signal RST input to the resistance value counter 32 drops to a low level, and counting is started. For each count operation, the comparator 31 compares the potential of the node SEN with the value of the reference voltage VREF, and incrementing of the count value continues until the potential of the node SEN rises above the reference voltage VREF. When the resistance value of the variable resistance element 23 upon reading becomes lower, the charge time becomes longer, and the count value increases accordingly.

As in the case of the discharge-type scheme, the charge time can be adjusted by using the capacitor 36 also in the charge-type scheme. Detailed description of this adjustment in the charge-type scheme is similar to that in the discharge-type scheme, and therefore, is omitted. In principle, however, in the charge-type scheme, when the resistance becomes lower, the charge time becomes longer, and the inclination of discharge gradually changes accordingly. As a result, the resolution of resistance value information relative to the count value increases. That is, the charge-type scheme is a scheme with which highly precise resistance value information can be obtained for lower resistances.

In the latch period T3, after the start of charging, the count value of the resistance value counter 32 when the potential of the node SEN rises above the reference voltage VREF is held. The held count value is output as COUNT_OUT and is handled as a count value that represents resistance value information about the variable resistance element 23.

In the reset period T4, when data output is completed, the potential of the selected word line WLs is set to a low level, the transistor 24 of the selected memory cell 21s is turned off, and the read operation ends.

For the configuration illustrated in FIG. 19, both the discharge-type scheme and the charge-type scheme can be used. Note that the logic example regarding output A and output B of the comparator 135 illustrated in FIG. 19 is an example for a read circuit using the discharge-type scheme. In order to apply the same digital data logic to a high-resistance state and to a low-resistance state, the conditions need to be flipped for the charge-type scheme because the detection direction is opposite. Specifically, the logic for output A is such that output A is set to 1 in a case of a≥b and is set to 0 in a case of a<b. The logic for output B is the same in the discharge-type scheme and in the charge-type scheme.

As described above, the resolution of resistance value information differs depending on the scheme for reading. Therefore, in order to obtain resistance value information with high precision, the discharge-type scheme may be used in a case where saving in a selected memory cell is performed by using a high-resistance value range, and the charge-type scheme may be used in a case where saving in a selected memory cell is performed by using a low-resistance value range. However, the counter width of the resistance value counter 32 illustrated in FIG. 19 is limited due to hardware restraints. Therefore, if the discharge time or the charge time is too long, the count value exceeds the range within which the counter is allowed to perform counting, and precise resistance value information is not obtained. Accordingly, in order to reduce the circuit scale by decreasing the bit width necessary for the counter, the discharge-type scheme may be used in a case where saving in a selected memory cell is performed by using a low-resistance value range, and the charge-type scheme may be used in a case where saving in a selected memory cell is performed by using a high-resistance value range.

The read circuit 11 is used to obtain resistance value information for generating the first digital data, second digital data, and random number data of the present embodiment. The first digital data, second digital data, and random number data are generated from the obtained resistance value information by using different methods respectively. Specific examples are described below.

First Exemplary Embodiment

Method for Generating First Digital Data

Now, a method for generating first digital data, which is a source of device-specific digital ID data, using the first digital data area 8 is described. As described above, the memory cells in the first digital data area 8 are set so as to be in the same resistance value state. As illustrated in FIG. 6, the variation distribution of the resistance values is in accordance with a normal distribution, and is a random variation distribution for which artificial control is difficult. In order to obtain first digital data, the median value of the variation distribution is extracted, and conversion into digital data "0" or "1" is performed on the basis of the extracted median value, as illustrated in FIG. 6. First, a method for extracting the median value is described.

In a case of generating first digital data, a "median value extraction operation" is performed first. At this time, for every S bits, which correspond to the number of bits read in parallel from the first digital data area 8, a read operation is repeated while the address is changed, different memory cells are selected from the first digital data area 8 in each read operation, and resistance value information about the selected memory cells is read. On the basis of the resistance value information read for every S bits, a signal "−1" or "1" is output as output B in accordance with the result of determination as described in the description of the operation of the read circuit 11. The output B is input to the median value detection circuit 25 via the S channels, S being the number bits read in parallel. A specific example of the median value detection circuit 25 is illustrated in FIG. 22, and an operation of the median value detection circuit 25 is described below.

Figure 22:
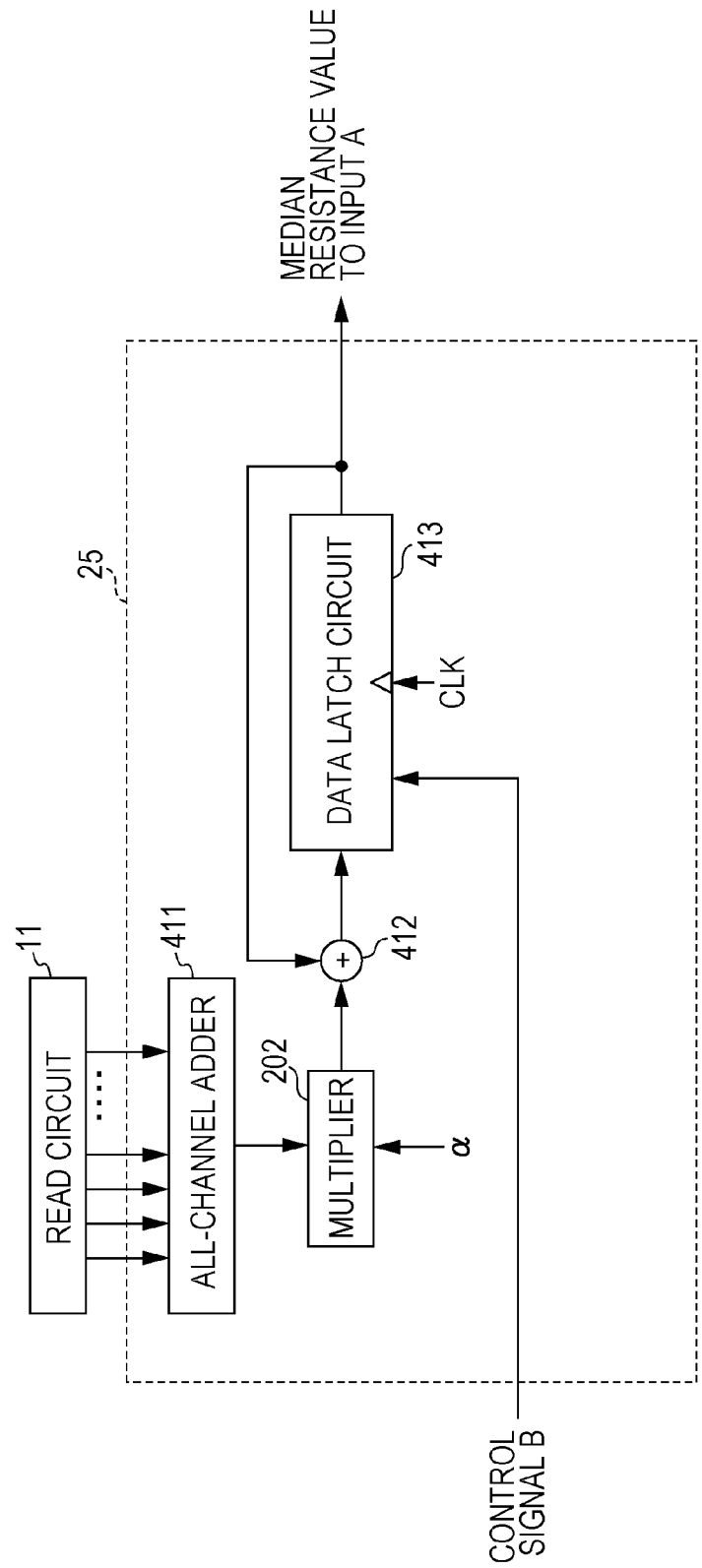
FIG. 22 is a diagram illustrating an example median value detection circuit according to an embodiment.

The median value detection circuit 25 illustrated in FIG. 22 includes an all-channel adder 411, a multiplier 202, an adder 412, and a data latch circuit 413. The multiplier 202 is connected to the all-channel adder 411 and receives an output signal from the all-channel adder 411. The adder 412 is connected to the output terminal of the multiplier 202 and to the input and output terminals of the data latch circuit 413. The adder 412 receives output data from the multiplier 202 and output data from the data latch circuit 413, adds these pieces of output data together, and outputs the result of addition to the data latch circuit 413.

The data latch circuit 413 receives the output data from the adder 412 and latches the output data received from the adder 412 at a specific timing in accordance with a control signal B. The data latch circuit 413 is a circuit capable of storing information having a plurality of bits by combining a plurality of 1-bit latch circuits together. The number of bits depends on the number of bits required as the output. As described below, in this example configuration, output data from the data latch circuit 413 is used by the read circuit 11 as a median resistance value. The data latch circuit 413 needs to include at least a number of latch circuits, the number being equal to the number of bits necessary for expressing a median resistance value.

The operations of the median value detection circuit 25 is described more specifically.

The all-channel adder 411 adds together all resistance value error signals received from the read circuit 11 via the S channels and outputs the result as a total error signal. The multiplier 202 receives the total error signal and multiples the received signal by a coefficient α. As the multiplier 202, a general multiplier circuit may be used or a bit shift circuit may be used while the coefficient α is set to one over a power of two, such as 1/2, 1/4, or 1/8. The sensitivity of an error signal is adjusted by changing the coefficient for the multiplier 202. The adder 412 adds together output data from the data latch circuit 413 and the error signal which is output from the multiplier 202 and for which the sensitivity is adjusted, and outputs the result to the data latch circuit 413.

The data latch circuit 413 latches a signal (data) received from the adder 412 at a specific timing in accordance with the control signal B. The specific timing based on the control signal B is a timing immediately before the end of the T3 period illustrated in FIGS. 20A and 20B, for example. Output data from the data latch circuit 413 is updated each time resistance value information having S bits, namely, resistance value information of S bits, is read. The data latch circuit 413 outputs the data last latched to the adder 412 and to the read circuit 11 as input A (see FIG. 19). The output data is used by the read circuit 11 as a median resistance value.

As understood from the above-described operation, the all-channel adder 411 and the multiplier 202 constitute a sensitivity adjustment circuit that adjusts the sensitivity upon accumulating resistance value error signals. The adder 412 and the data latch circuit 413 constitute a cumulative addition circuit that cumulatively adds together the preceding median resistance value and a resistance value error signal for which the sensitivity is adjusted at a specific timing in accordance with the control signal B.

As evident from the example configuration illustrated in FIG. 22, in order to provide the sensitivity adjustment circuit and the cumulative addition circuit for resistance value error signals, a variety of specific configurations and connections can be employed for the circuits. A person skilled in the art can design such modifications on the basis of the disclosure described above. Considering the spirit of the present disclosure, any modified circuit designed in accordance with a design idea falls within the scope of the present disclosure, the design idea being such that the difference between the median resistance value at the present time and the resistance value information that has been read is obtained as a resistance value error signal, the sensitivity upon accumulating the resistance value error signal can be adjusted, and the result of accumulating the resistance value error signals is used as an updated new median resistance value.

Figure 23:
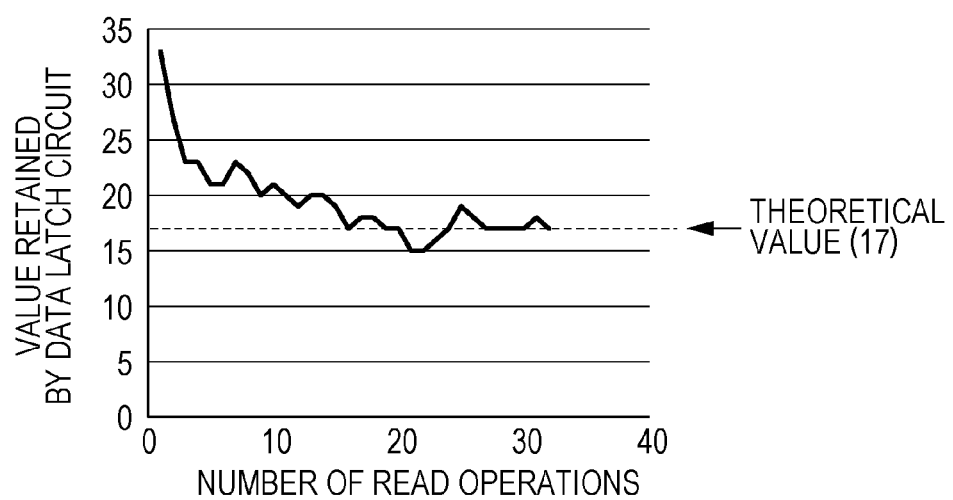
FIG. 23 is a diagram illustrating the result of calculation of the median resistance value by the median value detection circuit according to an embodiment.

FIG. 23 illustrates the result of actual calculation of the median resistance value by the median value detection circuit 25. The horizontal axis represents the number of read operations of reading the first digital data area 8 while changing the address, and the vertical axis represents the value retained by the data latch circuit 413. A theoretical value obtained by reading resistance value information about the first digital data area 8 in advance and calculating the median value using a computer is equal to 17. As seen from FIG. 23, the value retained by the data latch circuit 413 approximately converges to the theoretical value of 17 when the number of read operations is about 30. When the median value extraction operation is completed, the extracted median value is retained by the data latch circuit 413. The retained median value is hereinafter referred to as an extracted median value. With this scheme proposed in the present disclosure, the median value of the variation distribution of the resistance values can be stably detected. Further, the extracted median value is used as a threshold, resistance value information about memory cells in the first digital data area 8 is read again, and "0" or "1" is assigned on the basis of the read resistance value information, thereby enabling generation of good and stable first digital data.

Method for Generating Second Digital Data and Modified Second Digital Data

Now, a method for generating second digital data, which is a source of device-specific digital ID data, from the second digital data area 404 is described. As described above, the second digital data area 404 includes memory cells each including no variable resistance element but including a selection transistor only. Each memory cell is a "fixed-resistance memory cell" in which the on-resistance of the transistor is equal to the resistance value of the memory cell. However, in a leading-edge fine semiconductor process, the on-resistance significantly varies among transistors. That is, the resistance values of fixed-resistance cells randomly vary, and such random variations are difficult to control in the manufacturing process. This property makes reproduction extremely difficult as for the first digital data. The row decoder circuit 18 and the column decoder circuit 17 select and connect to the read circuit 11 the second digital data area 404 in accordance with an instruction given by the control circuit 15. The read circuit 11 reads resistance value information about the fixed resistance memory cells selected from the second digital data area 404 by performing the same operation described above. The obtained resistance value information (COUNT_OUT) having S bits is output to the ID data control circuit 402.

The ID data control circuit 402 receives COUNT_OUT that corresponds to the resistance value information from the read circuit 11 and generates second digital data. In this exemplary embodiment, the generated second digital data is S-bit data, S being equal to the number of bits read in parallel; however, the generated second digital data is not limited to this.

Figure 21:
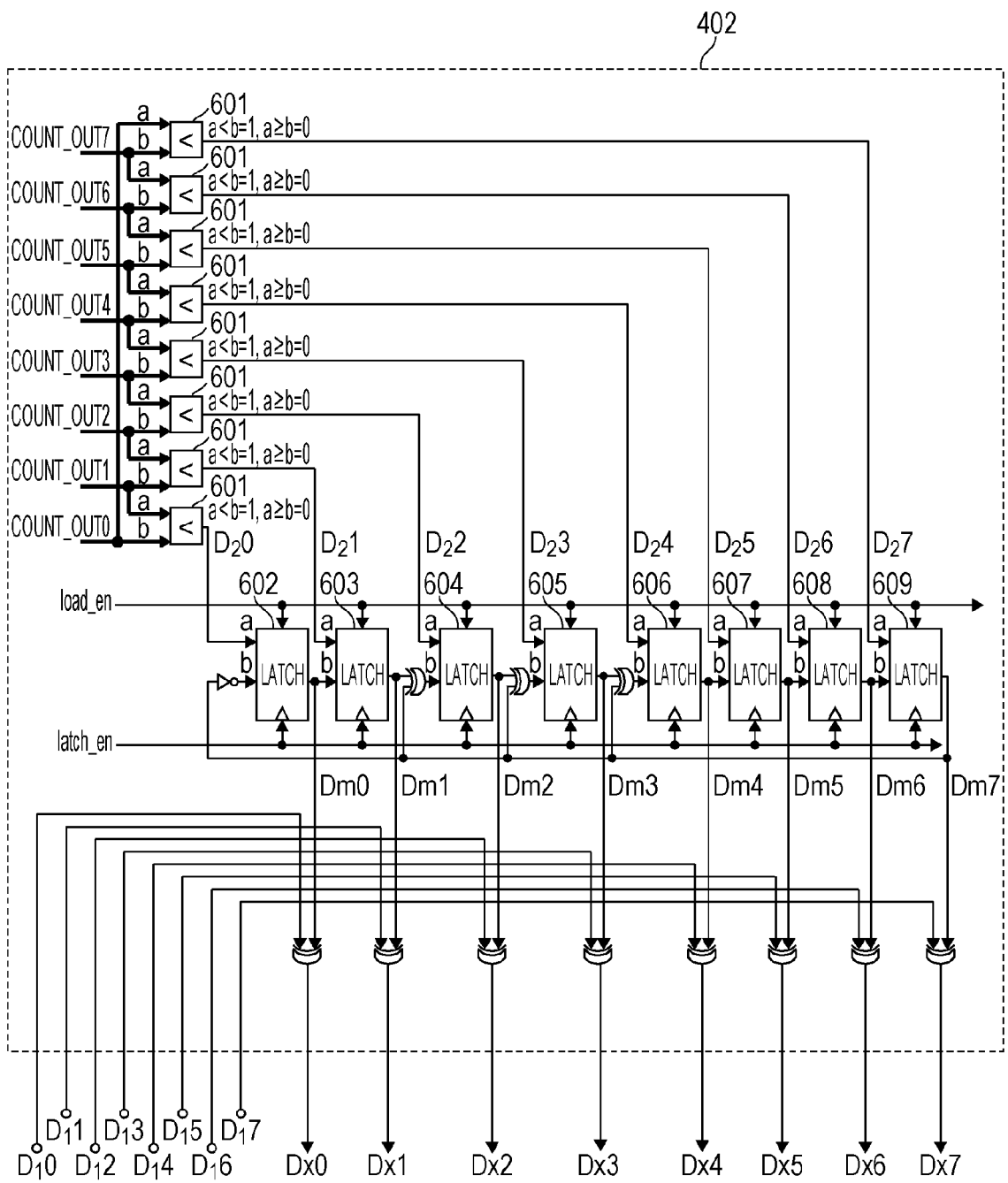
FIG. 21 is a diagram illustrating an example configuration of an ID data control circuit included in the non-volatile memory device according to an embodiment.

FIG. 21 illustrates a specific example of the ID data control circuit 402. In the example in FIG. 21, the number of bits read in parallel S is set to eight for simplified description; however, the value of S is not limited to this. In FIG. 21, comparators 601 each compare input A with input B in terms of the magnitude relationship and output "1" if a<b and "0" if a≥b. Latches 602 to 609 are latch circuits that each select and latch input a if latch_en is equal to 1 and load_en is equal to 1, and select and latch input b if latch_en is equal to 1 and load_en is equal to 0. If the latches 602 to 609 select input b, the output of the latch 609 is connected to the input of the latch 602, and the outputs of the latches 602, 606, 607, and 608 are respectively connected to the inputs of the latches 603, 607, 608, and 609 in the subsequent stages. An exclusive OR (XOR) operation on each of the output values from the latches 603, 604, and 605 with the output value from the latch 609 is performed, and the results are respectively input to the latches 604, 605, and 606 in the subsequent stages. With the circuit connections in this case, the latches 603 to 609 constitute a cyclic-type arithmetic processing circuit. The illustrated cyclic-type arithmetic processing circuit is a circuit that implements eighth-degree primitive polynomial arithmetic processing. A large number of algorithms for cyclic-type arithmetic processing are known in the related art, and any scheme is applicable to the cyclic-type arithmetic processing circuit. That is, any circuit in which an arithmetic operation is repeatedly performed by using data $D_2 0$ to $D_2 7$ (second digital data) as an initial value, and pseudorandom numbers are generated and output as Dm0 to Dm7 is included in an embodiment of the present disclosure. Here, the data Dm0 to Dm7 is referred to as modified second digital data.

To the input terminals $D_1 0$ to $D_1 7$, the first digital data described above is input. In this example, the first digital data is assigned addresses in the first digital data area 8 and stored in the first digital data area 8 on a per S-bit basis. A portion of the first digital data (S bits) read from each address is input to the input terminals $D_1 0$ to $D_1 7$. On the modified second digital data having the same S bits, an exclusive OR (XOR) operation is performed with the data $D_1 0$ to $D_1 7$, and the result is output as $D_x 0$ to $D_x 7$. The data $D_x 0$ to $D_x 7$ is used as device-specific digital ID data (PUF data).

In accordance with control performed by the control circuit 15, the read circuit 11 reads resistance value information about fixed-resistance memory cells selected from the second digital data area 404 and outputs the result of reading as COUNT_OUT0 to COUNT_OUT7. As seen from FIG. 21, each of the comparators 601 makes a comparison with the COUNT_OUT value from its adjacent channel to thereby generate the second digital data $D_2 0$ to $D_2 7$. That is, the second digital data is data obtained on the basis of the magnitude relationship between the resistance values of fixed-resistance memory cells. As described above, the resistance values of fixed-resistance memory cells vary due to manufacturing variations in the semiconductor process, and therefore, the second digital data is random data that is not artificially determined. When the second digital data $D_2 0$ to $D_2 7$ is determined, load_en is set to "1" and latch_en is set to "1", and $D_2 0$ to $D_2 7$ are loaded to the latches 602 to 609 respectively as an initial value. Each time the first digital data is read, load_en is set to "0" and latch_en is set to "1", and the latches 602 to 609 each latch data from the input terminal b. That is, each time the first digital data is read, the ID data control circuit 402 repeats cyclic-type arithmetic processing while using the second digital data ($D_2 0$ to $D_2 7$) as an initial value and sequentially generates the modified second digital data (Dm0 to Dm7). Further, the ID data control circuit 402 performs an exclusive OR operation on the first digital data with the modified second digital data to thereby obtain device-specific digital data (Dx0 to Dx7). This digital ID data serves as PUF data described above.

As described above, the first digital data is data relating to variations in the resistance values when the resistive memory cells are set so as to fall within the same resistance value range, and the second digital data and the modified second digital data do not correlate with the first digital data at all. Although the first digital data is data obtained on the basis of the magnitude relationships among the resistance values, digital ID data is obtained by performing an exclusive OR operation on the first digital data and the modified second digital data, and "0" and "1" included in the digital ID data do not correlate with the resistance values accordingly. As a result, even if an attack is possible in which the resistance values of memory cells are directly read using a probe, for example, the digital ID data is not easily inferred, thereby achieving highly secure ID data.

As the second digital data, first-type data or second-type data may be used. As described above, the first-type data is data obtained in accordance with determination based on the first threshold illustrated in FIG. 3 and is data representing whether the non-volatile memory cell is in the initial state or in the variable state. The second-type data is data obtained in accordance with determination based on the second threshold illustrated in FIG. 3 and is data representing whether the resistance value of the non-volatile memory cell is in the first resistance value range or in the second resistance value range illustrated in FIG. 3. Digital ID data generated on the basis of the first digital data and the second digital data generated by using the first-type data or the second-type data is highly secure ID data as in the case of not using the first-type data or the second-type data.

Second Exemplary Embodiment

Challenge-Response

Figure 24B:
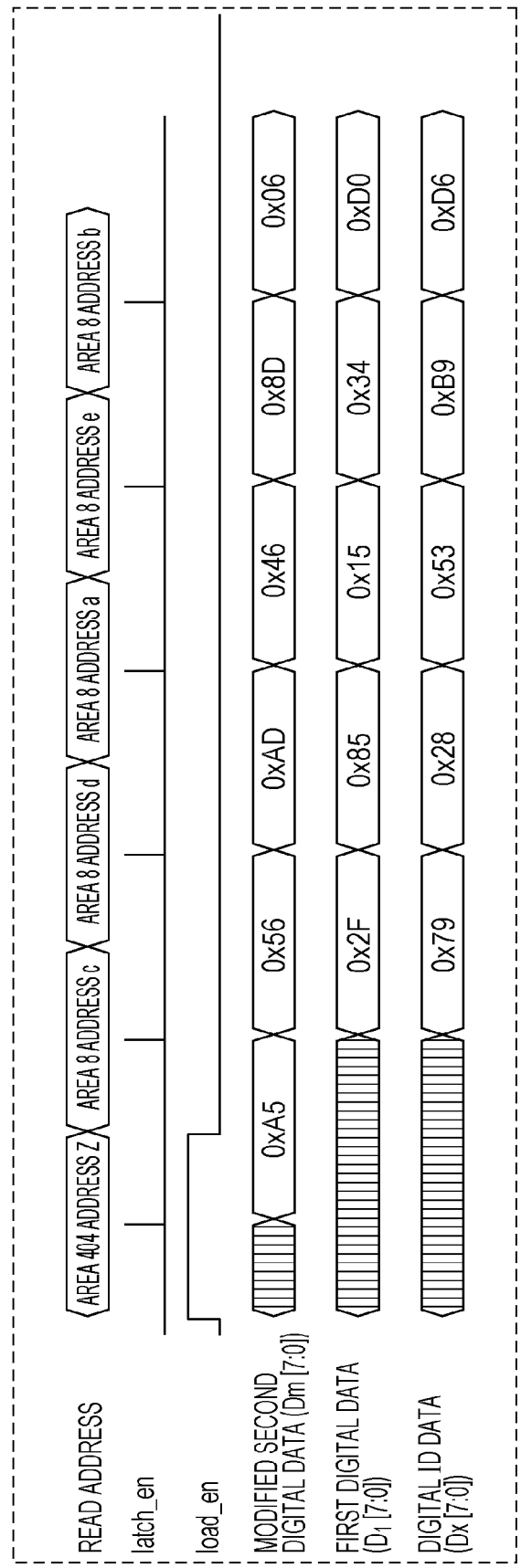
FIG. 24B is a diagram illustrating an example challenge-response process according to an embodiment.

Now, challenge-response using the first digital data and the modified second digital data is described with reference to FIGS. 24A and 24B. In the present embodiment, a challenge signal input from outside the device is based on a sequence of read addresses for accessing memory cells. FIG. 24A illustrates a challenge X pattern. In this challenge X pattern, the read circuit 11 first selects an address in the second digital data area 404 and reads second digital data. This address for accessing is represented by Z. In FIG. 21, load_en is set to high when reading from the address in the second digital data area 404 is performed. Resistance value information is read by using the method for reading described above, the value of COUNT_OUT is determined, and latch_en changes from low to high and then from high to low at a timing of output from the read circuit 11, as illustrated in FIG. 24A. As a result, $D_2 0$ to $D_2 7$ illustrated in FIG. 21 are retained as an initial value of the latches 602 to 609 at a timing when latch_en is high. In the example in FIG. 24A, it is assumed that the value retained by the latches 602 to 609 is expressed by a hexadecimal number of 0xA5. Thereafter, each time data is read while the address is changed, load_en is low, and latch_en changes from low to high and then from high to low. Accordingly, the latch circuit illustrated in FIG. 21 performs polynomial arithmetic processing while using 0xA5 as an initial value, and the value retained by the latch circuit changes to 0x56, 0xAD, 0x46, 0x8d, and 0x06 sequentially each time a read operation is performed. These pieces of data constitute the modified second digital data.

After the memory cells in the second digital data area 404 have been read and the initial value has been retained by the latches 602 to 609, reading from each address in the first digital data area 8 is performed. It is assumed that detection of the median resistance value as described in the description of the operation performed by the read circuit is completed in advance. For example, it is assumed that first digital data read from address a in the first digital data area 8 is expressed by a hexadecimal number of 0x15. Similarly, it is assumed that portions of first digital data, namely, 0xD0, 0x2F, 0x85, and 0x34, are sequentially read from addresses b, c, d, and e in the first digital data area 8. As digital ID data that corresponds to a response to the challenge, a value obtained as a result of an exclusive OR operation on each portion of first digital data and each portion of modified second digital data is output to Dx0 to Dx7 in FIG. 21. Outputting this digital ID data outside the non-volatile memory device is called response output.

FIG. 24B illustrates a challenge Y pattern. As seen from FIG. 24B, after reading from an address in the second digital data area 404, the sequence of addresses in the first digital data area 8 from which the read circuit 11 performs reading is different from that in the challenge X pattern. As a result, although the portions of modified second digital data remain the same, combinations of the portions of first digital data and the portions of modified second digital data on which an exclusive OR operation is performed are different from those in the challenge X pattern, resulting in digital ID data different from that in the challenge X pattern being output as Dx0 to Dx7 in FIG. 21.

Authentication is performed from outside the non-volatile memory device in accordance with the relationship between challenge input and response output as described above. In a case of performing challenge-response authentication by using the configuration in the present embodiment, in an inspection in a device manufacturing process for which security is guaranteed in advance, an exclusive OR operation with the modified second digital data is not performed, the second digital data and the first digital data are read in accordance with a predetermined sequence of addresses, and these pieces of data are registered in an authentication server. As a matter of course, a mechanism is provided so as not to allow reading of the first digital data and second digital data except in a case of inspecting the device. For example, reading can be performed only by inputting a complex command, and the method for inputting the command is not available to the public, for example. The initial state represented by the first-type data is such a resistance state that, once the initial state is changed to a different resistance state, restoration to the initial state is not possible. Therefore, measures, such as configuring a circuit so as not to enable, with a hardware mechanism, reading of first digital data and second digital data unless predetermined memory cells are in the initial state, are effective.

In a case of certifying each device with the authentication server in the field, response data for a challenge is derived in advance by performing an arithmetic operation using the registered first digital data and second digital data, and whether a response actually returned from the device matches the response data is determined to thereby perform authentication.

As described above, in the authentication method for certifying a non-volatile memory device as a valid device, the first digital data and second digital data are read and retained in an external authentication device before shipment of the non-volatile memory device. When the non-volatile memory device is used after shipment, the external authentication device uses a plurality of challenges for input, receives response output, and determines whether the result obtained by performing an arithmetic operation using the first digital data and second digital data retained in advance in the external authentication device matches the received response output. If the result matches the received response output, the external authentication device certificates the non-volatile memory device as a valid device. If the result does not match the received response output, the external authentication device determines that the non-volatile memory device is not a valid device, resulting in failed authentication.

With the method for generating device-specific digital ID data by using the first digital data and the modified second digital data obtained from the second digital data as described above in the present embodiment, the response changes depending on the sequence of read addresses. The first digital data is irreproducible device-specific data, and therefore, the response obtained by using the first digital data is a unique response that differs from device to device. The digital ID data that is finally output is obtained by performing an exclusive OR operation on the first digital data and the modified second digital data. Therefore, the magnitude relationship between the resistance values of memory cells does not correlate with whether data is "0" or "1". As a result, even if the resistance value of each memory cell can be read in the future with the advancement of a probing technique used in an attack, digital ID data that is difficult to predict and that provides extremely high security can be generated.

Third Exemplary Embodiment

Generation of Random Numbers

Now, generation of random numbers used in the present embodiment is described. In this generation of random numbers, digital data is generated by using a plurality of pieces of resistance value information obtained from memory cells in the random number generation cell area 403, and random number data is generated from the digital data by performing a predetermined algorithm.

The third exemplary embodiment provides a configuration in which good random numbers are extracted even if the range of a change in the resistance value becomes smaller as time has passed since writing.

Figure 25:
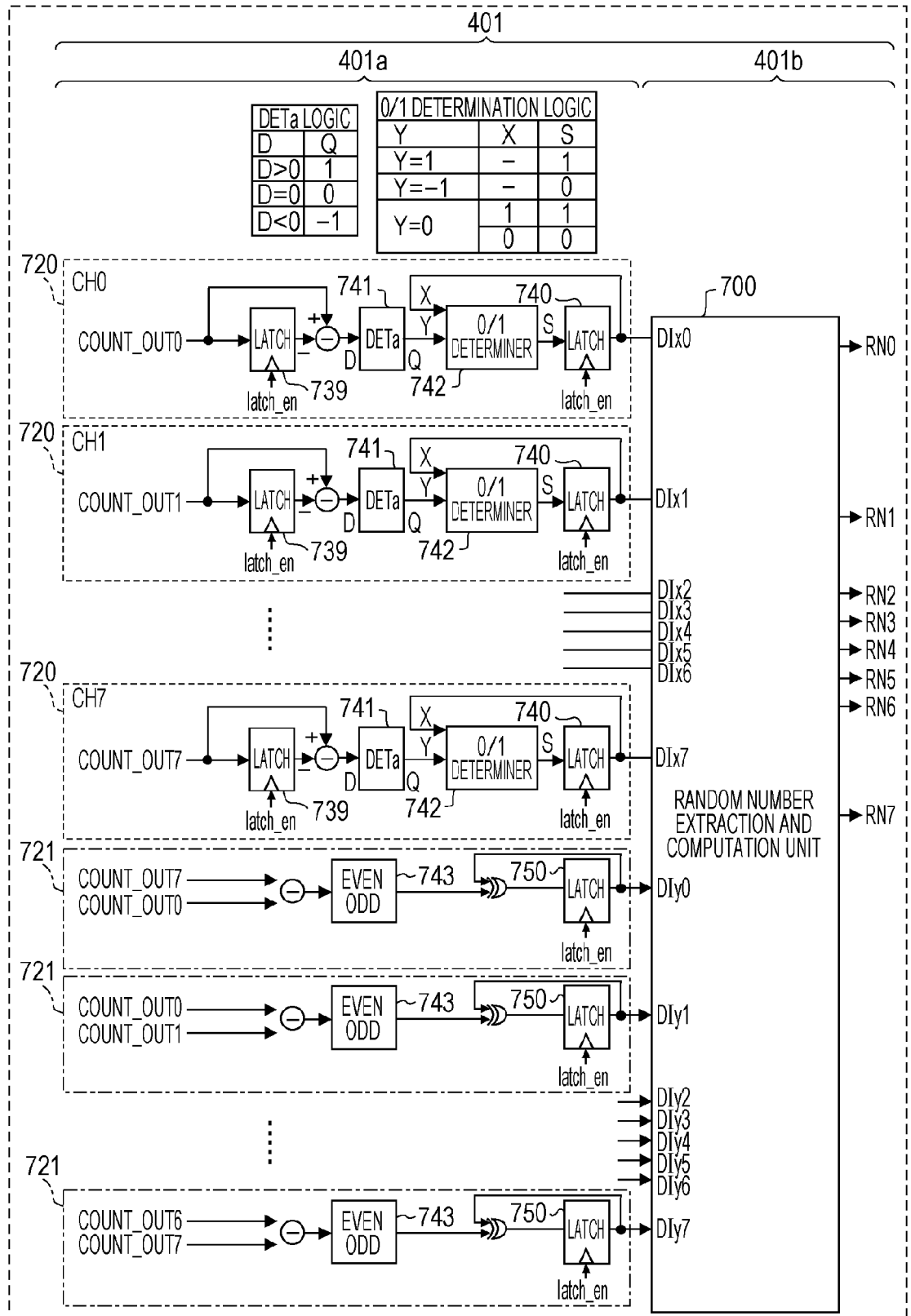
FIG. 25 is a diagram illustrating an example configuration of a random number generation circuit according to an embodiment.

FIG. 25 is a circuit diagram schematically illustrating a configuration of a random number generation circuit 401 that generates random numbers from the COUNT_OUT values, which are resistance value information about memory cells in the random number generation cell area 403. The random number generation circuit 401 is described below with reference to FIG. 25.

The random number generation circuit 401 illustrated in FIG. 25 includes a random number source signal generation circuit unit 401a and a random number generation post-processing circuit unit 401b. The random number source signal generation circuit unit 401a is a block that performs conversion into a digital value of 0 or 1 on the basis of a change in the COUNT_OUT value obtained as a result of a fluctuation in the resistance value of a variable resistance element and outputs a random number source. The random number generation post-processing circuit unit 401b is a block that performs various arithmetic operations for further increasing the randomness by using the digital value of the random number source generated by the random number source signal generation circuit unit 401a. In order for the random number generation post-processing circuit unit 401b to perform processing, various algorithms can be employed, such as polynomial arithmetic processing described in related art literature. The present inventors have paid attention to an H4 circuit described in "The Workshop on Fast Software Encryption 2007 (FSE 2007) LNCS 4593, pp. 137-152, 2007 @ International Association for Cryptologic Research 2007 'Bad and Good Ways of Post-processing Biased Physical Random Numbers' Markus Dichtl" (hereinafter referred to as "Non Patent Literature 3").

Figure 26:
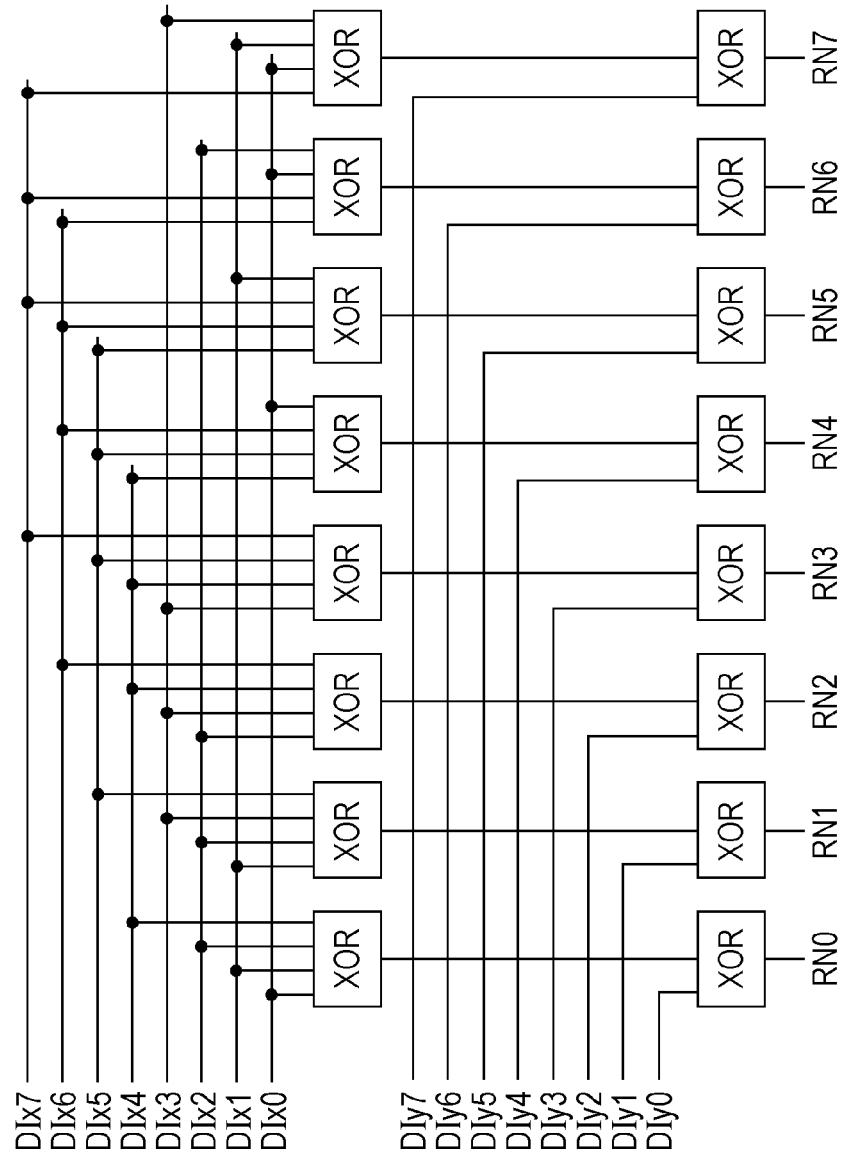
FIG. 26 is a diagram illustrating an example configuration of an H4 circuit.

FIG. 26 illustrates an example configuration of the H4 circuit. As illustrated in FIG. 26, an exclusive OR operation is performed on a signal obtained by cyclically shifting an input signal constituted by eight bits of DIx0 to DIx7 by one bit, a signal obtained by cyclically shifting the input signal by two bits, a signal obtained by cyclically shifting the input signal by four bits, and the original bits of DIx0 to DIx7 on a per bit basis. Further, an exclusive OR operation is performed on the bits obtained as a result of the former exclusive OR operation and another input signal constituted by eight bits of Dly0 to Dly7 on a per bit basis. According to Non Patent Literature 3, when the bias probability relating to a bias towards the probability of 0 or towards the probability of 1 is represented by $\epsilon$, the $\epsilon$-powers are canceled out up to the fourth in a process performed by the H4 circuit, and the minimum bias can be made extremely smaller so as to include only the fifth power of $\epsilon$. However, the H4 circuit outputs eight bits from the input random number source of 16 bits, and the generation speed is reduced by half. That is, although the H4 circuit introduced by Dichtl can generate extremely good random numbers from a random number source having a bias towards the probability of 0 or towards the probability of 1 by removing most of the bias components, the number of bits of random number data that can be output is half the number of bits of the obtained random number source, which is a shortcoming. The present inventors have found, on the basis of fluctuations in the resistance values of the memory cells for S bits, that a random number source of S bits obtained from a change in the resistance value relating to each bit is independent of a random number source of S bits obtained from the differences in the resistance value between each bit and any other bit as a result of a diligent examination. The present inventors have found that, by inputting the two random number sources each having S bits to the H4 circuit, random number data that is extremely highly random is obtained without the number of channels of the circuit that reads resistance value information for S bits being doubled. The above-described random number source data of S bits obtained from a change in the resistance value relating to each bit is defined as a self-change random number source, and the above-described random number source data of S bits obtained from the differences in the resistance value between each bit and any other bit is defined as a mutual-change random number source. To generate a self-change random number source or a mutual-change random number source from the COUNT_OUT values, which correspond to resistance value information, various circuit configurations are possible. Any processing circuit that follows the above-described idea is included in the present embodiment. An example circuit configuration is described below with reference to FIG. 25.

In FIG. 25, the block surrounded by a dashed line is a self-change random number source signal generation circuit 720 that generates a self-change random number source. The block surrounded by a dashed dotted line is a mutual-change random number source signal generation circuit 721 that generates a mutual-change random number source.

The read circuit 11 illustrated in FIG. 18 obtains a plurality of pieces of resistance value information by obtaining resistance value information from N (N is equal to or larger than two) memory cells 21 that fall within the same variable resistance value range at a plurality of different times. The self-change random number source signal generation circuit 720 generates random number data of N bits on the basis of the difference or the magnitude relationship between past resistance value information and present resistance value information about each memory cell 21 among the plurality of pieces of resistance value information. The mutual-change random number source signal generation circuit 721 generates random number data of N bits on the basis of the differences or the magnitude relationships between the resistance value information about each memory cell and the resistance value information about any other memory cell. FIG. 25 illustrates an example where the self-change random number source signal generation circuit 720 and the mutual-change random number source signal generation circuit 721 each output random number data of eight bits.

To the self-change random number source signal generation circuit 720, the value of resistance value information COUNT_OUT output from the sense amplifier circuit 30 is input.

In response to acceptance of a random number data read command, a memory cell in the random number generation cell area 403 is selected by a column selection circuit of each channel and is connected to the read circuit 11, in accordance with an instruction given by the control circuit 15. From the sense amplifier circuit 30 in the read circuit 11, the COUNT_OUT value, which corresponds to resistance value information about the memory cell, is read.

The pulse latch_en is a pulse for a latch timing having a one-clock width. That is, at a timing when latch_en rises to "high", a latch 739 latches an input COUNT_OUT value. At this time, resistance value information previously read (a COUNT_OUT value read last) is retained in the latch 739, and a detector 741 ("DETa" in FIG. 25) subtracts the COUNT_OUT value previously read from the present COUNT_OUT value and outputs 1 if the subtraction result is a positive value, −1 if the subtraction result is a negative value, or 0 if the subtraction result is not a positive value or a negative value. The logic table for the detector 741 (DETa) is illustrated in FIG. 25. The output from the detector 741 is input to a 0/1 determiner 742 as Y. The output from a latch 740 described below is input to the 0/1 determiner 742 as X. The logic table for the 0/1 determiner 742 is illustrated in FIG. 25. The 0/1 determiner 742 outputs 1 if input Y is 1, 0 if input Y is −1, or input X as is if input Y is 0. The latch 740 retains the output from the 0/1 determiner 742 in accordance with the timing determined by latch_en as in the latch 739, and therefore, the output from the 0/1 determiner 742 upon the previous read operation is retained in the latch 740. That is, if input Y is 0, the output of the 0/1 determiner 742 upon the previous read operation is output again.

As described above, the self-change random number source signal generation circuit 720 is a circuit that repeatedly reads the same memory cell selected from among the memory cells in the random number generation cell area 403 without rewriting and converts the value of resistance value information that is output as COUNT_OUT and that changes each time a read operation is performed into 0 or 1. The method of generating 0 or 1 on the basis of a phenomenon in which resistance value information about the same memory cell changes is implemented not only by the circuit configuration of the self-change random number source signal generation circuit 720 but also by a large number of derived circuits. Any circuit based on the same idea as in this example configuration is included in the present embodiment.

Figure 27:
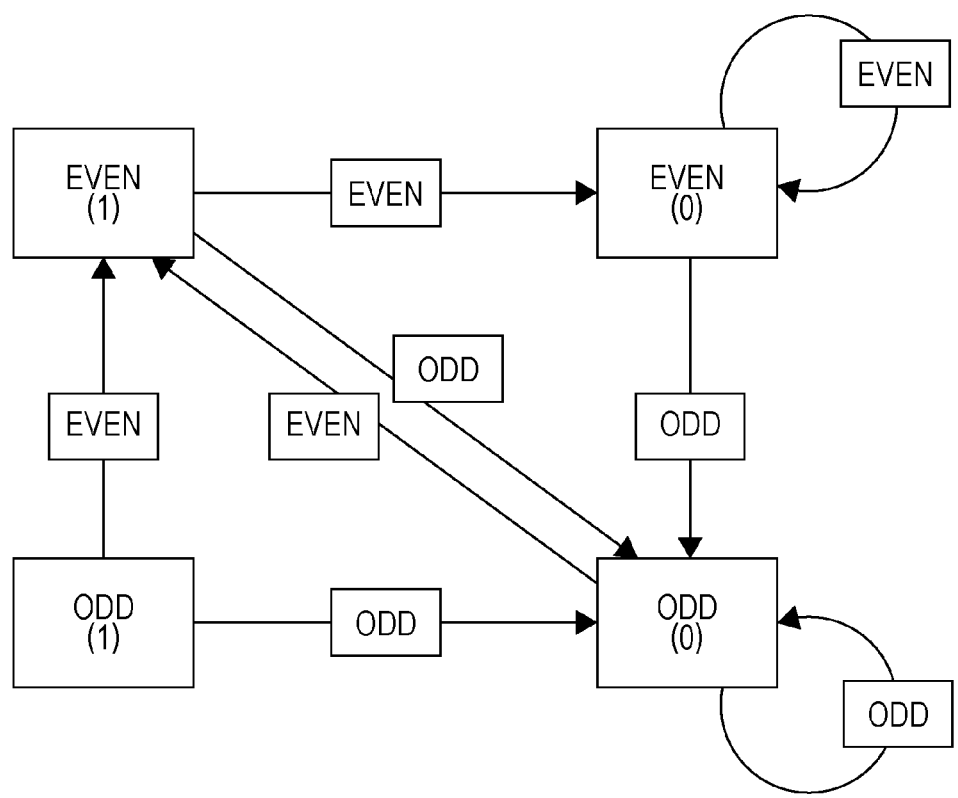
FIG. 27 is a diagram illustrating state transitions relating to data updates in a latch according to an embodiment.

Now, the mutual-change random number source signal generation circuit 721 is described. In FIG. 25, to each mutual-change random number source signal generation circuit 721, COUNT_OUT from the corresponding channel and COUNT_OUT from its adjacent channel are simultaneously input. For example, in a case of CH0, COUNT_OUT0 from CH0 and COUNT_OUT7 from CH7 are input. In a case of CH1, COUNT_OUT1 from CH1 and COUNT_OUT0 from CH0 are input. In a case of CH2, COUNT_OUT2 from CH2 and COUNT_OUT1 from CH1 are input. In a case of CH3, COUNT_OUT3 from CH3 and COUNT_OUT2 from CH2 are input. In a case of CH4, COUNT_OUT4 from CH4 and COUNT_OUT3 from CH3 are input. In a case of CH5, COUNT_OUT5 from CH5 and COUNT_OUT4 from CH4 are input. In a case of CH6, COUNT_OUT6 from CH6 and COUNT_OUT5 from CH5 are input. In a case of CH7, COUNT_OUT7 from CH7 and COUNT_OUT6 from CH6 are input. An even/odd detection circuit 743 outputs a signal 0 or 1 in accordance with whether the difference between the two COUNT_OUT values is even or odd. That is, the even/odd detection circuit 743 outputs 0 if the difference value is even or 1 if the difference value is odd. To a latch 750, a value obtained as a result of an exclusive OR operation on the output from the even/odd detection circuit 743 and the output from the latch 750 is input. The latch 750 is configured to retain input data in accordance with the timing of latch_en as in the latch 740. FIG. 27 is a diagram illustrating state transitions relating to updates of data in the latch 750. In FIG. 27, each state has a meaning as follows. A state "Even (1)" represents that an even number has been obtained in the previous read operation and that the latch 750 outputs 1. A state "Even (0)" represents that an even number has been obtained in the previous read operation and that the latch 750 outputs 0. A state "Odd (1)" represents that an odd number has been obtained in the previous read operation and that the latch 750 outputs 1. A state "Odd (0)" represents that an odd number has been obtained in the previous read operation and that the latch 750 outputs 0. It is indicated that to which state each of these four states transitions in accordance with whether the difference from the value of resistance value information from the adjacent channel is odd or even. That is, in a case where an even number has been obtained in the previous read operation and the latch 750 is in the Even (1) state, if an even number is obtained in the present read operation, the latch 750 transitions to the Even (0) state and outputs 0. In the case where an even number has been obtained in the previous read operation and the latch 750 is in the Even (1) state, if an odd number is obtained in the present read operation, the latch 750 transitions to the Odd (0) state and outputs 0. In a case where an even number has been obtained in the previous read operation and the latch 750 is in the Even (0) state, if an even number is obtained in the present read operation, the latch 750 remains in the Even (0) state and outputs 0. In the case where an even number has been obtained in the previous read operation and the latch 750 is in the Even (0) state, if an odd number is obtained in the present read operation, the latch 750 transitions to the Odd (0) state and outputs 0.

In a case where an odd number has been obtained in the previous read operation and the latch 750 is in the Odd (1) state, if an even number is obtained in the present read operation, the latch 750 transitions to the Even (1) state and outputs 1. In the case where an odd number has been obtained in the previous read operation and the latch 750 is in the Odd (1) state, if an odd number is obtained in the present read operation, the latch 750 transitions to the Odd (0) state and outputs 0. In a case where an odd number has been obtained in the previous read operation and the latch 750 is in the Odd (0) state, if an even number is obtained in the present read operation, the latch 750 transitions to the Even (1) state and outputs 1. In the case where an odd number has been obtained in the previous read operation and the latch 750 is in the Odd (0) state, if an odd number is obtained in the present read operation, the latch 750 remains in the Odd (0) state and outputs 0. In accordance with the state transitions described above, conversion from the difference value between COUNT_OUT values into a digital value of 0 or 1 is performed.

The two types of random number sources that constitute 16-bit data output as described above is input to a random number extraction and computation unit 700. The random number extraction and computation unit 700 has a configuration similar to that of the above-described H4 circuit illustrated in FIG. 26 and outputs 8-bit random number data. The random number extraction and computation unit 700 performs an exclusive OR operation on a specific combination of 8-bit random number data output from the self-change random number source signal generation circuit 720 and 8-bit random number data output from the mutual-change random number source signal generation circuit 721 to thereby generate and output 8-bit random number data. That is, the random number generation circuit 401 of the present embodiment outputs 8-bit random number data by using 8-bit data read from memory cells of the random number generation cell area 403 as input.

In the above description, data of eight bits is assumed to be a unit, for example; however, if S values of S pieces of read resistance value information are processed as described above for every eight values, random number data having a number of bits, the number being a multiple of eight, can be output. By using the configuration in this manner, random number data that is extremely highly random can be generated from S pieces of resistance value information without compromising the generation speed.

Error Correction Circuit

Figure 28A:
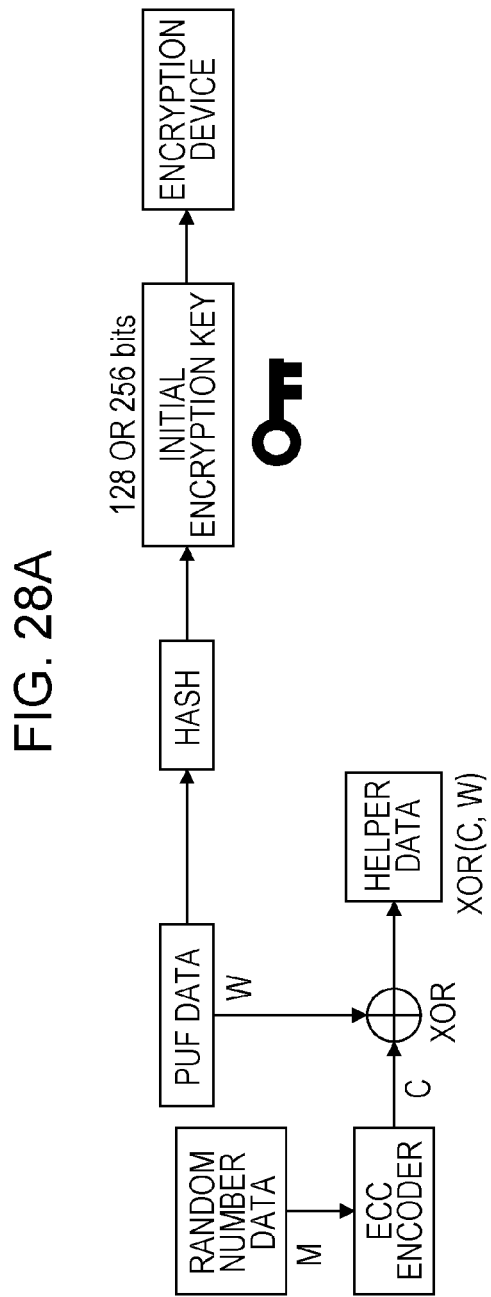
FIG. 28A is a diagram illustrating an example configuration of a data extractor called a fuzzy extractor.
Figure 28B:
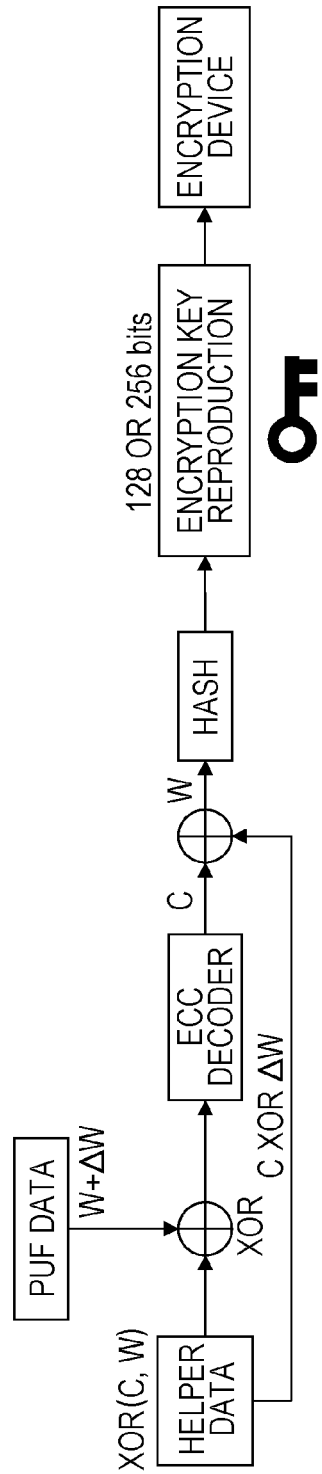
FIG. 28B is a diagram illustrating an example configuration of a data extractor called a fuzzy extractor.

A data extractor called a fuzzy extractor is currently proposed as an error correction scheme used in digital ID data generation using a PUF. A configuration indicated in "'Implementation and Evaluation of SCA-Resistant AES and PUF using MDR-ROM Scheme' @SCIS2015 (The 32nd Symposium on Cryptography and Information Security Kokura, Japan, Jan. 20-23, 2015) by Takeshi Fujino" is illustrated in FIGS. 28A and 28B. FIG. 28A illustrates a configuration for initial registration in which a signal for error correction is added to digital ID data, namely, PUF-ID data, and the result is registered as an ID. FIG. 28B illustrates a configuration for reproducing the registered ID by using the added signal for error correction. Parity data used in error correction is generated on the basis of correction target data by performing a predetermined arithmetic operation. That is, a data series that is a target of correction has a certain relationship with parity data. Usually, PUF ID data is generated on the basis of manufacturing variations, is irreproducible, and is a data series that is not easily inferred. Therefore, PUF ID data is considered to be highly secure. However, PUF ID data contains a certain number of data errors, and error correction needs to be performed in order to stably reproduce the same ID. Parity data necessary for error correction is usually saved in a non-volatile memory. Therefore, if parity data is read in an unauthorized manner due to a malicious attack, such as hacking, PUF-ID may be inferred from the correlation with the parity data, which is a concern. As a measure against such a concern, a scheme using a fuzzy extractor can be employed. The error correction and helper data generation circuit 400 illustrated in FIG. 18 performs an error correction process and a process for generating helper data described below.

In FIG. 28A, when PUF data (data W) is registered as digital ID data, random number data that is difficult to predict is separately prepared. Random number data M is input to an ECC encoder from the random number generation circuit 401 illustrated in FIG. 18, and parity data for error correction is added to the random number data M. Data obtained by adding the parity data to the random number data M is called data C. Here, the bit length of the data W (digital ID data Dx0 to Dx7 illustrated in FIG. 21), which is PUF data, is the same as that of the data C. An exclusive OR (XOR) operation is performed on the data W and the data C on a per bit basis to thereby generate helper data (XOR(C, W)). The helper data is stored in a non-volatile memory, such as in the user data area 7 illustrated in FIG. 18. With such a scheme, parity data for error correction is generated on the basis of random number data that is difficult to predict, and therefore, it is extremely difficult to infer PUF data from the parity data. The helper data is generated by performing an exclusive OR operation on the data C and the data W, and therefore, it is also difficult to infer PUF data even if the non-volatile memory is hacked.

Now, a method for generating correctly registered PUF ID data from PUF data that includes helper data and an error is described with reference to FIG. 28B. Reproduced PUF data includes an error, that is, data W includes an error bit, and therefore, the PUF data is represented by data W+ΔW in FIG. 28B. As described above, helper data registered in advance is read from the user data area 7 of the memory array. The helper data is generated by performing an exclusive OR operation on data C and data W. Therefore, when an exclusive OR operation is further performed on the helper data and the PUF data including an error on a per bit basis, correct bits in the data W are cancelled, and data obtained by adding error data ΔW to the data C is generated. This data is represented by C XOR When this C XOR ΔW is input to an ECC decoder and error correction is performed using parity data, correct random number data (data C) is generated. When an exclusive OR operation is further performed on the data C and the helper data, correct PUF data (VV) is reproduced.

As illustrated in FIGS. 28A and 28B, PUF data may be computed by using a hash function, and the computed value may be used as an encryption key used in an encryption device. By using a hash function, even if the encryption key is stolen, the original PUF data is protected from being inferred, resulting in increased security. For example, PUF data is used in a write process and in a read process in the data control circuit 6.

As described above, in order to make it difficult to infer PUF data from parity data used in error correction or from helper data, it is extremely important to generate random number data that is used in initial registration and that is difficult to predict. If a PUF data generation block, a random number data generation block, and a non-volatile memory storing data are separated from one another, data is exchanged among the blocks and memory, and it is difficult to guarantee the security of the paths. With the configuration of the present embodiment, all functions, namely, generation of PUF data, generation of random numbers, and storing of data in a non-volatile memory, can be implemented within the same device. Therefore, it is not necessary to input random number data generated in a separate block, for example. An input path may create a risk that the path is attacked and known random number data that is easily decrypted by an attacker is intentionally input, for example. With the configuration of the present embodiment, it is possible to eliminate such a risk and provide a device that can generate an extremely highly secure ID and can manage the ID.

Example Application to IC card

As one example application, encryption of a private key using digital ID data generated according to the present disclosure, hiding of encrypted private key data by a write operation with forming, and an authentication method are disclosed.

Figure 29:
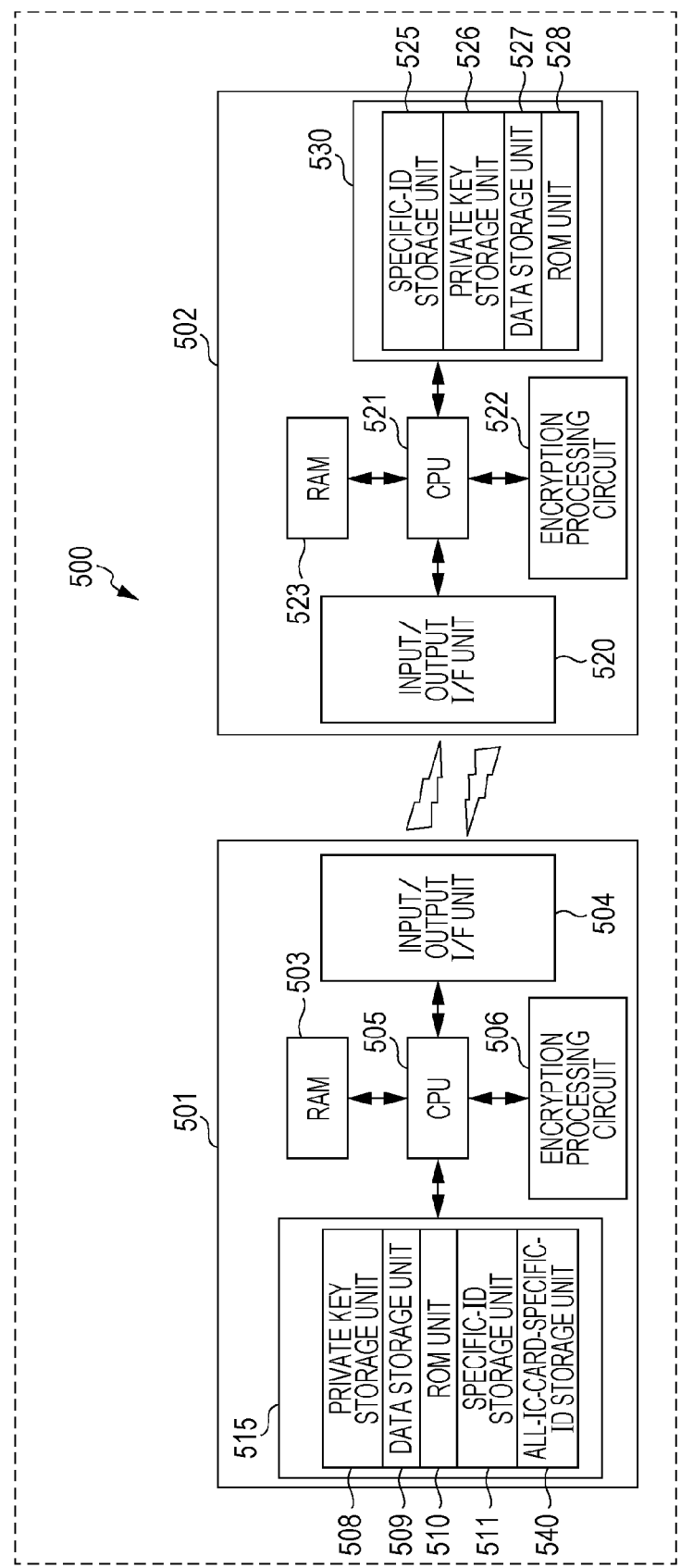
FIG. 29 is a diagram illustrating an example configuration of a communication system according to an embodiment.

FIG. 29 is a block diagram illustrating an example configuration of a communication system 500 according to the present embodiment. In FIG. 29, the communication system 500 includes a reader/writer and data server 501 (hereinafter referred to as a "reader/writer") and an IC card 502. The reader/writer 501 and the IC card 502 perform wireless communication with each other via antennas or the like respectively included therein, for example.

Reader/Writer

The reader/writer 501 includes a random access memory (RAM) 503, an input/output interface (I/F) unit 504, a central processing unit (CPU) 505, an encryption processing circuit 506, and a non-volatile memory device 515.

The input/output I/F unit 504 of the reader/writer 501 is an interface for transmitting and receiving data by performing external wireless communication and can be implemented as a wireless communication circuit, for example. The input/output I/F unit 504 includes a radio frequency (RF) antenna. The input/output I/F unit 504 emits a predetermined electromagnetic wave and detects the IC card 502 that is approaching on the basis of a change in the load. The input/output I/F unit 504 modulates a carrier wave of a predetermined frequency supplied from an oscillator circuit (not illustrated) on the basis of data supplied from the CPU 505, for example. The input/output I/F unit 504 outputs the generated modulated wave via the antenna (not illustrated) as an electromagnetic wave to thereby transmit various types of data to the IC card 502 located in the vicinity of the reader/writer 501. The input/output I/F unit 504 receives a modulated wave transmitted from the IC card 502 via the antenna, demodulates the modulated wave, and supplies the obtained data to the CPU 505. The non-volatile memory device 515 corresponds to the non-volatile memory device 10 described above. The non-volatile memory device 515 includes a private key storage unit 508, a data storage unit 509, a read-only memory (ROM) unit 510, a specific-ID storage unit 511, and an all-IC-card-specific-ID storage unit 540.

The ROM unit 510 corresponds to a specific address area in a group of memory cells included in the non-volatile memory device 515 of the present disclosure for storing second-type data. The CPU 505 of the reader/writer 501 loads a program stored in the ROM unit 510 to the RAM 503 and performs various processes by executing the program. The RAM 503 also temporarily stores data or the like necessary for the CPU 505 to perform various processes. As the RAM 503, a volatile storage device, such as a static random access memory (SRAM) or a dynamic random access memory (DRAM), may be used. Alternatively, the RAM 503 may be constituted by part of the group of memory cells in the non-volatile memory device of the present disclosure for storing second-type data.

The specific-ID storage unit 511 is a group of memory cell used to generate digital ID data of the present disclosure, and is used to generate ID data specific to the reader/writer by using the scheme of the present disclosure. The all-IC-card-specific-ID storage unit 540 stores all pieces of digital ID data of all of a plurality of IC cards 502 that are used, the pieces of digital ID data being different from one another. Digital ID data for each IC card may be stored as data encrypted by using digital ID data specific to the reader/writer as an encryption key.

The CPU 505 controls the encryption processing circuit 506 to encrypt and decrypt data in accordance with a predetermined encryption algorithm. Examples of the encryption algorithm include the Triple Data Encryption Standard (DES) and the Advanced Encryption Standard (AES). These algorithms are encryption algorithms based on a common key encryption scheme in which a single private key is used to perform encryption and decryption. Alternatively, a public key scheme, such as the RSA encryption, may be employed in which encrypted communication is performed by using two different keys, namely, a private key and a public key, to make a key used in encryption different from a key used in decryption. In this case, the private key storage unit 508 described below may store both the public key of the party at the other end of communication and the private key of the communicating party. Data of these important keys may be encrypted by using digital ID data of the present disclosure generated from the specific-ID storage unit 511 as an encryption key and may be stored as an encrypted private key or an encrypted public key. Digital ID data generated by using the PUF technology as described above is specific to the reader/writer and is difficult to reproduce or hack. Accordingly, even if an encrypted private key or an encrypted public key encrypted by using such digital ID data is copied, the digital ID data is data for which copying is not possible and which is specific to the IC card, and therefore, ensures security.

When encryption or decryption of data is performed in the reader/writer 501, the CPU 505 decrypts an encrypted private key stored in the private key storage unit 508, which is a specific address area in the non-volatile memory device 515, by using digital ID data of the present disclosure as a key, obtains the original private key, and supplies the original private key together with the data to be encrypted or decrypted to the encryption processing circuit 506. The encryption processing circuit 506 performs encryption or decryption of the data by using the supplied private key.

The data storage unit 509 stores data necessary for the CPU 505 to execute the program. In the data storage unit 509, specific data that is encrypted by using digital ID data of the present disclosure as a key may be stored. The specific data may be stored as first-type data by using memory cells in the initial state or may be stored as second-type data by using memory cells in the variable state.

As the private key storage unit 508, memory cells for storage described above are used. In a case of using a memory cell for storage, data is stored in accordance with whether the variable resistance element is in the initial state or in the variable state, and therefore, it is not possible to read the data with a usual command based on a read threshold. Accordingly, key information can be hidden. In the private key storage unit 508, a private key may be stored as an encrypted private key described above.

Data can be stored in a memory cell array at any desired address. Therefore, even if an attempt to perform an analysis for directly and physically reading a resistance value using a probe is made, it is difficult to identify which memory cell corresponds to which piece of data. It is difficult to distinguish data encrypted by using digital ID data from data that is not encrypted, which further makes the analysis complex.

As described above, the communication system 500 illustrated in FIG. 29 is highly tamper-resistant to leakage of a private key. Digital ID data of the present disclosure has excellent data reliability in a high-temperature environment and is optimum for storage and encryption of a private key in which a data error is not allowed.

A private key stored in the private key storage unit 508 may be the same as that stored in a private key storage unit 526 of the IC card 502. A private key may be stored in advance only on the reader/writer 501 that supports the IC card 502 and that is allowed to read a card ID, which is digital ID data specific to the IC card 502.

The specific digital ID data is stored in a specific-ID storage unit 525 while containing a data error on the basis of the PUF technology described in the embodiment of the present disclosure.

The specific digital ID data can be random numbers specific to each IC card as described above. Therefore, the specific digital ID data can be used to perform various types of encryption specific to the IC card.

IC Card

The IC card 502 includes an input/output I/F unit 520, a CPU 521, an encryption processing circuit 522, a RAM 523, and a non-volatile memory device 530.

The input/output I/F unit 520 of the IC card 502 is an interface for transmitting and receiving data by performing external wireless communication and can be implemented as a wireless communication circuit, for example. As the input/output I/F unit 520, an LC circuit constituted by a coil-shaped antenna and a capacitor is generally used. When the antenna of the IC card approaches the reader/writer 501, resonance with an electromagnetic wave of a predetermined frequency emitted from the reader/writer 501 occurs. The input/output I/F unit 520 rectifies and stabilizes an electric current produced by an AC magnetic field in the antenna and supplies the result to each unit in the IC card 502 as DC power.

The input/output I/F unit 520 detects a modulated wave received via the antenna, demodulates the detected wave, decodes data obtained as a result of demodulation to restore the data to digital data, and supplies the digital data to the CPU 521. For the decoded digital data, a clock signal for reception (not illustrated) is generated in which the frequency and the phase are locked (a clock reproduction technique called phase locked loop (PLL) in which a voltage-variable oscillator is mounted in a device, a phase difference is detected and integrated in accordance with input digital data to generate a voltage for control, and the voltage is input as a control voltage for the oscillator to thereby obtain a clock having a matched frequency for sampling input data and a locked phase). The generated clock signal is supplied as a clock signal for latching digital data.

When the input/output I/F unit 520 transmits certain information to the reader/writer 501, the input/output I/F unit 520 makes a change in the load of the antenna occur in accordance with data input from the CPU 521 and encoded to modulate the data and transmits the modulated data to the reader/writer 501 via the antenna.

The IC card 502 includes the non-volatile memory device 530 of the present disclosure. The non-volatile memory device 530 corresponds to the above-described non-volatile memory device 515 in the present embodiment. Therefore, the same elements are given the same reference numerals and names and are referred to as appropriate in the following description. In this example application, the non-volatile memory device 530 also functions as a non-volatile storage device.

The non-volatile memory device 530 includes the specific-ID storage unit 525 that stores digital ID data specific to each IC card, the private key storage unit 526 that stores private key data, a data storage unit 527 that stores data necessary for the CPU 521 to execute a program, and a ROM unit 528 that stores the program executed by the CPU 521. All of these units are included in a single memory cell array. The CPU 521 loads the program stored in the ROM unit 528 to the RAM 523 and executes the program, for example, to perform various processes. Program data stored in the ROM unit 528 may be encrypted and stored by using digital ID data of the present disclosure generated from a group of memory cells in the specific-ID storage unit 525 as a key.

The CPU 521 controls the encryption processing circuit 522 to encrypt and decrypt data in accordance with a predetermined encryption algorithm. As described above, examples of typical encryption schemes include a common key scheme in which encryption and decryption are performed by using the same private key on the transmitting side and on the receiving side and a public key scheme in which encryption and decryption are performed by using a public key and a private key that are different. In the following description, a case where a common key scheme is employed is described.

Note that, in a public key scheme, in a case where the IC card 502 transmits ciphertext data encrypted in the IC card 502 to the reader/writer 501, encryption is performed by using a public key obtained in advance from the reader/writer 501. The ciphertext data transmitted from the reader/writer 501 is decrypted by using a private key stored in advance in the IC card 502. A public key scheme is similar to a common key scheme except for the features described above. A public key and a private key used in a public key scheme make a unique pair of keys, and therefore, can also be used in mutual authentication when encrypted data is mutually decrypted by using the public key and the private key.

Also in the IC card 502, key data stored in the private key storage unit 526 is saved as an encrypted private key or an encrypted public key that is encrypted by using digital ID data stored in the specific-ID storage unit 525 on the basis of the PUF technology of the present disclosure as described in the description of the card reader. The encrypted private key or the encrypted public key can be stored in memory cells. In a case where encryption or decryption of data is performed in the IC card 502, the CPU 521 reads encrypted private key data stored in the private key storage unit 526, which is part of a group of memory cells in the non-volatile memory device 530, using a special read command for reading on the basis of the thresholds illustrated in FIG. 3. The read encrypted private key data is decrypted by using digital ID data of the present disclosure and is restored to the original private key data. The CPU 521 supplies the private key data to the encryption processing circuit 522 together with data to be encrypted or decrypted. The encryption processing circuit 522 performs encryption or decryption of the supplied data using the supplied private key.

The data storage unit 527 stores data necessary for the CPU 521 to execute a program. In the data storage unit 527, specific data may be stored as is as plaintext, may be encrypted by using a private key and stored, or may be encrypted by using digital ID data as a key and stored. Specific data may be stored as first-type data by using memory cells in the initial state or may be stored as second-type data by using memory cells in the variable state.

In the communication system 500 having the above-described encryption and decryption functions, a first step of communication between the IC card 502 and the reader/writer 501 is described below.

In the IC card 502, digital ID data specific to each IC card is present in the specific-ID storage unit 525 on the basis of the PUF technology described in the present embodiment while containing a data error.

The CPU 521 reads the digital ID data specific to each IC card from the specific-ID storage unit 525. The CPU 521 supplies the read digital ID data to the encryption processing circuit 522 as a key together with encrypted private key data. The encryption processing circuit 522 decrypts and restores the encrypted private key to the original private key by using the supplied digital ID data as a key. The CPU 521 encrypts the digital ID data by using the original private key. The encrypted digital ID data is supplied to the CPU 505 of the reader/writer 501 via the input/output I/F units 520 and 504.

The CPU 505 reads private key data from the private key storage unit 508 of the non-volatile memory device 515 in the reader/writer 501. The CPU 505 supplies the private key data and the received encrypted digital ID data to the encryption processing circuit 506. The encryption processing circuit 506 decrypts the encrypted digital ID data by using the supplied private key data. The decrypted digital ID data is compared with pieces of ID data stored in the all-IC-card-specific-ID storage unit 540. If one of the pieces of ID data matches the decrypted digital ID data, the IC card 502 with which communication is performed is certified as a valid IC card 502 eligible to perform data communication. Thereafter, data communication is allowed to continue.

A modification of mutual authentication between the reader/writer 501 and the IC card 502 is described below.

The all-IC-card-specific-ID storage unit 540 of the reader/writer 501 stores first digital data and second digital data described above for each IC card. The reader/writer 501 transmits a combination of a sequence of addresses for reading digital ID data that is to be received to the IC card 502 as challenge data. The IC card 502 changes a combination of the first digital data and modified second digital data described above on which an exclusive OR operation is performed in accordance with the sequence of addresses for the digital ID data in the received challenge data and returns the result to the reader/writer 501 as response data.

The reader/writer 501 obtains expected response data by performing an arithmetic operation on the first digital data and the second digital data registered in advance, compares the expected response data with the response data returned from the IC card 502 to confirm that at least a predetermined number of bits of the expected response data match those of the returned response data, and certifies the IC card 502.

The response data, which corresponds to digital ID data, is transmitted while containing error data as described above, and therefore, is highly resistant to hacking. Digital ID data is constituted by random numbers that differ from IC card to IC card. If a sufficient hamming distance is kept between pieces of digital ID data, it is possible to identify to which IC card a piece of ID data corresponds even if the piece of ID data contains a predetermined number of bits of error data. Therefore, by repeating transmission of challenge data and reception of response data, it is possible to identify an IC card as a valid card. Data used in authentication is specific to each IC card and contains error data, and therefore, an analysis of the data is difficult, and authentication in which extremely high security is guaranteed can be implemented.

As described above, with the communication system 500, a specific digital ID data generation function, a private key storage function, a data storage function, and a program data storage function can be implemented with a single non-volatile memory device. A circuit for generating an ID based on the PUF technology need not be separately mounted, and a mobile-type application, such as an IC card in which an increase in the circuit scale is reduced as much as possible, can be provided.

The functions of the RAM 503 may be implemented by using a memory cell array included in the non-volatile memory device 515. The functions of the RAM 523 may be implemented by using a memory cell array included in the non-volatile memory device 530.

Various types of data can be saved in non-volatile memory cells at any addresses, and therefore, it is possible for information regarding which memory cells in which area store information in which state to be kept secret from a third party. Further, it is possible to protect digital ID data from hacking, such as direct reading of data in a memory using a physical probe and to provide an application having extremely excellent tamper resistance.

It is not essential to store, in the IC card 502, data (encrypted data) encrypted by using digital ID data as an encryption key. For example, the reader/writer 501 may read encrypted data, and the data storage unit 509 of the reader/writer 501 may store the encrypted data. The reader/writer 501 may transmit encrypted data to an external server (not illustrated), and a storage device of the server may store the encrypted data. A procedure for decryption in a case where encrypted data is not stored on the IC card 502 is performed as follows. The CPU 521 of the IC card 502 receives via the input/output I/F unit 520 encrypted data externally stored. The CPU 521 generates digital ID data specific to each IC card from the specific-ID storage unit 525. Thereafter, the encryption processing circuit 522 decrypts the encrypted data by using the digital ID data as a decryption key.

From the above description, it is obvious to a person skilled in the art that a large number of modifications and other embodiments can be made to the present disclosure. Therefore, the above description should be considered to be a mere example and is provided in order to teach a person skilled in the art the best mode for implementing the present disclosure. The specifics of the structures and/or functions herein can be substantially modified without departing from the spirit of the present disclosure.

What is claimed is:

1. A random number processing device generating random number data by using data read from memory cells, the random number processing device comprising:
    a random number processing circuit that, in operation, generates first random number data from a combination of first resistance value information and second resistance value information, the first resistance value information being information about a resistance value of a first memory cell among the memory cells, the resistance value of the first memory cell falling within at least one resistance value range, the second resistance value information being information about a resistance value of a second memory cell that is different from the first memory cell among the memory cells, the resistance value of the second memory cell falling within the at least one resistance value range, wherein:
    in a variable state, in response to application of different electrical signals to the memory cells, a resistance value of each of the memory cells reversibly transitions between resistance value ranges including the at least one resistance value range; and
    in a case where the resistance value of each of the memory cells falls within the at least one resistance value range, the resistance value of each of the memory cells changes as time passes.

2. The random number processing device according to claim 1, wherein
    the random number processing circuit includes
    a first random number data generation circuit that, in operation, generates the first random number data in accordance with a difference or a magnitude relationship between the first resistance value information and the second resistance value information.

3. The random number processing device according to claim 2, wherein
    the random number processing circuit further includes
    a second random number data generation circuit that, in operation, generates second random number data in accordance with a difference or a magnitude relationship between third resistance value information and fourth resistance value information, the third resistance value information and the fourth resistance value information being information about the resistance value of a third memory cell among the memory cells, the resistance value of the third memory cell falling within the at least one resistance value range, the third resistance value information being obtained at a first time point, the fourth resistance value information being obtained at a second time point.

4. The random number processing device according to claim 3, wherein
the third resistance value information and the fourth resistance value information are each represented by a digital value, and, in operation,
the second random number data generation circuit generates the second random number data in accordance with whether the difference has a value of an even number or an odd number.

5. The random number processing device according to claim 3, wherein
the random number processing circuit further includes a third random number data generation circuit that, in operation, generates third random number data by performing an exclusive OR operation on the first random number data and the second random number data.

6. The random number processing device according to claim 2, wherein
the first resistance value information and the second resistance value information are each represented by a digital value, and, in operation,
the first random number data generation circuit generates the first random number data in accordance with whether the difference has a value of an even number or an odd number.

7. A non-volatile memory device comprising:
a memory array that includes memory cells each having a resistance value and having a property that, in a variable state, in response to application of different electrical signals to the memory cells, the resistance value reversibly transitions between resistance value ranges and, in a case where the resistance value falls within at least one resistance value range among the resistance value ranges, the resistance value changes as time passes;
a read circuit that, in operation, obtains first resistance value information and second resistance value information, the first resistance value information being information about the resistance value of a first memory cell among the memory cells, the resistance value of the first memory cell falling within the at least one resistance value range, the second resistance value information being information about the resistance value of a second memory cell that is different from the first memory cell among the memory cells, the resistance value of the second memory cell falling within the at least one resistance value range; and
a random number processing circuit that, in operation, generates first random number data from a combination of the first resistance value information and the second resistance value information.

8. The non-volatile memory device according to claim 7, wherein
each of the memory cells includes a variable resistance element including
a first electrode,
a second electrode, and
a variable resistance layer interposed between the first electrode and the second electrode.

9. The non-volatile memory device according to claim 8, wherein
the variable resistance layer includes a layer of an insulator.

10. The non-volatile memory device according to claim 9, wherein
the variable resistance layer includes a local region that passes through the layer of the insulator.

11. The non-volatile memory device according to claim 10, wherein
the insulator contains a metal oxide, and
the local region contains a metal oxide of an oxygen deficient type having a lower percentage of oxygen content than a percentage of oxygen content of the insulator.

12. The non-volatile memory device according to claim 8, wherein
the variable resistance layer contains a metal oxide.

13. The non-volatile memory device according to claim 12, wherein
the metal oxide is of an oxygen deficient type.

14. The non-volatile memory device according to claim 12, wherein
the metal oxide is at least one selected from the group consisting of a transition metal oxide and an aluminum oxide.

15. The non-volatile memory device according to claim 12, wherein
the metal oxide is at least one selected from the group consisting of a tantalum oxide, a hafnium oxide, and a zirconium oxide.

16. An integrated circuit card comprising:
a memory array that includes memory cells each having a resistance value and having a property that, in a variable state, in response to application of different electrical signals to the memory cells, the resistance value of the memory cells reversibly transitions between a resistance value ranges and, in a case where the resistance value falls within at least one resistance value range among the resistance value ranges, the resistance value changes as time passes;
a read circuit that, in operation, obtains first resistance value information and second resistance value information, the first resistance value information being information about the resistance value of a first memory cell among the memory cells, the resistance value of the first memory cell falling within the at least one resistance value range, the second resistance value information being information about the resistance value of a second memory cell that is different from the first memory cell among the memory cells, the resistance value of the second memory cell falling within the at least one resistance value range;
a random number processing circuit that, in operation, generates first random number data from a combination of the first resistance value information and the second resistance value information; and
an input/output interface unit from which individual identification information generated by using the first random number data is output.

* * * * *